United States Patent
Sterner et al.

(10) Patent No.: US 8,307,286 B2
(45) Date of Patent: Nov. 6, 2012

(54) METHODS AND SYSTEMS FOR ONLINE VIDEO-BASED PROPERTY COMMERCE

(75) Inventors: Christian A. Sterner, Boulder, CO (US); Haider Zainy, Denver, CO (US); Philip Thomas DiGiulio, New York, NY (US)

(73) Assignee: Wellcomemat LLC, Boulder, CO (US)

( * ) Notice: Subject to any disclaimer, the term of this patent is extended or adjusted under 35 U.S.C. 154(b) by 1214 days.

(21) Appl. No.: 11/744,721

(22) Filed: May 4, 2007

(65) Prior Publication Data

US 2007/0294622 A1    Dec. 20, 2007

Related U.S. Application Data

(60) Provisional application No. 60/746,645, filed on May 7, 2006.

(51) Int. Cl.
*G06F 3/00* (2006.01)
(52) U.S. Cl. ......................... 715/723; 715/716
(58) Field of Classification Search .................. 715/716, 715/723
See application file for complete search history.

(56) References Cited

U.S. PATENT DOCUMENTS

| | | | |
|---|---|---|---|
| 2003/0191691 A1 | 10/2003 | Macleod | |
| 2004/0039934 A1* | 2/2004 | Land et al. | 713/200 |
| 2005/0152665 A1 | 7/2005 | Shibata et al. | |
| 2007/0250899 A1 | 10/2007 | Rhodes et al. | |

OTHER PUBLICATIONS http://www.veotag.com, Aug. 6, 2007.
http://www.viddler.com, Aug. 6, 2007.
http://www.motionbox.com, Aug. 6, 2007.
http://www.vsocial.com, Aug. 6, 2007.
http://www.zentation.com, Aug. 6, 2007.
http://www.cooltoors.com, Aug. 6, 2007.

* cited by examiner

*Primary Examiner* — Ryan Pitaro
*Assistant Examiner* — Andrea Leggett
(74) *Attorney, Agent, or Firm* — Marsh Fischmann & Breyfogle LLP; Daniel J. Sherwinter

(57) ABSTRACT

Video data may be extremely useful in online property commerce. However, the current methods of handling this video data fail to provide users of the data with effective and convenient ways of conveying and consolidating footage of multiple viewpoints and other property features. Among other things, embodiments of the invention address these failures by providing methods and systems for better handling of video data for property marketing, reporting, and analysis.

28 Claims, 28 Drawing Sheets

| VIDEO_ID | CP1 | CP2 | CP3 | CP4 | ... |
|---|---|---|---|---|---|
| VID_0001 | NEIGHBORHOOD | EXTERIOR | FOYER | LIVING ROOM | ... |
| VID_0002 | STREET | EXTERIOR | ENTRY | LIVING ROOM | ... |
| VID_0003 | ENTRY | DINING ROOM | OFFICE | BATHROOM | ... |
| VID_0004 | OUTSIDE | FRONT PORCH | GARAGE | FOYER | ... |
| VID_0005 | EXTERIOR | MAIN STAIRS | DINING ROOM | KITCHEN | ... |
| ... | | | | | |

Fig. 7

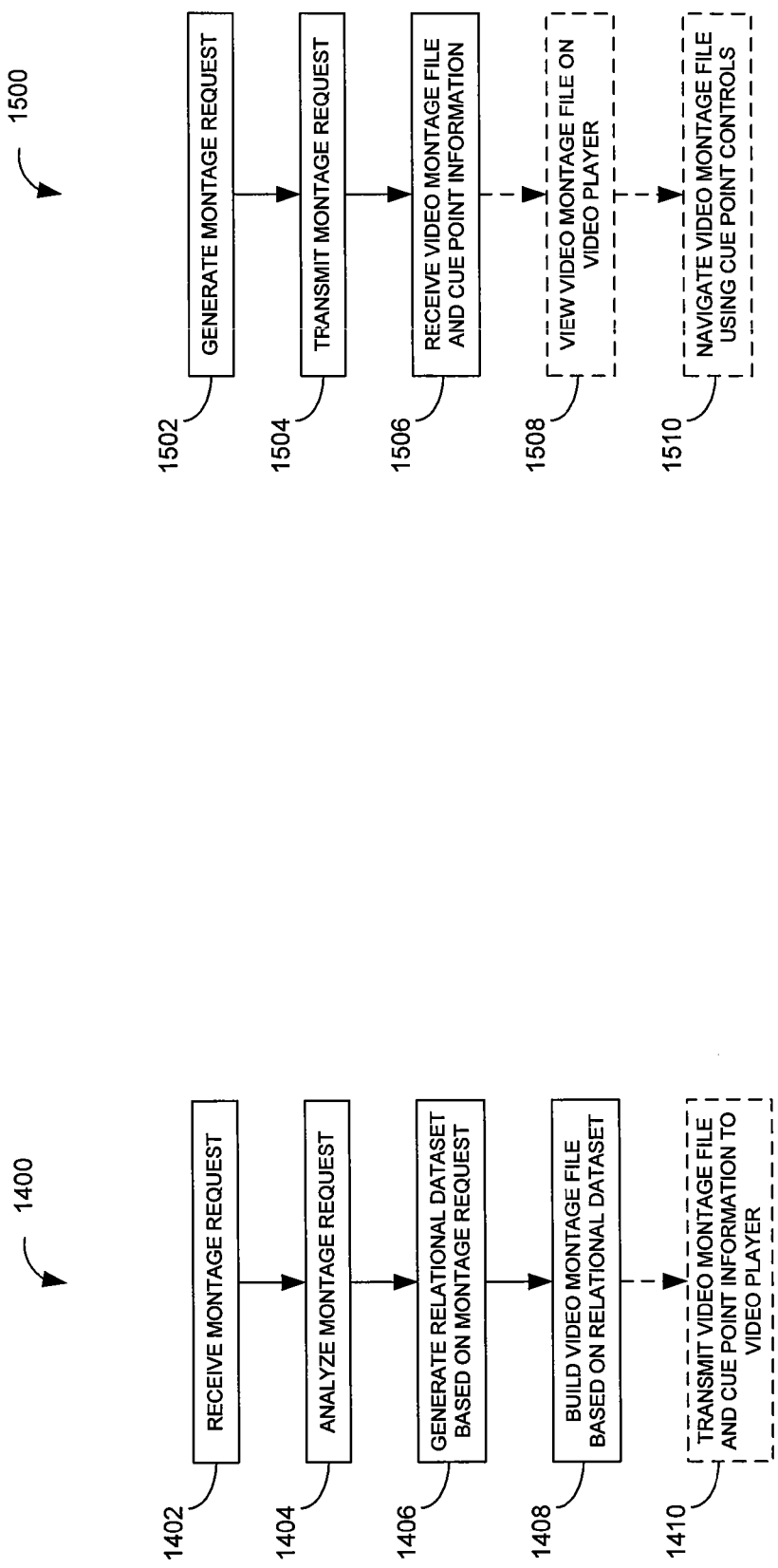

METHODS AND SYSTEMS FOR ONLINE VIDEO-BASED PROPERTY COMMERCE

CROSS-REFERENCES TO RELATED APPLICATIONS

This application is a nonprovisional claiming the benefits of U.S. Prov. App. No. 60/746,645, entitled "SYSTEM FOR ON-LINE VIDEO-BASED PROPERTY SALES AND MARKETING," filed May 7, 2006 by Christian A. Sterner et al. This application is also related to U.S. application Ser. No. 11/744,764, entitled "METHODS AND SYSTEMS FOR HANDLING MONTAGE VIDEO DATA", filed on the same date as the current application by Christian A. Sterner et al. The entire disclosures of both related applications are herein incorporated by reference for all purposes.

BACKGROUND OF THE INVENTION

This invention relates generally to online video; and more particularly to methods and systems for handling online video for property commerce over the Internet.

The past decades have seen the tremendous growth of Internet traffic, and with it, the birth of a new world of global electronic commerce (e-commerce). E-commerce allows sellers to share their wares with consumers around the world in virtual marketplaces. Through these virtual marketplaces, sellers can open virtual storefronts with little to no capital, quickly and inexpensively distribute information about products and services to a global customer base, and collect payment through electronic find transfers.

In exchange for these benefits, however, e-commerce drastically changes the relationships between buyers and sellers. One primary manifestation of this change is the difficulty with current technology to give consumers a feel for goods and services before they buy. In a virtual marketplace, a consumer has limited ability to experience a product—to try on clothing, to smell a chef's creation, or to walk through a neighborhood.

Still, as consumer high-speed data capability becomes increasingly ubiquitous, sellers are finding ways to combat those difficulties. The vast majority of e-commerce websites, for example, now use photos along with product descriptions to provide more information to consumers. Some progressive online retailers have even begun to use video, virtual reality applications, three-dimensional modeling, and other tools to create a greater sense of virtual interactivity between consumers and products.

One industry which has experienced this trend has been the real property marketing industry. For years, real estate marketers have experienced the difficulties inherent in dealing with large amounts of data from large numbers of sources. Services, such as the Multiple Listing Service (MLS) help provide some real property listings, but finding unlisted sellers and potential buyers often requires mass advertising and marketing. Traditionally, this includes expensive methods, such as creating full-color print advertisements, purchasing advertising space in multiple locations, planting "For Sale" signs and information at locations for potential drive-by buyers, holding open houses, and guiding personal walkthroughs.

The rise of the Internet has expanded the reach of advertising and has allowed for enhanced marketing capabilities at much lower cost. Still, real estate marketers and agents have found it difficult to communicate the feel of real property to prospective buyers in a virtual space. For example, while it is well accepted in the industry that property listings which include photos tend to be more successful at luring prospective buyers, it is often still difficult to relate the multiple image viewpoints together to convey a cohesive sense of the real property to a potential buyer.

To remedy that and other problems, the industry has begun to see benefits to video marketing. Through video media, potential buyers can take virtual tours of properties, and even listen to audio associated with the video. While this type of information used to be very expensive to distribute (e.g. through shipping video cassette tapes), the Internet provides an inexpensive and efficient video distribution medium. Further, newer video compression technologies and the prevalence of home broadband connections have made it practical to distribute audiovisual advertisements to potential buyers around the world.

There remain, however, significant disadvantages to video marketing. One disadvantage is the cost of producing a quality result. Though most home computers today come with user-friendly photo editing software, much of the video editing software and hardware is cumbersome, expensive, and difficult to learn. The result is that the average property seller or marketer must either spend a significant amount of money to hire a videographer to shoot and process video, or spend a significant amount of time learning to use a video editing system.

Another disadvantage is that, where photos often provide too little information to consumers, videos may provide too much to be useful. For example, say a consumer would like to find a house with a large kitchen. It may be easy to find photos of a kitchen, but difficult to really experience the size and utility of the kitchen from those photos. On the other hand, video of the kitchen may provide a much better representation of the space, but may be difficult to find within the footage of the entire house. Further, while it may be simple to compare photos of many kitchens, it may be cumbersome and time-consuming to find and compare video footage.

Similar difficulties arise in the vast majority of property marketing industries, whether the property is real estate, consumer goods, services, or any other community of buyers and sellers. Thus, though these industries understand the vast advantages of video marketing over photos or plain text, the transition has been slow. The industry has remained in need of simple methods and systems for handling online video for property marketing.

BRIEF SUMMARY OF THE INVENTION

Embodiments of the invention can address this condition in the art by providing methods and systems for handling online video for property marketing using cue point information.

A first set of embodiments provides a system for handling video cue points. The system comprises an application server in operative communication with a network, a video server in operative communication with the application server and configured to serve a set of video information indexable by a set of video identifiers, a cue point server in operative communication with at least one of the application server or the video server, and configured to serve a set of cue point information; and a video environment. The video environment is configured to be runnable by the application server, configured to receive data over the network relating to interactions with a client terminal, and comprises a cue point handler configured to execute at least one of creating, modifying, deleting, or interpreting at least a portion of the set of cue point information.

In some embodiments, the system further comprises a data store configured to store at least a portion of the set of video information and at least a portion of the set of cue point information. In other embodiments, the system further comprises a relational database configured to store at least a portion of the set of cue point information in relation to at least a portion of the set of video information. In yet other embodiments, the system further comprises a relational database configured to store at least a portion of the set of cue point information in relation to at least another portion of the set of cue point information.

In still other embodiments, the system further comprises an authentication server configured to authenticate clients of the system. And in other embodiments, the system further comprises a video authorer configured to communicate with a video creation device. Further, in other embodiments, the system comprises a comment handler configured to perform at least one of receiving, displaying, or associating comment information. In these embodiments, the comment information comprises at least one of textual, audio, or video information, and relates to at least a portion of at least one of the set of video information, the set of cue point information, or other comment information.

In certain embodiments, the cue point information substantially defines at least one of a metatag, a cue point name, a cue point time position, or a cue point hierarchy. Also, in some embodiments, the video environment comprises at least one of a video player or a video editor. In other embodiments, the video server is in operative communication with the application server via the network. In still other embodiments, the cue point server is in operative communication with at least one of the application server or the video server via the network. And in other embodiments the network is the Internet.

A second set of embodiments provides a method for handling video cue points. The method provides a computer system. The computer system has at least one computer-readable medium comprising a video editing environment, and the computer system is in operative communication with a network.

The method also receives, using the computer system, server video data from a set of stored video data; transmits over the network, using the computer system, a set of client video data based at least in part on the set of server video data; receives over the network, using the computer system, a set of cue point information; and updates a set of cue point associations with at least one of the client video data, the server video data, or the stored video data, the set of cue point associations being based at least in part on the set of cue point information.

In some embodiments, the method further provides a cue point editing mode configured to perform at least one of creating, modifying, deleting, or interpreting at least a portion of the set of cue point information. In certain of these embodiments, the method further receives a pause signal over the network representing that playback of the client video data has been paused, and transmits the cue point editing mode after receiving the pause signal. In certain others of these embodiments, the method further receives a pause signal over the network representing that playback of the client video data has been paused, receives a time position representing the time position within the client video data at which playback was paused, and creates a cue point location associated at least in part with the client video data and the time position.

In other embodiments, the method further receives, over the network, authentication information relating to access authority of a client terminal. In certain of these embodiments, the method further denies or allows access to all or part of the video editing environment based at least in part on the access authority of the client terminal.

In other embodiments, the video editing environment comprises a server-level video editor. In yet other embodiments, at least a portion of the server video data is received over the network.

In still other embodiments, the client video data is transmitted to a video player configured to display video data on a client terminal. In certain of these embodiments, the client video data is transmitted progressively, allowing the video player to begin displaying transmitted client video data while remaining client video data continues to be transmitted.

A third set of embodiments provides a method for handling video cue points. The method provides a computer system. The computer system has at least one computer-readable medium comprising a video playback environment, and the computer system is in operative communication with a network.

The method further receives, using the computer system, server video data from a set of stored video data; receives, using the computer system, server cue point information from a set of stored cue point information; transmits over the network, using the computer system, a set of client video data; transmits over the network, using the computer system, a set of client cue point information; receives a selected cue point from the set of client cue point information; and locates a time position in the client video data based at least in part on the selected cue point. At least part of the client video data is based on the set of server video data and playable on a client terminal. At least part of the client cue point information is based on the set of server cue point information and selectable by the client terminal.

In some embodiments, the method further receives, over the network, authentication information relating to access authority of a client terminal. In certain of these embodiments, the method further denies or allows access to all or part of the video editing environment based at least in part on the access authority of the client terminal.

In other embodiments, the video playback environment comprises a video player configured to display video data on a client terminal. In certain of these embodiments, the client video data is transmitted progressively, allowing the video player to begin displaying transmitted client video data while remaining client video data continues to be transmitted.

In other embodiments, at least a portion of the server video data is received over the network.

A fourth set of embodiments provides a method for handling video cue points. The method accesses, over a network and using a client terminal, a host computer system comprising a video environment; and interacts with at least part of the set of cue point information using the client terminal. The video environment comprises a video handler configured to transmit video data over the network, and a cue point handler configured to transmit cue point information over the network, at least part of the cue point information being related to at least part of the transmitted video data.

In some embodiments, the method further transmits client authentication information over the network to the host computer system. In other embodiments, the video environment comprises at least one of a video editing environment or a video playback environment.

In various embodiments, the method further accesses a cue point editing mode configured to perform at least one of creating, modifying, deleting, or interpreting at least a portion of the set of cue point information. In certain of these embodiments, the method further accesses a cue point editing mode by pausing playback of the client video data. In certain others of these embodiments, the method further accesses a cue point editing mode by pausing playback of the client video data at a time position; and creates a cue point location associated at least in part with the client video data and the time position.

In some embodiments of the method, the interacting step comprises performing at least one of creating, modifying, deleting, or interpreting a portion of the set of cue point information. In other embodiments, the video environment comprises a video authoring environment configured to interface with a video creation device, and the method further comprises uploading video data using the video authoring environment.

This summary provides only a general outline of embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 7 provides an exemplary data structure for use with various embodiments of video editing environments according to the invention.

FIG. 14 provides an exemplary flow diagram summarizing host-oriented methods for generating and handling montage video information in various embodiments of the invention.

FIG. 15 provides an exemplary flow diagram summarizing client-oriented methods for generating and handling montage video information in various embodiments of the invention.

DETAILED DESCRIPTION OF THE INVENTION

Among other things, embodiments of the invention provide systems and methods for enhancing and handling online video data for use with property-related commerce and communication. Some embodiments may provide systems and methods for generating and handling video cue points. Other embodiments may provide systems and methods for using those cue points to generate video montage files and for handling video montage files. Still other embodiments may provide systems and methods for handling group search environments.

Cue Point Handling Systems

Figure 1A:
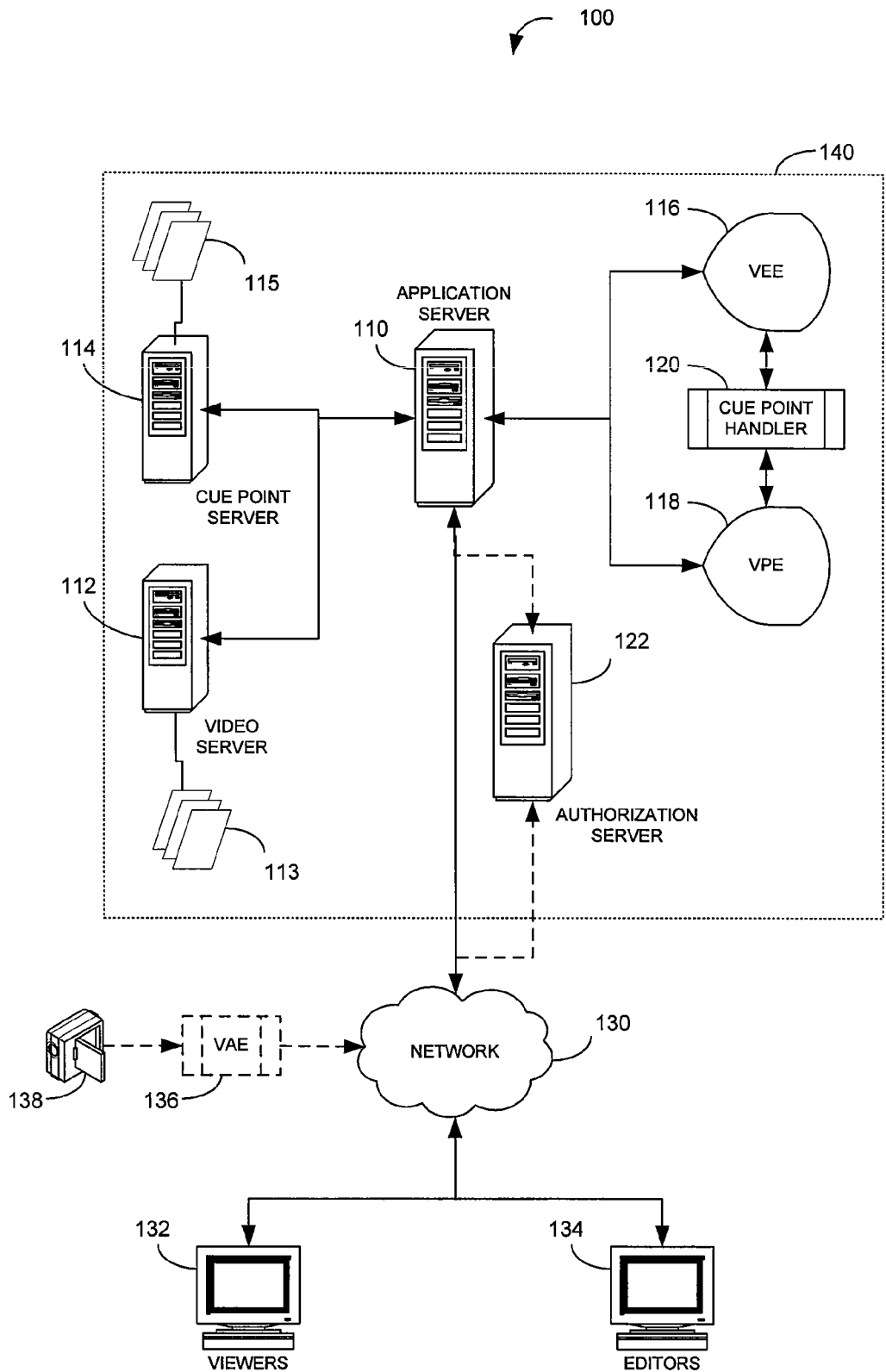
FIG. 1A provides an exemplary system diagram for handling video cue points for use with various embodiments of the invention.

FIG. 1A provides an exemplary system diagram for handling video cue points for use with various embodiments of the invention. The system 100 comprises an application server 110 configured to execute, and possibly store, one or more applications. The application server 110 may be accessible via a network 130, like the Internet or any other public or private, wired or wireless network. The application server 110 may be a dedicated server computer, a set or network of computers, an runnable file, or any other component capable of serving the desired program functions to a client.

The application server 110 may be in communication with one or more video servers 112, which may store and/or serve video files 113, or pointers to video files 113. It will be appreciated that the video files may be anything capable of storing or providing access to video data. Further, it will be appreciated that video data may include visual data, audio data, still frames, stop-time successions of images, virtual reality information (e.g. in Virtual Reality Markup Language (VRML)), three-dimensional modeling data, textual data, or any other information for displaying video images.

In one example, the video server 112 may be a dedicated computer or network of computers with the capability to store and index mass amounts of video data. In this example, to access a video file 113, a command may be sent to the video server 112 with an identifier (e.g. retrieve ('VID_0001')), the identifier being a unique file name or other identifier of a video file or set of video files.

In another example, the video server may comprise a list stored in one or more files which matches video identifiers with the location of respective videos. The videos may be located in the same data storage device as the video server, or in some other location, such as at some internet address, file transfer protocol (FTP) site, or some other protocol location (e.g. by hyper-text transfer protocol, HTTP). Similarly, one file may be found at multiple locations, for example at multiple mirror sites on the Internet; so one video file identifier may be stored in relation to multiple location pointers. In this example, to access a video file 113, a command may be sent to the video server 112 with a video file identifier. Say the command, "RETRIEVE ('VID_0001')", is used to retrieve a video file identified as "VID_0001" from the video server 112. When the video server 112 receives the "RETRIEVE" command, a relational database may be queried to find an entry for "VID_0001". This entry may be stored in relation to a list of URL and FTP destinations. The video server 112 may then use various algorithms to select a download location and download the file.

The application server 110 may also be in communication with one or more cue point servers 114, which may store and/or serve cue point information 115, or pointers to cue point information 115. In one example, the cue point server 112 may be a dedicated computer or network of computers with the capability to store and index sets of cue point information 115.

Some or all of this cue point information may be related to some or all of the video files 113. In some embodiments, cue points may refer to indexed time positions or tags anywhere within a video file. In these embodiments, multiple cue points may refer to multiple time positions within a video file. For example, say a video file contains video information about a hotel suite, in which there is one minute of video each relating to the bedroom, bathroom, living room, and kitchenette. In this example, four cue points may be associated with the video file, pointing to time positions at zero, one, two, and three minutes, and essentially providing chapter markers for the different sections of the video.

In other embodiments, cue points may refer to indexed locations or tags within a file, other than those based directly on time positions. For example, cue points may point to a specific number of bits of digital video data from the beginning or end of a video file, or from some other cue point location. For another example, using audio or image recognition, a cue point may represent the third time a specific word or image occurs within the video file. Audio recognition may detect and/or interpret, for instance, changes in audio level (e.g. to automatically create a cue point wherever there is more than one second of silence), certain sounds (e.g. a beep or other audio cue), or even more complex sound patterns (e.g. a word, a particular voice, etc.). Video recognition may detect and/or interpret, for example, particular images (e.g. the shape of a house, a predefined video cue, an icon, etc.), text information (e.g. a word, a character, etc.), changes in video (e.g. a scene change, a static frame for a given amount of time, etc.), or even complex image patterns (e.g. the movement of a character into a new environment, different types of lighting conditions, etc.).

In yet other embodiments, cue points may be video meta-tags. Meta-tags may describe the information in the video file, rather than pointing to specific data locations within the file. For example, video meta-tags for a video about a hotel suite in downtown Denver may include descriptive identifiers, like "hotel," "suite," "kitchenette," "luxury," "downtown," etc. It will be appreciated that many different types of cue points are possible, which may require that the system 100 can convert, interpret, or otherwise handle cue points of different types and/or from different domains.

In different embodiments of the invention, cue points may end in different ways. In some embodiments, the cue point refers only to a start or end time position of a particular video event. In other embodiments, a cue point may have a beginning and end. The end of the cue point may be determined or set in any useful way. In one example, the cue point may end at the time position of the cue point which follows it in time order (or at some time based on that time position, like one millisecond prior to the next cue point). In another example, the cue point may end at a designated time or bit location. In yet another example, the cue point may end based on some other condition, like detecting a change in comment, analyzing a pattern of user activity, detecting a video or audio pattern, etc.

Further, cue points may be stored in cue point banks, which may be served by a cue point server 112. The cue point bank may be any useful type of data structure for storing cue points and related information, either in relation to or not in relation to video files. For example, a cue point bank may be used to rank the most popular cue point names in a particular category of video files. In some cases, it may be superfluous and require too much storage to relate the cue points in this ranking to their respective video files. In other cases, it may be desirable to establish the relationships so that, when a cue point name is located in the cue point bank, an application may be able to also locate the video files which contain a cue point with that name.

Cue points may be stored to a cue point bank in any useful way, including, for example, by being manually added to a cue point bank, being automatically added whenever a cue point is created or on some other condition, or being added en masse from an external list. Further, cue points entries in the list may not relate to actual cue points in video files. For example, lists may be created by scanning the Internet for key terms relating to a specific subject, by parsing key terms from an article relating to a specific subject, by scanning video data with various audio or textual recognition algorithms, or by using thesauruses to generate lists of similar terms. Even further, cue point banks may be modified in any useful way. For example, cue point banks which record cue point rankings may allow modification manually by accepting votes or rankings, or automatically by continually polling various applications and systems for relevant information.

It will be appreciated that the application server 110, video server 112, and cue point server 114 may communicate in various ways. In a first way, the components may all be part of one physical system, for example as multiple files on a computer, multiple storage devices associated with a single processor, etc. In a second way, the components may each exist as a separate physical system, for example as one or more dedicated server computers. In this second way, the server computers may be collocated or distributed, and may be in communication via any effective channel, including any type of wired or wireless, public or private network. Further, some or all of the server components may communicate with one another directly or indirectly. For example, the server components may all communicate through a central processor; or the video server 112 and the cue point server 114 may communicate only with the application server 110 and not to each other.

The application server 110 may be configured to handle various applications, including a Video Editing Environment (VEE) 116 and/or a Video Playback Environment (VPE) 118. These programs may be stored on the application server 110, runnable (able to be executed, performed, effectuated, etc.) by the application server 110, or handled by the application server 110 in some other useful way. Either or both of the VEE 116 and the VPE 118 may also comprise or be in communication with a cue point handler 120. Further, the VEE 116 and the VPE 118 may be part of the same application or separate applications. The VEE 116 may also comprise a video player.

The system 100 may also comprise various types of client terminals, including viewer terminals 132 and editor terminals 134. These terminals may comprise any device or application capable of accessing the system 100 in a useful way. For example, viewer terminals 132 may include any device capable of playing video data from the VPE 118, like desktop computers, laptop computers, cell phones, personal digital assistants (PDA's), dedicated viewers, etc. Editor terminals 134 may include any of these devices, as well. In certain embodiments, the VEE 116 and VPE 118 may require different system capabilities, thereby making certain types of devices capable or incapable of performing as either viewer terminals 132 or editor terminals 134. For example, the video editing functionality of the VEE 116 may require extra processing power. Alternatively, the VPE 118 may require higher resolution capabilities, where the VEE 116 may allow low-resolution editing.

It will be appreciated that many types of applications are possible which may use video information and/or cue point information. In some embodiments, one or more applications may generate derivative information from cue point information, video information, VEE usage information, VPE usage information, or any other useful information. Derivative information may include any useful information which may be generated from these multiple information sources. In certain of these embodiments, derivative information may include marketing information generated from statistical processing of these various types and sources of data. For example, derivative information may include which videos, cue points, categories thereof, etc. were most visited by clients; which cue point names were most used in cue point editors; which geographic or socioeconomic groups of clients used various systems and methods in which ways, etc.

It will be appreciated that the derivative information may be independently valuable to a number of different types of entities. For example, a real estate agency may find value in marketing statistics relating to how their listings are being viewed and how their listings may be improved. As such, other applications may be desirable which may report, tailor, print, distribute, and perform other functions relating to the generated derivative data.

Viewer terminals 132 and editor terminals 134 may communicate with the application server 110 via a network 130. The network 130 may be any public or private, wired or wireless network or set of networks. For example, a video cell phone may connect to the application server 110 through a wireless connection to its service provider's network, and then through a wired connection to the Internet address of the application server 110. In some embodiments, the network 130 may comprise any number of computers, configured as centralized or decentralized peer-to-peer networks, ad hoc networks, mesh networks, or any other useful configuration. For example, the network 130 may comprise two terminals connected to one another by a Universal Serial Bus (USB) cable, each performing server functions for the other computer.

The application server 110 may also be in communication with an authorization server 122. The authorization server may be configured to allow or deny access to all or part of the various applications handled by the application server 110. For example, it may be desirable to allow free access to the VPE 118 so any client can watch video files, but limit access to the VEE 116 so only authorized clients may edit video files. In some embodiments, the authorization server 122 may be configured to provide other types of authorization and/or security. For example, the authorization server 122 may provide certain encryption or firewall capabilities.

Further, the system 100 may comprise a Video Authoring Environment (VAE) 136. The VAE 136 may allow video authors to generate video data from a video creation device 138. The video creation device 138 may be a video camera, a virtual reality environment creator (e.g. using virtual reality markup language (VRML)), three-dimensional modeling software, stop-time photography, image creation and editing devices (e.g. drawing tablets, photo editing software, still cameras, etc.), audio creation devices (e.g. microphones, audio processing software, etc.), text creation devices (e.g. keyboards, text editors, etc.), or any other device capable of creating data which may become part of a video file. The VAE 136 may be one of the applications handled by the application server 110 or a separate application which communicates with components of the system, for example, through the network 130. The VAE 136 may alternatively be an application of or in communication with the video server 112.

In some embodiments, certain components of the system 100 may be part of a subsystem 140. The subsystem 140 may be owned, controlled, operated, maintained, or otherwise associated with a host party. For example, the network 130 may be an external network, and one company may own and operate all the system components on one side of the network. In the illustrated case, one company may own a subsystem 140 comprising the application server 110, video server 112, cue point server 114, authorization server 122, and all the applications associated with those servers, including the VEE 116 and VPE 118. It will be appreciated that many types of ownership arrangements, system and subsystem configurations, and network arrangements are possible.

Figure 1B:
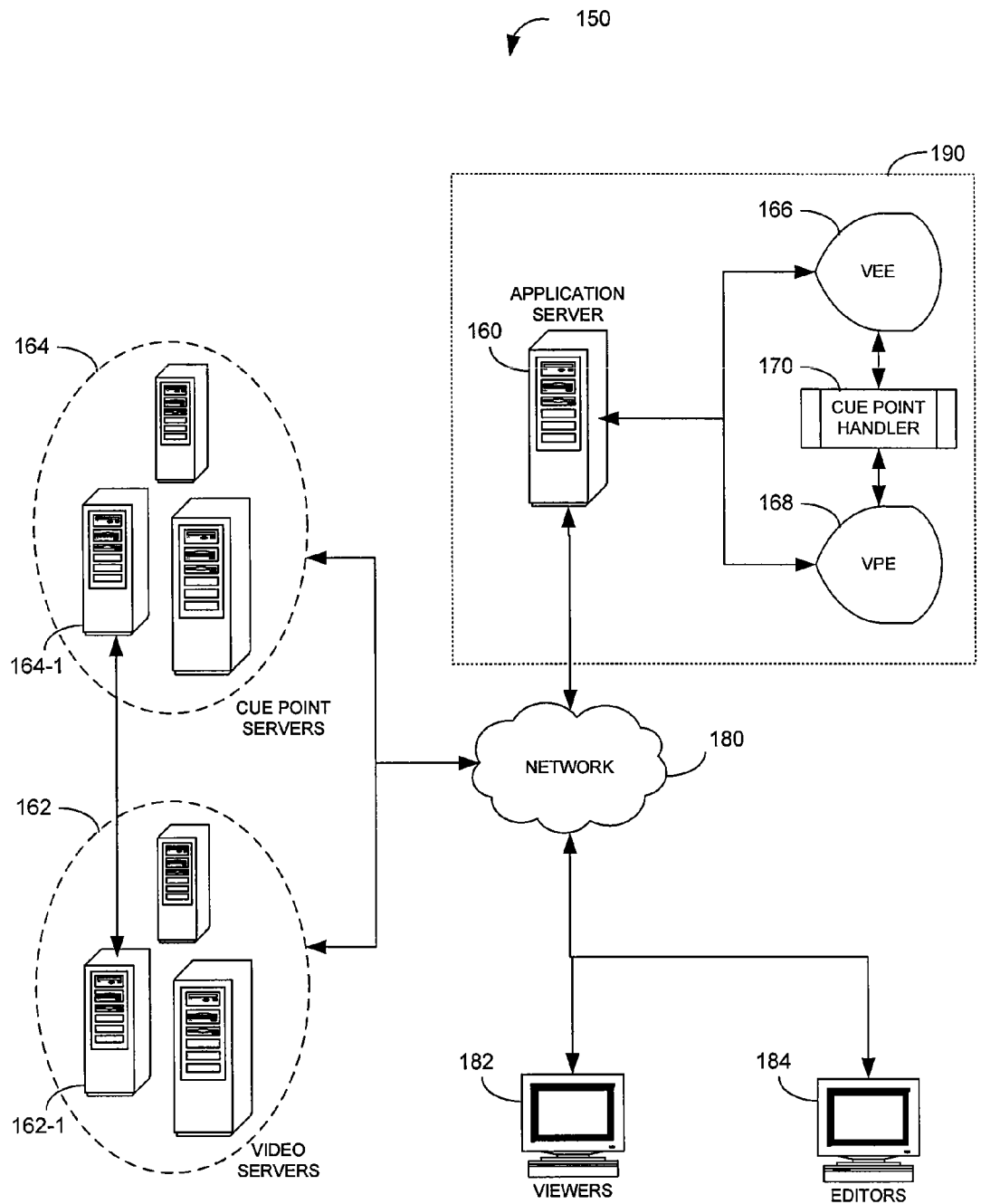
FIG. 1B provides another exemplary system diagram for handling video cue points for use with various embodiments of the invention.

FIG. 1B provides another exemplary system diagram for handling video cue points for use with various embodiments of the invention. The system 150 comprises an application server 160 configured to handle applications, including a VEE 166 and a VPE 168, both of which may comprise or communicate with a cue point handler 170. The application server 160 is in communication with a network 180. The application server 160 is also in communication with video servers 162 and cue point servers 164 via the network 180.

In this system 150, viewer terminals 182 and editor terminals 184 may connect to the application server through the network 180. The application server 160 may then communicate with multiple video servers 162 and cue point servers 164 also via the network 180. Further, some video servers 162-1 may communicate directly with some cue point servers 164-1.

For example, a viewer may wish to use a viewer terminal 182 to play "VID_0001.video," a video file. The viewer terminal 182 may contact the application server 160, which may execute the VPE 168 application. The VPE 168 may then search for and locate both the "VID_0001.video" file and its associated cue point information on a video server 162-1 and cue point server 164-1, respectively, both of which may be connected to the Internet 180. Through the VPE 168 application, the viewer may be able to download the "VID_0001.video" file and its cue point information and play the file through the viewer terminal 182.

As illustrated, the application server 160 and its associated applications are part of a subsystem 190 which may be owned or operated by one party. Whereas the host of the system 100 in FIG. 1A may control a number of system components, including the video servers 112 and cue point servers 114, the host of the system 150 in FIG. 1B only controls the application level of the system. In these embodiments of the system 150, the actual video and cue point data may be distributed widely across one or more networks 180, with the subsystem 190 performing a more intermediary role.

It will be appreciated that the many embodiments of the present invention may be realized in the context of many different types and scopes of systems. As such, the systems described herein in reference to FIGS. 1A and 1B should be construed as only exemplary systems of the invention and the invention should be construed broadly to encompass all systems which may effectuate the invention.

Client Authorization Methods

Embodiments of the invention may load one or more applications relating to editing or playback of video data. Prior to loading any of these video environments, however, it may be desirable in some cases to determine whether a client has appropriate authorization to access an environment or application. In some embodiments, authorization relate, at least partly, to login information associated with the client attempting access.

Figure 2:
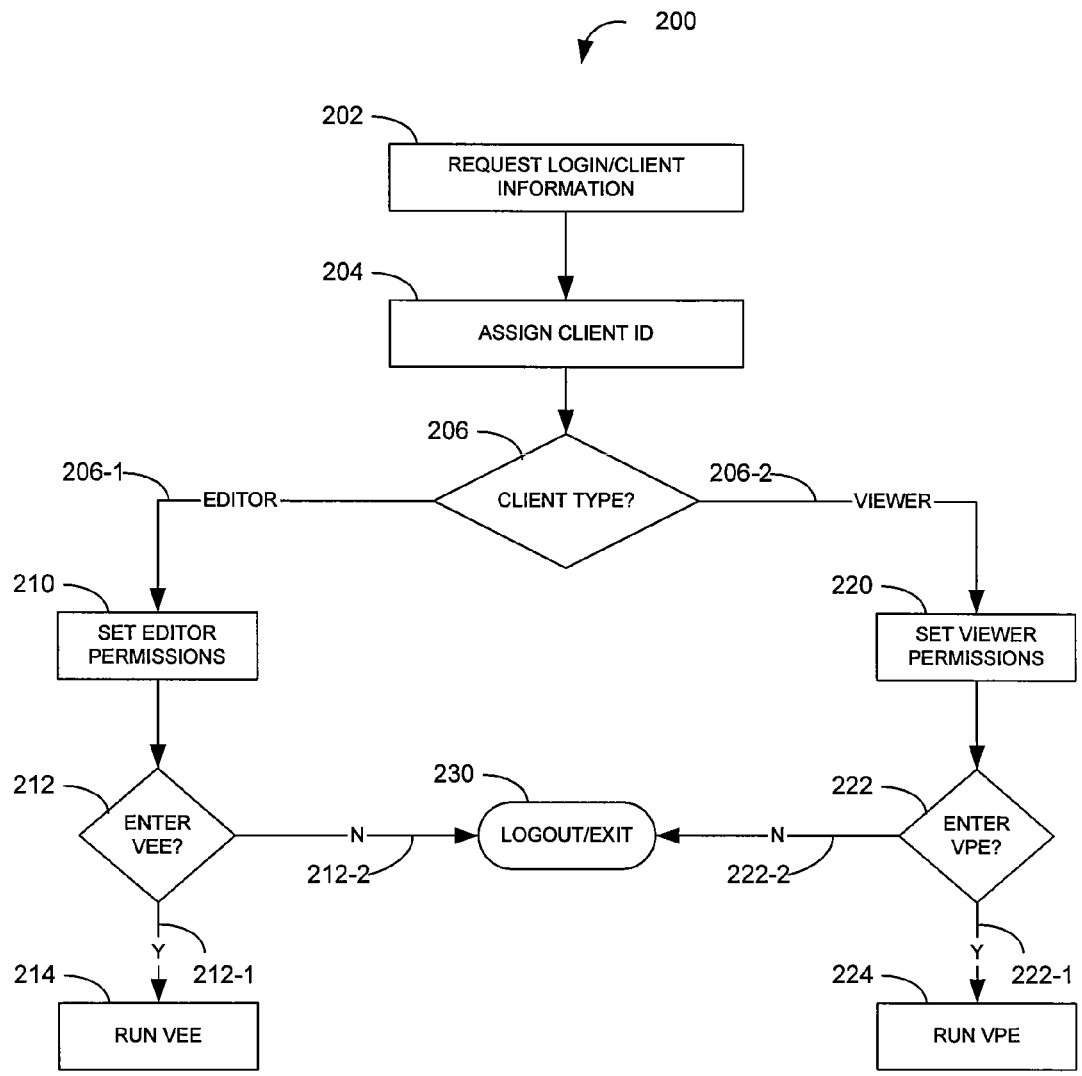
FIG. 2 provides an exemplary flow diagram summarizing methods for determining access to video environments in various embodiments of the invention.

FIG. 2 provides an exemplary flow diagram summarizing methods for determining access to video environments in various embodiments of the invention. The method 200 may begin by requesting login or client information 202 from the party requesting access to the video environment or application (the client). This information may be requested 202 from the client and/or from other systems or applications.

For example, the client may provide information like a login identifier and a password, or any other desired or required information for determining the client's level of authorization. If this is the client's first login (or if the client wishes to add or modify her information), the client may desire or be required to provide more profile information to help determine an appropriate level of access. In one example, the client may have to provide an association from or verification by an approved organization, like a business identifier for an approved real estate company. In another example, by uploading a video file, the method 200 may add that file to the client's list of files to which the client has editor permission.

Additionally, or alternatively, relevant information may be stored on one or more other system, file, application, etc. For instance, after providing a login name and password, an authentication server may check the login information against a database to determine certain authorization-related attributes associated with that client. These authorization attributes may include, for example, files to which the client has access, whether the client has editing (e.g. read, write, modify, delete, etc.) permissions on those files, or any other attributes useful to determining level or type of access.

It will be appreciated that login information may be requested 202 for various purposes, and that different types of information may be useful for these different purposes. In certain embodiments, for example, the login information may be used to determine which clients are logging in and how often, or which files or applications are accessed by those clients most often. In other embodiments, the information may be used to provide or limit access to all or part of various environments.

Once the login information has been requested 202, the method 200 may assign a client identifier 204 to the client. Assigning this identifier 204 may involve assigning a login name, password, or other identification information to the client; and/or it may involve creating a unique identifier which can be used by various systems, applications, etc. for identifying that client.

Also, after a client has entered enough profile information, the method 200 may determine the client type 206. In some embodiments, this will include a determination of whether the client is an editor or a viewer. It will be appreciated that many other client types may be desirable for different environments. For example, it may be desirable to determine whether the client is an advanced or novice client, whether the client is bound by certain contractual obligations, whether the client's use falls within certain payment plans, etc. Further, of course, the client may be a different type of client depending on the file or files to which she is attempting access. For example, the client may be an editor for all files which she uploaded to the system, a viewer to all files uploaded by others and marked as public, and neither a viewer nor an editor for any files marked private or not yet published.

If the client is determined to be an editor 206-1, the method 200 may set certain editor permissions 210. These permissions may allow or deny access to certain applications, files, controls, fields, menus, etc. At this point, the method 200 may determine whether the editor would like to (or is able to) enter the VEE 212. If the editor will enter the VEE 212-1, the method 200 may run the VEE 214. If the editor will not (or cannot) enter the VEE 212-2, the method 200 may terminate 230. Terminating 230 may involve logging the client out of the method 200, redirecting the client, or any other useful termination procedure.

If the client is determined to be a viewer 206-2, the method 200 may set certain viewer permissions 220. These permissions may allow or deny access to certain applications, files, controls, fields, menus, etc. At this point, the method 200 may determine whether the viewer would like to (or is able to) enter the Video Playback Environment (VPE) 222. If the viewer will enter the VPE 222-1, the method 200 may run the VPE 224. If the viewer will not (or cannot) enter the VPE 222-2, the method 200 may terminate 230.

Video Editor Environments

Figure 3A:
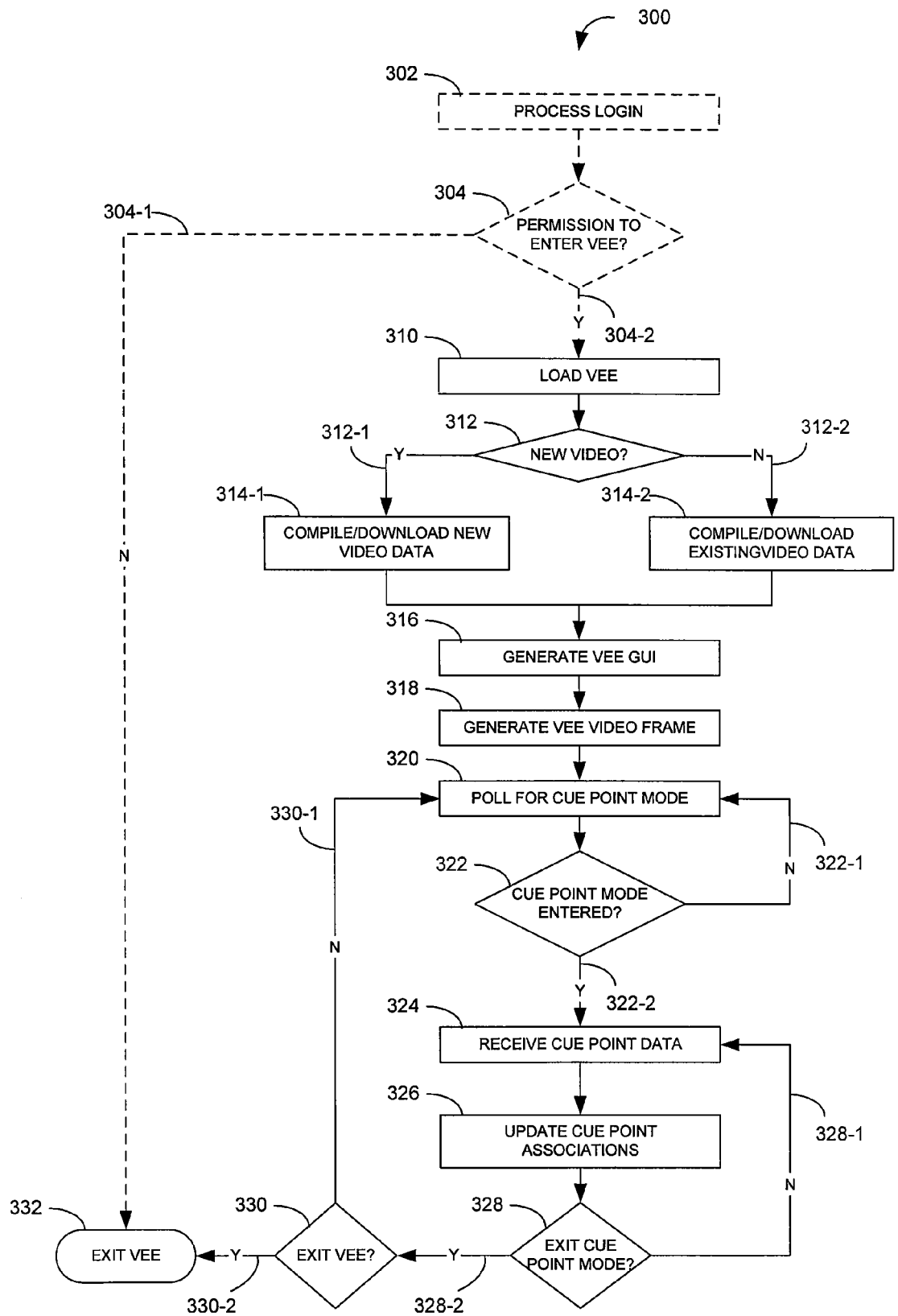
FIG. 3A provides an exemplary flow diagram summarizing methods relating to video editor environments in various embodiments of the invention.

FIG. 3A provides an exemplary flow diagram summarizing methods relating to video editor environments in various embodiments of the invention. The method 300 may begin by loading a video editing environment (VEE) 310. Loading the VEE 310 may involve executing an application invoking various software and/or hardware commands. It will be appreciated that the VEE may be loaded 310 in any useful way to provide the desired results. For example, the VEE may load as a script in the background of a webpage, as a server-level application, as a client-level application, or with various components of the application loading in different ways.

Prior to loading the VEE 310, the method 300 may require certain set-up steps. For example, the method 300 may process login 302 of a client. In certain embodiments, the method may process the login 302 to maintain records of the clients of the method 300. For example, it may be desirable to know who uses the method 300 and how often, or which files or applications are accessed most often.

In other embodiments, processing the login 302 may require that the client enters certain login information to determine the client's level of authorization. For example, it may be desirable to limit access to the VEE only to certain types of clients. Similarly, it may be desirable to open access to the VEE, but limit access to certain files. In the latter case, it may be necessary as part of processing the login 302 to acquire information from the client regarding which files the client intends to access. In these embodiments, the method 300 may determine based on the login information whether the client has permission 304 to access all or part of the VEE. For example, the system may deny access based on stored attributes associated with the client (e.g. a level of authority attribute), inferred attributes based on extrinsic information (e.g. time of day, geographic location associated with the client's Internet Protocol address, etc.), incorrect provided information (e.g. client name and password do not match those on file, etc.), technical information (e.g. client terminal does not meet the minimum system requirements), or any other information which may be used to determine level of access. If the client does not have permission 304-1 to access the VEE or the desired files, the method 300 may terminate 332. If the client does have permission 304-2 to access the VEE or the desired files, the method 300 may continue to load the VEE 310.

Once the VEE is loaded 310, the method 300 may determine whether the client is attempting to use a new or existing video 312. If the client is attempting to use a new video 312-1, the method 300 may acquire the new video information 314-1, for example by uploading, downloading, transferring, or compiling the video data. If the client is attempting to use an existing video 312-2, the method 300 may acquire the existing video information 314-2 from wherever it is stored, for example from a video server.

The method 300 may then generate a VEE graphical user interface (GUI) 316. This interface may comprise any graphical, textual, audio, or other data which is desirable or necessary for providing interface capabilities to a client. It will be appreciated that the GUI does not require any graphical interface elements. For example, it may be possible to create an interface which uses only text, sound, or some other interface capability. Say the client of the VEE is actually another computational system. In that case, the client system may interact with the VEE at the script (or other) level, making graphical controls superfluous.

It will be appreciated that the GUI may be generated 316 in any useful way for providing a useful interface to the VEE. For example, the GUI may be generated 316 as a webpage on a client's web browser, as a frame within a webpage, as a dedicated client-level application on the client's terminal (with the VEE itself running either at the client- or server-level), or as a background script to be executed by another application (e.g. as Visual Basic commands for an interpreter which may use those commands to generate the GUI).

The GUI may comprise such useful elements as a video frame for displaying video information (e.g. an imbedded video player), video controls (e.g. play, pause, fast forward, rewind, volume control, etc.), navigational buttons (e.g. an "Exit the VEE" button), or informational text fields. Further, the GUI may comprise any other desired elements, such as aesthetic components (e.g. borders, logos, images, etc.), or advertisements. In certain embodiments, the GUI elements will be embedded within the context of another environment (e.g. webpage, application, etc.). For example, an environment may be created and highly branded by a certain company which uses the method 300 to handle its video editing functionality. In that case, the environment may comprise many elements which are independent of the GUI, and the GUI may provide only a minimal number of controls, fields, etc. for editing a video file, when needed or desired.

It will be appreciated that the GUI elements may be dependent on or independent of aspects of the loaded VEE instance. In some embodiments, the VEE GUI may look identical, regardless of any external information being passed to it (except, of course, the actual video file being played, the specific cue point information, etc.). In other embodiments, the VEE GUI may adapt or modify based on extrinsic information, like attributes of the client, the video file, the cue point information, etc. In one example, if the client's name is John and the time of day is the afternoon, the GUI may modify a text field to state "Good Afternoon, John." In another example, if the video file relates to real estate, advertisements may appear within or along with the GUI relating also to real estate. In yet another example, the GUI may recognize the skill levels of clients, providing different types of controls and options to advanced clients than to novice clients. It will be appreciated that many types of tailored content are possible, based on the various types of information available to the VEE.

Either separately or as part of the GUI, the method 300 may generate a video frame 318 for displaying video information. Generating the video frame may 318 may utilize, comply with, or be compatible with a number of different technologies. For example, different video files may be encoded, transcoded, or stored in different formats or using different public or proprietary algorithms or standards. Further, video files may load in various ways, including as a complete file, streaming, or progressive. Progressive loading of video files, for example, allows the video frame to begin playing the portion of video data which has already loaded while the remainder of video data continues to load. Alternatively, video may load in a non-linear fashion. For example, different portions of the video may load from different servers, at different rates, etc, or a client may force a portion of the video to download out of order (e.g. by selecting a cue point location relating to video data which had not yet loaded).

The video frame may also comprise its own GUI elements, including video and audio controls, and text fields. For example, the video frame may generate 318 along with a virtual play/pause button, volume controller, equalizer, etc. Further, the video data may comprise and/or be associated with other data, including text descriptions, audio information, and cue point information. Some or all of this information may also be displayed within the video frame, or locations for displaying this information may be generated along with the video frame.

In one example, the video frame may comprise a field spanning a lower portion of the frame in which text information may appear (e.g. subtitles, captions, or comments). This field may be independently controllable or editable, for example to take up the lower fifth of the frame, to have a thirty-percent translucent grey background with black text, etc. This text information may also provide various amounts of functionality. For instance, the text information may be indexable, searchable, or selectable (e.g. able to be copied to a text file); it may be related to video data, cue point information, or user data; it may be auto-generated based on audio or video recognition, patterns of user activity; it may be generated by acquiring from external sources, like Really Simple Syndication (RSS) feeds, or web logs (blogs); etc.

In another example, the video data may be associated with a set of cue point data relating to a set of cue points. Either as part of the GUI generation 316 or the video frame generation 318, cue point navigation buttons may be generated for each cue point. Further, these cue point buttons may load progressively along with the video data, so that cue points become visible or active only after all or part of their respective portion of the video data has loaded. Additionally or alternatively, cue points may be made active before the respective video data downloads. For example, when a cue point button is selected, video data may begin to download from the associated cue point location. When the desired video data has loaded, other video data may continue to load in any desirable order (e.g. continue from that time position forward, continue from the beginning of the video file, etc.).

As the elements load (or in some embodiments, after the elements have loaded), the VEE may provide interactive editing capability. As part of this interactivity, the method 300 may have to poll for interactivity. It will be appreciated that in some embodiments, cue point edit mode will always be available, while other embodiments may require active entry into that mode, for example by polling for input. Polling may require, for example, waiting for a particular event from an input device, like a mouse or keyboard. Specifically, the method 300 may poll for entry into cue point edit mode 320. While polling for entry into cue point edit mode 320, the method 300 may continually determine whether the cue point edit mode has been entered 322. If the cue point edit mode has not been entered 322-1, the method 300 may continue to poll for entry into cue point edit mode 320.

If the cue point edit mode has been entered 322-2, the method 300 may proceed by receiving cue point data 324. Different data may be received 324 from different locations. For example, cue point data may be received 324 from the client by entry from an input device (e.g. keyboard, mouse, voice input, etc.), from a cue point database containing related attributes, by contextual inference (e.g. audio or image recognition from the video file, time or date information from the computer's Basic Input Output System (BIOS), etc.), or from any other useful source.

Further, depending on the type of cue point editing, different types or amounts of cue point data may be desired or required. In one example, if a client wishes to insert a new cue point, she may pause the video at a given playback location (e.g. by clicking a pause button or by beginning cue point entry in some other way) to assign the cue point a location, enter characters to assign the cue point a name, and submit or save the cue point data to a file. In another example, a client may enter a screen which may allow entry of different types of cue point data. Also in some examples, the video may continue to play while the cue point editing proceeds.

Even further, the cue point editor may be configured to receive information relating to multiple cue points. In one example, before entering the cue point editor, the client may flag a number of cue point locations. The cue point editor may then allow the client to enter information for each of the cue points in series, for all of the cue points in parallel, or in any other useful way. In another example, before entering the cue point editor, the client may flag a number of cue points for editing. The cue point editor may then allow the client to enter information which relates to multiple cue points simultaneously.

Any or all cue point information may be entered for new cue points and or for modifying existing cue points. Further, receipt of cue point data 324 may involve receipt of a request to remove certain data or an entire cue point reference. Clients may have the same or different authorization within the VEE to add, modify, and/or delete cue point information.

During or after cue point information is received 324, the method 300 may update cue point associations 326. Updating cue point associations 326 may comprise storing, modifying, removing, or otherwise processing information stored in relation to cue points, video files, or other data. In one example, a client may choose to save new cue point information, at which point the method 300 may save the information to a relational database stored on a cue point server with an attribute pointing to the loaded video file. In another example, the name of the cue point may be saved to a database which records cue point names and the number of times those (or similar) names occur within a set of video files.

Further, cue point associations may be updated 326 in any useful way, including after submission, after exit from the VEE, or substantially in real time. In some embodiments, the information may be maintained within files on a server. These files may be continually or periodically updated during the cue point editing process. In other embodiments, the client may be working with very large files, large numbers of cue points, limited bandwidth, limited network reliability, or other technological limitations. In these environments, or for other reasons, it may be desirable or necessary to temporarily store all information affected by the editor in local files. These local files may reside in one or more locations, including as temporary files on the client's terminal or in temporary files on the server computer. The final updated information may then be saved to databases or other, more permanent, storage locations when the client uploads the information or exits the VEE.

Even further, the client may be able to edit multiple cue points at once. This may involve receiving cue point data 324 and updating cue point associations 326 for multiple cue point files either in series or in parallel.

When the cue point edit mode has received cue point data 324 and updated cue point associations 326, the method 300 may determine whether the client wishes to exit the cue point edit mode 328. If the client doe not wish to exit the cue point edit mode 328-1 (e.g. the client wished to continue editing the cue point or cue points), the method 300 may continue to receive cue point data 324.

If the client wishes to exit the cue point edit mode 328-2, the method 300 may then determine whether the client wishes to exit the VEE 330. If the client does not wish to exit the VEE 330-1, the method 300 may return to polling for re-entry into the cue point edit mode 320. If the client wishes to exit the VEE 330-2, the method may terminate 332.

Figure 3B:
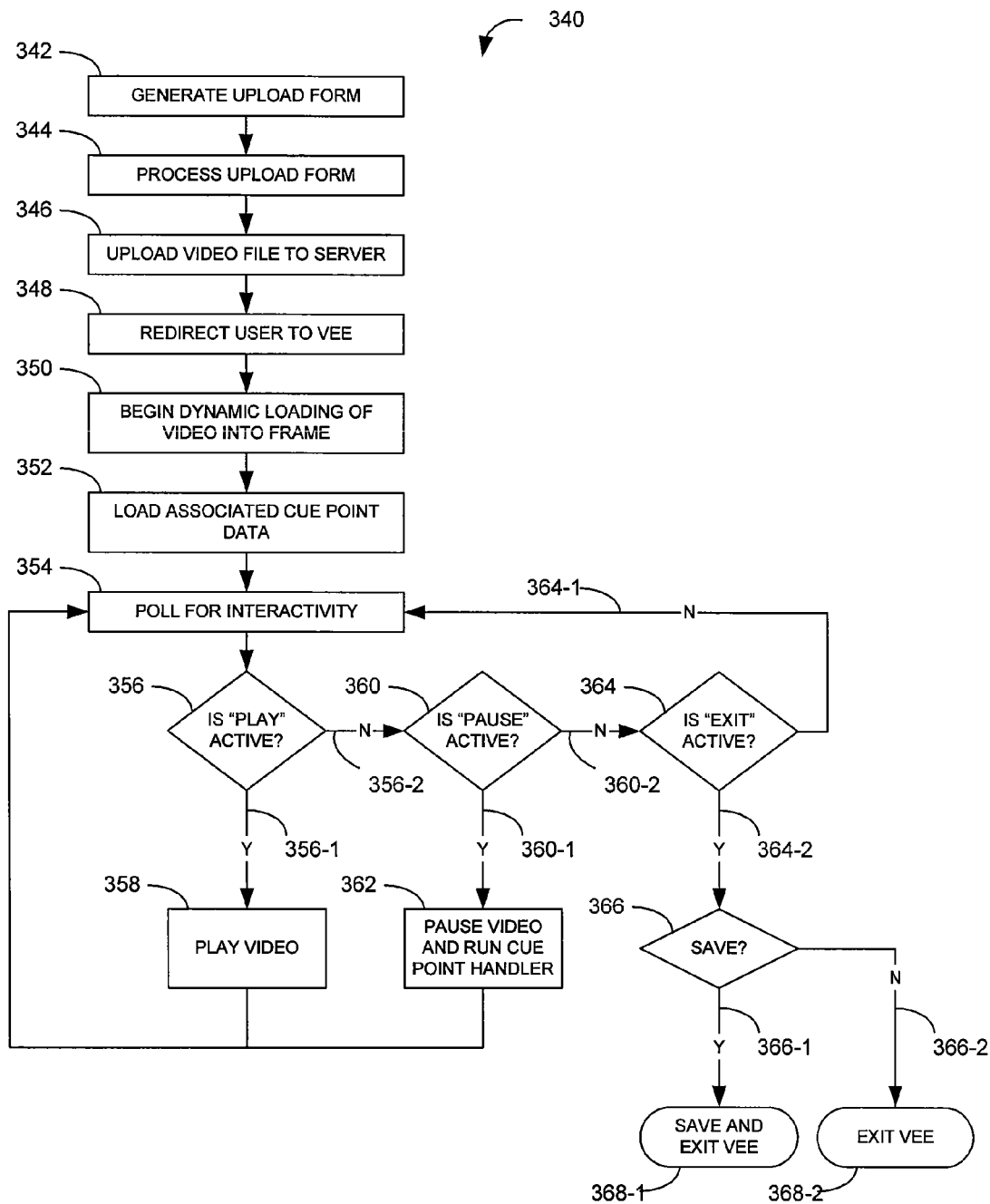
FIG. 3B provides an exemplary flow diagram of video editor environment method embodiments according to the invention.

FIG. 3B provides an exemplary flow diagram of video editor environment method embodiments according to the invention. The method 340 begins by generating an upload form 342 for uploading a new video. The upload form may be a standard for stored as part of the VEE application or stored in a different location. Alternatively, the upload form may be dynamically generated 342 from one or more scripts. The scripts may acquire information used to generate the form 342 from one or more sources, including from the client, the host, a database, etc. The upload form may comprise one or more fields for receiving data relevant to uploading a file, for example a video file.

After the upload file has been generated 342, the method 340 may process the upload file 344. Depending on the type of upload file, there may be various ways to process the upload file 344. In one example, if the upload file is a formatted form viewable to a client, processing the upload file 344 may require processing the information within the form (e.g. by parsing, concatenating, searching, sorting, etc.). In another example the upload file may comprise various file fields which may be interpreted by one or more scripted algorithms (e.g. by a Common Gateway Interface (CGI) script) in the background of the method 340.

Using information from the upload form, and possibly also other information, the method 340 may then upload the video file 346. Uploading the video file 346 may transfer the video data and/or any related information from any useful location to any useful location. For example, the video data may be uploaded from the client's computer to a video server, from one video server to another video server, or from a video server to an application server where the VEE resides. Uploading the video file 346 may comprise any number of useful data processing algorithms, in addition to storing the video file. For example, during uploading 346, the method 340 may also create one or more video identifiers (e.g. a unique video identification number), convert the video data (e.g. translate the data to a given file format, encode or transcode the video file, down-sample the video file to lower the file size or resolution, split the video file into separate packets, normalize the audio volume, etc.), infer related data (e.g. use various video or audio processing algorithms to identify certain types of data within the file), associate data to the video (e.g. store the client's name, create a timestamp for the video, etc.), or perform any other useful function.

During or after uploading the video file 346, the client may be redirected to a VEE 348. As part of redirecting the client to the VEE 348, the method 340 may associate the VEE to information relevant to editing the video file. In one example, the method 340 may redirect the client to the VEE 348 through a function call that loads the VEE application with variables, such as the video file name. In another example, the VEE application may load along with files (or pointers to files) containing video data, cue point data, GUI data, and any other relevant data.

In some embodiments, the method 340 may begin dynamic (or progressive) loading of the video data 350. Dynamic loading of the video data 350 may allow the client to play downloaded portions of the video while remaining portions of the video continue to download. This dynamic loading of the video data 350 may be represented on the VEE GUI as a progress bar or any other useful technique.

Further, in some embodiments, the method 340 may load associated cue point information 352. Loading associated cue point information 352 may involve loading pointers to locations within a cue point file or database, loading cue points with related data, or any other useful loading method. Additionally, loading associated cue point information 352 may be executed dynamically, so that cue points become visible or interactive only as certain information becomes available. For example, if the cue points relate to specific time positions within a video file, it may be desirable to activate cue points only after the related time positions of the video file load. Say a cue point refers to a location three minutes into a video file. It may be desirable in this case to load that cue point (or to make the cue point active for interaction by the client) only after the first three minutes of the video file have loaded.

Alternatively, cue points may be activated before their respective video data loads. For example, cue points may load when the video data begins to download. When a client selects a cue point before its respective video data has loaded, the video data may begin to progressively download from that cue point time position. When the video data for that cue point has finished loading, other video data may continue to load in any desirable order.

It will be appreciated that there are many ways to store and load this data within the context of the invention, and these ways may differ depending on the type of data being loaded. For example, the VEE GUI may load using function calls within the VEE application, the video may load 350 along with a video player application (like Adobe® Flash®) embedded in the VEE GUI, and cue point information may load 352 by executing scripts on one or more servers (e.g. CGI scripts, Structured Query Language (SQL) queries, etc.).

Once various interactive elements of the VEE have loaded, the method 340 may poll for interactivity 354. Polling for interactivity 354 may involve waiting for the client or some other interactor to interact with a GUI control, VEE elements, or any other method of receiving interactivity. For example, the GUI may comprise certain controls, like virtual buttons and knobs. The method 340 may poll for interactivity 354 by waiting for the client to interact with one of those GUI controls.

In some embodiments, the client may enter the cue point edit mode by pausing the video file at the location where she desires to insert a cue point. In these embodiments, the method 340 may determine whether the play button is active 356. For example, the VEE GUI may provide the client with a virtual play/pause toggle button, and determining whether the play button is active 356 may involve determining whether the toggle button is in "play" mode. If the play mode is active 356-1, the method 340 may play (or continue to play) the video file 358. It will be understood that, if the video is still being streamed or progressively downloaded, the method 340 may have to stop or pause video file playback while more video data loads. While the video continues to play and/or load, the method 340 may continue to poll for interactivity 354.

Of course, the client may enter the cue point edit mode in any useful way. For example, the client may click on a video image in the video frame to enter a cue point edit mode. For another example, the client may select a GUI control dedicated to providing entry into the cue point edit mode. For yet another example, the client may select a portion of the video progress bar to set a cue point entry location and enter the cue point edit mode. Further, the video may or may not pause upon entry into the cue point edit mode.

If the play mode is not active 356-2, the method 340 may determine whether the pause mode is active 360. If the pause mode is active 360-1, the method 340 may pause the video file and run the cue point handler 362. Pausing the video file and running the cue point handler 362 may allow the client to add or edit the cue point information associated with the video file. The method 340 may allow the client to exit the cue point handler in any effective way, including, for example, by activating the play control or by selecting a submit control. When the client exits the cue point handler, the method 340 may continue to poll for interactivity 354.

If the play mode is not active 356-2, and the pause mode is not active 360-2, the method 340 may determine whether the exit mode is active 364. If the exit mode is not active 364-1 (e.g. there is no interactivity, according to the illustrated embodiments), the method 340 may continue to poll for interactivity 354. If the exit mode is active 364-2, the method 340 may determine whether the client would like to save 366 what she edited. If the method 340 determines that the client would like to save 366-1, the method 340 may save and exit 368-1. If the method 340 determines that the client would not like to save 366-2, the method 340 may exit 368-2 without saving.

Figure 3C:
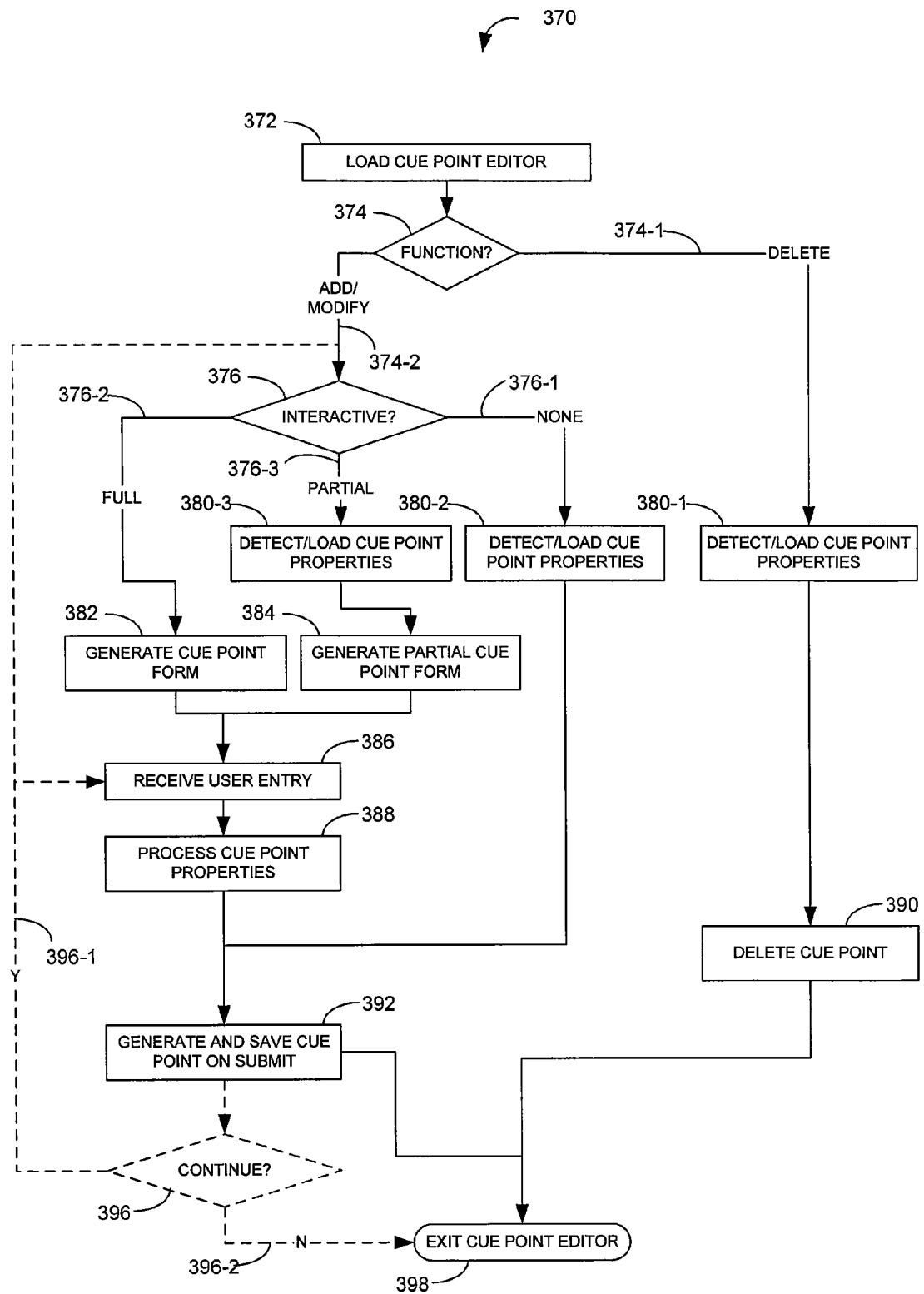
FIG. 3C provides an exemplary flow diagram of cue point editor method embodiments according to the invention.

FIG. 3C provides an exemplary flow diagram of cue point editor method embodiments according to the invention. The method 370 begins by loading a cue point editor 372. The cue point editor may be loaded 372 by loading a separate application, loading a function or process within another application, or in any other useful way. Further, the cue point editor may have been loaded previously such that loading the cue point editor 372 merely reactivates the process. For example, the cue point editor may be running as a background process, and loading the cue point editor 372 may move the process to the foreground.

Additionally, it will be appreciated that loading the cue point editor 372 may manifest to a client in any way which provides access to the client. In some embodiments, the cue point editor may load 372 into a separate window, a separate GUI, a separate frame within an existing window or GUI. In some other embodiments, the cue point editor may load 372 by making new GUI controls and/or fields appear, by activating existing GUI controls and/or fields, or by modifying an existing GUI or display to allow for client interactivity.

Either before, during, or after the loading of the cue point editor 372, the method 370 may determine the editing type 374 which is desired. Cue point editing types may include, for example, adding, modifying, or deleting cue point information. The method 370 may determine the editing type 374 in any effective way. In one example, loading the cue point editor 372 may include passing a variable to represent the editing type. In another example, sometime after loading the cue point editor 372, the client may provide the cue point editing type, e.g. through some input device.

When the method 370 determines that the client desires to delete cue point information 374-1, the method 370 may detect or load relevant cue point properties 380. It will be appreciated that many types of cue point information may be possible, including textual information (e.g. name, description, etc.), time information (e.g. time position within the video file, time range associated with the video file, etc.), aesthetic information (e.g. font size, font color, icon, associated image, thumbnail information, etc.), hierarchical information (e.g. whether the cue point is the parent or child of another cue point), GUI information (e.g. cue point button size, physical location related to video frame, etc.), or any other useful information. The availability of these types of cue point information may depend on the client's authorization level, type of cue point, available information, and other parameters. Further, even where these types of information are available, they may or may not be accessible or editable to any or all clients.

Cue point information may also be loaded or detected 380 in any effective way. In some embodiments, some information may be stored along with a cue point identifier. For example, cue point "CP_0001" may be stored as an entry in a relational database along with various related attributes. Those attributes may include some or all of the various types of cue point information. In other embodiments, information may be detected from one or more contexts. In one example, say a client paused playback of a video file before entering the cue point editor. The method 370 may be able to use the currently loaded video file name and the current time position of the video playback to determine which cue point is being edited and other related information. In another example, the method 370 may be able to use video, audio, text, or other recognition algorithms to infer content-related information. In yet another example, the video file may contain certain header information which provides cue point information to the method 370.

When loading or detecting cue point information for deletion 380-1, the information may be retrieved from any useful location. When a cue point is selected for deletion, the method 370 may set up a pointer to or may download information associated with that cue point (e.g. stored in relation to that cue point). Depending on certain parameters, the client may delete some or all of the information associated with the cue point, or the cue point itself.

Additionally, the information for deletion may load into any useful environment. In some embodiments, the client may not be able to delete certain information without deleting the entire cue point. In these embodiments, the client may only have access to some interface element which allows deletion, without having access to further options. In one example, a GUI may provide a virtual "delete" button next to a cue point access button, which deletes the adjacent cue point when pressed (e.g. clicked with a mouse). In another example, after selecting a cue point, the client may be able to press the "delete" button on her keyboard to delete the selected cue point. In other embodiments, the client may be able to delete certain cue point information without deleting the entire cue point record. In those embodiments, it may be necessary or desirable to provide the client with a way to access that information. For example, a new GUI, window, or frame, or new elements in existing display elements may be required.

Once the cue point information is ready to be deleted, the method 370 may delete the information 390. It will be appreciated that many types of deletes may be desirable. In some embodiments, the client will delete all or part of the cue point information, and the method 370 may remove the information from the location where it is stored. In other embodiments, other deletes may be possible. In one example, it may be desirable to delete some information specifically relating to a cue point, while retaining certain template information. In a second example, a client may keep the name of the cue point as part of a list, but remove all the other information associated with the cue point. In a third example, a client may retain the information associated with a cue point, but delete the pointer or association between the cue point and the video file or other cue points.

Before deleting the information 390, the method 370 may ask for verification from the client. In some embodiments, the method 370 may prompt the client to take multiple steps before effectuating the delete. For example, after clicking a "delete" button, a dialog box may appear on the screen, asking "Are you sure you want to delete the cue point?"; and the client may be required to click a "Yes" button before the method 370 will delete the cue point. In other embodiments, the method 370 may determine whether the client has sufficient authority to delete the cue point information before effectuating the deletion. In other embodiments, the method 370 may temporarily place deleted files into a temporary file, deleting the files permanently only after the occurrence of some other event. For example, deleted files may be placed in a "trash can" file until an authorized client empties the "trash can" file.

After the cue point information is deleted 390, the method 370 may terminate 398. Termination 398 may involve a number of steps. For example, the method 370 may exit the client from the cue point editor. Additionally, the method 370 may terminate the process which is running the cue point editor.

Alternatively, the method 370 may close the application, but keep the process running in the background.

In many cases, the method 370 may determine that the client desires to add or modify cue point information 374-2. There may exist may types of addition or modification of cue point information. Adding cue point information may include such cases as creating a new cue point, copying or saving an existing cue point's information into a new cue point entry, duplicating an existing cue point and associating the duplicate either with a new time position or another video file, creating a new cue point from a template or default, creating a new cue point within a hierarchical structure, or any useful type of creation of cue point information. Modifying cue point information may include such cases as changing various attributes of an existing cue point (e.g. the cue point's name or time position), changing the associations between an existing cue point and either a video file or other cue point information, or any other useful type of modification to existing cue point information.

When the method 370 determines that the client desires to add or modify cue point information 374-2, the method 370 may determine the level of client interactivity 376. In various embodiments, levels of client interaction may include no interactivity, full interactivity, and one or more levels of partial interactivity in-between. The method may determine the level of interactivity 376 in different ways. In one example, the client may dictate the level of interactivity by providing that level to the method 370 from some input device. In another example, different levels of client may automatically be provided with different levels of interactivity (e.g. novice clients may be provided with no interactivity, while advanced clients may be provided with full interactivity). In yet another example, the level may be determined 376 based on available information, or the ability of the method 370 to provide the interactivity desired.

In the illustrated embodiments, there are three levels of interactivity: none 376-1, full 376-2, and partial 376-3. In some cases, the method 370 may determine that no interactivity will be provided 376-1. In these cases, the method 370 may detect and/or load all desired or required cue point properties 380-2 in any effective way from any useful source. In some embodiments, when a cue point is modified, the method 370 may search for attribute information in a relational database which is stored in relation to an identifier associated with the cue point to be modified.

In other embodiments, information may be inferred or detected from various types of contextual information. For example, before loading the cue point editor 372, a different method may have paused the video file at two minutes. The method 370 may then be able to infer that the time position for a new cue point should be two minutes, and the new cue point should be associated with the video file which was being played. In another example, the method 370 may attribute the new cue point with a time and date of creation, which it may be able to infer based on the system clock of a computer performing the method 370. In yet another example, the method 370 may be able to associate certain permissions and a creator name with the new cue point based on the login information of the client using the method 370. In still another example, one or more cue point locations may automatically be identified (e.g. by audio or video recognition).

When the method 370 determines that full interactivity will be provided 376-2, the method 370 may generate a cue point information form 382. Generating the cue point information form 382 may involve any process by which the method 370 may solicit the desired or required cue point data from a client. It will be appreciated that in different cases, different types of cue point information may be desired or required as part of the cue point creation or modification.

In some embodiments, the method 370 may open a new window, frame, or portion of the GUI which may provide various fields and/or controls relating to different types of cue point information. The client would then be able to input cue point information into the form by using some or all of these fields and/or controls. Further, the fields and/or controls may be tailored or may have restrictions based on the associated type of cue point information. In one example, a client may enter the cue point name in a text string field which allows a maximum length of thirty characters. In another example, a client may select a cue point name from a list of common or acceptable cue point names provided in a drop-down list. In yet another example, the client may provide the cue point name by saying the name into a microphone (after which point the method 370 may use various voice-recognition algorithms to convert the audio into a textual representation of the cue point name).

In some cases, the method 370 may determine that partial interactivity will be provided 376-3. In these cases, the method 370 may detect and/or load some of the desired or required cue point properties 380-2 in any effective way from any useful source. After detecting or loading some cue point properties 380-2, the method 370 may generate a cue point information form 384 to solicit the remaining desired or required cue point information from a client.

Whether the method 370 generates a full cue point information form 382 (the method 370 determines that full interactivity will be provided 376-2) or a partial cue point information form 384 (the method 370 determines that partial interactivity will be provided 376-2), the method may then receive cue point information from a client. The client may be any effective provider of the desired or required cue point information, including a human client of a client terminal, a computer (e.g. automated or artificial intelligence) client of a client terminal, an application running compatible and interfacing processes or functions, or any other information provider.

It will be appreciated that there are many ways to solicit input from the client for this purpose. For example, there are many types of GUI fields and controls (e.g. text fields, radio buttons, sliders, check boxes, drop-down menus, etc.), many types of input devices (e.g. keyboard, mouse, microphone, scanner, optical character recognition system, writing tablet, computer script, etc.), and many types of potentially editable cue point information. Some or all of these options may be provided or limited, possibly based on various factors, including a component's technical capabilities, a client's permissions, or a cue point's type.

It will further be appreciated that the level of interactivity determination 376 may occur multiple times and for various reasons, and that the result may change over time. In some embodiments, the method 370 may initially determine that full interactivity will be provided 376-2 and generate a cue point information form 382. At some later time, the method 370 may determine that certain information will be provided automatically through detection or loading from another source. For example, as the client enters cue point information into a cue point information form, the method 370 may determine that certain other information may be automatically generated. For another example, after providing the cue point information form to the client, the client may select a button which automatically fills in certain fields of the form.

After cue point information is received from the client 386, the method may process some or all of the cue point information 388. In some embodiments, audio inputs may have to be converted into a text format for storage in a relational database. In other embodiments, sets of data may be encrypted, encoded, transcoded, or condensed (either be removing information, by down-sampling, by using a codec to reduce the file size, or in some other way) before storage. In yet other embodiments, portions of the received data may affect the way cue point data is stored, manipulated, interpreted, or otherwise handled by other methods or systems. For example, some of the cue point information m-ray require new associations to be created in a relational database, new GUI elements to be generated or displayed, etc.

After the method 370 receives all the desired or required cue point properties, the method 370 may generate and save the cue point 392. In some embodiments, the method may ask for verification from a client before generating and/or saving the cue point 392. In other embodiments, the method 370 may only generate and/or save the cue point after the client submits the information. For example, the cue point information form may be displayed on a client terminal while the cue point editor resides on a server terminal. In this example, the client may be required to submit the form over a network to the server computer before the cue point editor has the information it needs to generate the cue point.

Further, the method 370 may save the cue point in any effective way in any location. For example, the method 370 may perform a database insert function to insert the new or modified cue point information into an existing cue point database, which may be stored on a server. Alternately, the method 370 may write the information to the associated video file in a way which may be interpreted by another application.

After generating and saving the cue point 392, the method 370 may determine whether or not the client would like to continue 396. This determination 396 may be performed, for example, by transmitting or displaying a prompt for the client to select whether or not to continue. If the method 370 determines that the client would like to continue 396-1, the method 370 may return to any useful step.

In some embodiments, the method 370 may continue to allow editing of the cue point information, or renew editing access to the cue point information. In other embodiments, the method may re-determine how much interactivity to provide 376 and proceed from there. In yet other embodiments, the method 370 may re-open certain cue point information for editing and keep other information closed to editing. For example, the method 370 may provide a "clear form" GUI element which allows the client to clear the information provided in the cue point information form. In some cases, the "clear form" element may protect certain fields, like the name and time position of the cue point, and clear only other information. Of course, in yet other embodiments, the method 370 may default to either continuing in editing mode or not continuing unless the client selects otherwise.

If the method 370 determines that the client would like to continue 396-2, the method 370 may then exit the cue point editor 398. It will be appreciated that there are many ways to exit an application. In one example, the application may close completely, and processes associated with the application may terminate. In another example, the application may close as viewed by the client, but the processes associated with the application may continue to run on a server computer and/or in the background of the client terminal. It will also be appreciated that the method 370 may wait to generate or save a cue point or cue point information until the cue point editor exits 398.

Figure 4:
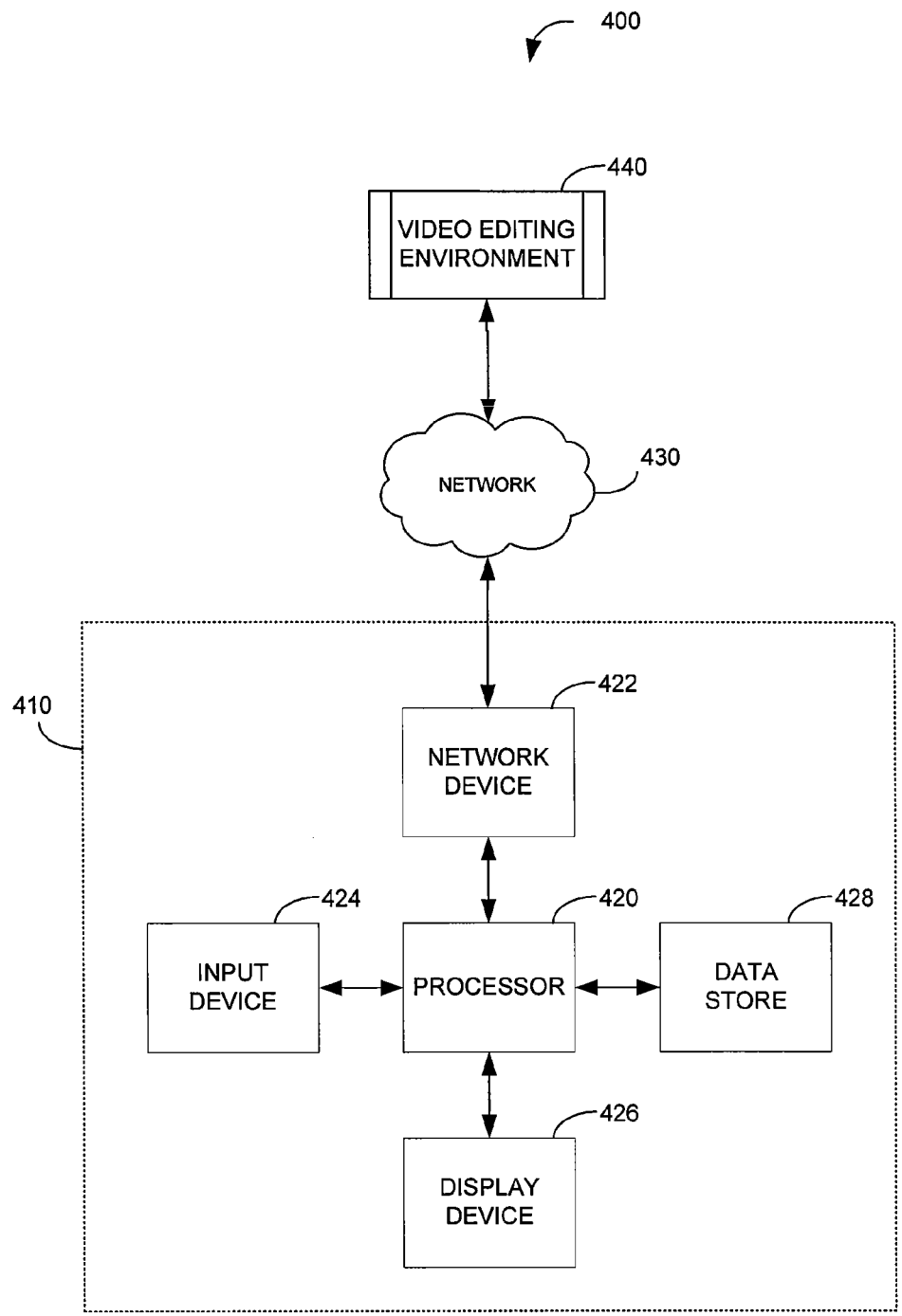
FIG. 4 provides an exemplary system diagram illustrating embodiments of client terminals for use with various embodiments of video editing environments.

In some embodiments of the invention, a client may use an embodiment of a video editing environment. The client may access and use the video editing environments in any effective way, including by way of a client terminal. FIG. 4 provides an exemplary system diagram illustrating embodiments of client terminals for use with various embodiments of video editing environments.

The system 400 comprises a client terminal 410 with various components. These components may include a central processor 420. The central processor 420 may include one or more microprocessors or any other effective element for controlling the various components of the client terminal 410 and for processing client terminal data. Components of the client terminal 410 may include network devices 422, input devices 424, output devices 426, data stores 428, or any other useful components.

Network devices 422 may include wired or wireless transceivers, encoders or decoders, network ports, antennae, or any other devices which facilitate network communications. Input devices 424 may include keyboards, mouse peripherals, track balls, touch pads, microphones, optical recognition devices, input ports, or any other devices which facilitate input from a client. Output devices 426 may include display screens, light emitting diodes (LED's), output ports, printers, or any other devices which facilitate outputting information to a client. Data stores 428 may include hard drives, random access memory (RAM), memory cards, magnetic or optical disks, or any other devices which facilitate the storage of data.

It will be appreciated that many types of client terminals 410 exist, and the components and client of the client terminal 410 may differ depending on the type. For example, if the client terminal 410 is a laptop computer, the client is likely a human client who interfaces with the terminal via various types of input devices 424 and output devices 426. In another example, if the client terminal 410 is an automated computer system, the client may be a computer process which in interfaces with the terminal via various scripts, functions, algorithms, etc. In this example, it would be unnecessary in some cases to provide human-usable input devices 424 and output devices 426, but may remain necessary to provide other types of input devices 424 and output devices 426, like ports, processors, etc.

The client terminal 410 may interface at least through its network device 422 to a network 430. The network 430 may be one or more of any type of wired or wireless, public or private, encrypted or unencrypted network. In one example, the network 430 may comprise the Internet. In another example, the network 430 may comprise a set of data transmission channels, like a cable. In yet other examples, the network 430 may comprise any number of computers, configured as centralized or decentralized peer-to-peer networks, ad hoc networks, mesh networks, or any other useful configuration. For instance, the network 430 may comprise two terminals connected to one another by a Universal Serial Bus (USB) cable, each performing server functions for the other computer. Using the network 430, the client terminal 410 may interact with a video editing environment 440.

Figure 5:
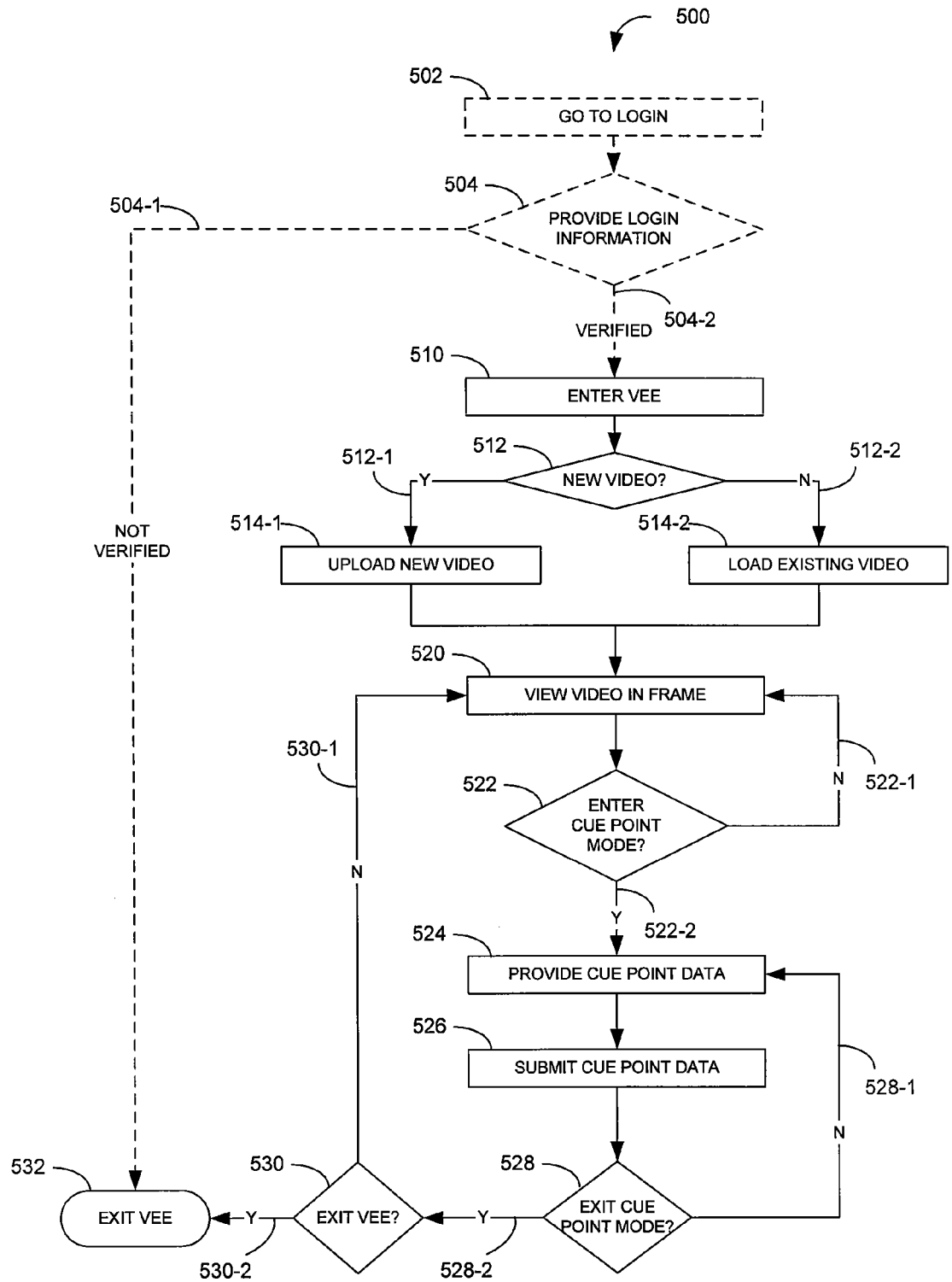
FIG. 5 provides an exemplary flow diagram summarizing methods relating to client terminal interactions with video editor environments in various embodiments of the invention.

FIG. 5 provides an exemplary flow diagram summarizing methods relating to client terminal interactions with video editor environments in various embodiments of the invention. The method 500 may begin when a client enters a VEE 510. The client may enter the VEE 510 by executing an application invoking various software and/or hardware commands, accessing a webpage, or in any other useful way.

Prior to entering the VEE 510, the method 500 may require certain set-up steps. For example, the client may access a login environment 502. In certain embodiments, the client may access a login environment 502 to provide login information 504 to the method 500. In some of these embodiments, providing the login information 504 assists the method 500 in determining the level of access of the client.

For example, the method 500 may determine based on the login information whether the client has permission 504 to access all or part of the VEE. If the client does not have permission 504-1 to access the VEE or desired files, the method 500 may terminate 532 (e.g. the login may be denied). If the client does have permission 504-2 to access the VEE or the desired files, the method 500 may continue to load the VEE 510.

Once the VEE is loaded 510, the method 500 may determine whether the client is attempting to use a new or existing video 512. If the client is attempting to use a new video 512-1, the method 500 may have the client provide the new video information 514-1, for example by uploading, downloading, transferring, or compiling the video data. If the client is attempting to use existing video 512-2, the method 500 may acquire or load the existing video information 514-2 from wherever it is stored, for example from a video server.

The method 500 may then allow the client to view the video data 520 in any useful way. In some embodiments, the method 500 may generate a video frame either along with or as part of a VEE GUI. The client may use these video elements (e.g. the video frame and various GUI controls) to view or manipulate the video data.

Further, the method may provide the client with a cue point edit mode. At any point, the method may determine whether the client is entering the cue point edit mode 522. It will be appreciated that in some embodiments, the cue point edit mode will always be available, while other embodiments may require active entry into that mode. For example, in some embodiments, the client may enter the cue point edit mode by using cue point edit mode functions (e.g. by beginning to type information into a cue point edit field), while in other embodiments, the client may enter the cue point edit mode by selecting a navigational control which directs the client specifically to that mode.

If the cue point edit mode has not been entered 522-1, the method 500 may continue to allow the client to view video data 520 and determine whether the client is entering the cue point edit mode 522.

If the cue point edit mode has been entered 522-2, the method 500 may have the client provide cue point data 524. Different data may be provided 524 in different ways, for example via a client terminal. The method 500 may then have the client submit the cue point information 526. After (or while) cue point information is provided 524 or submitted 526, the method 500 may have to process the cue point information, update cue point associations, or perform other steps.

When the client has provided 524 and submitted 526 cue point information, the method 500 may determine whether the client wishes to exit the cue point edit mode 528. If the client doe not wish to exit the cue point edit mode 528-1 (e.g. the client wished to continue editing the cue point information or cue points), the method 500 may allow the client to continue to provide cue point information 524.

If the client wishes to exit the cue point edit mode 528-2, the method 500 may then determine whether the client wishes to exit the VEE 530. If the client does not wish to exit the VEE 530-1, the method 500 may allow the client to return to any useful step, for example to viewing the video data 520. If the client wishes to exit the VEE 530-2, the method may terminate 532.

Figure 6:
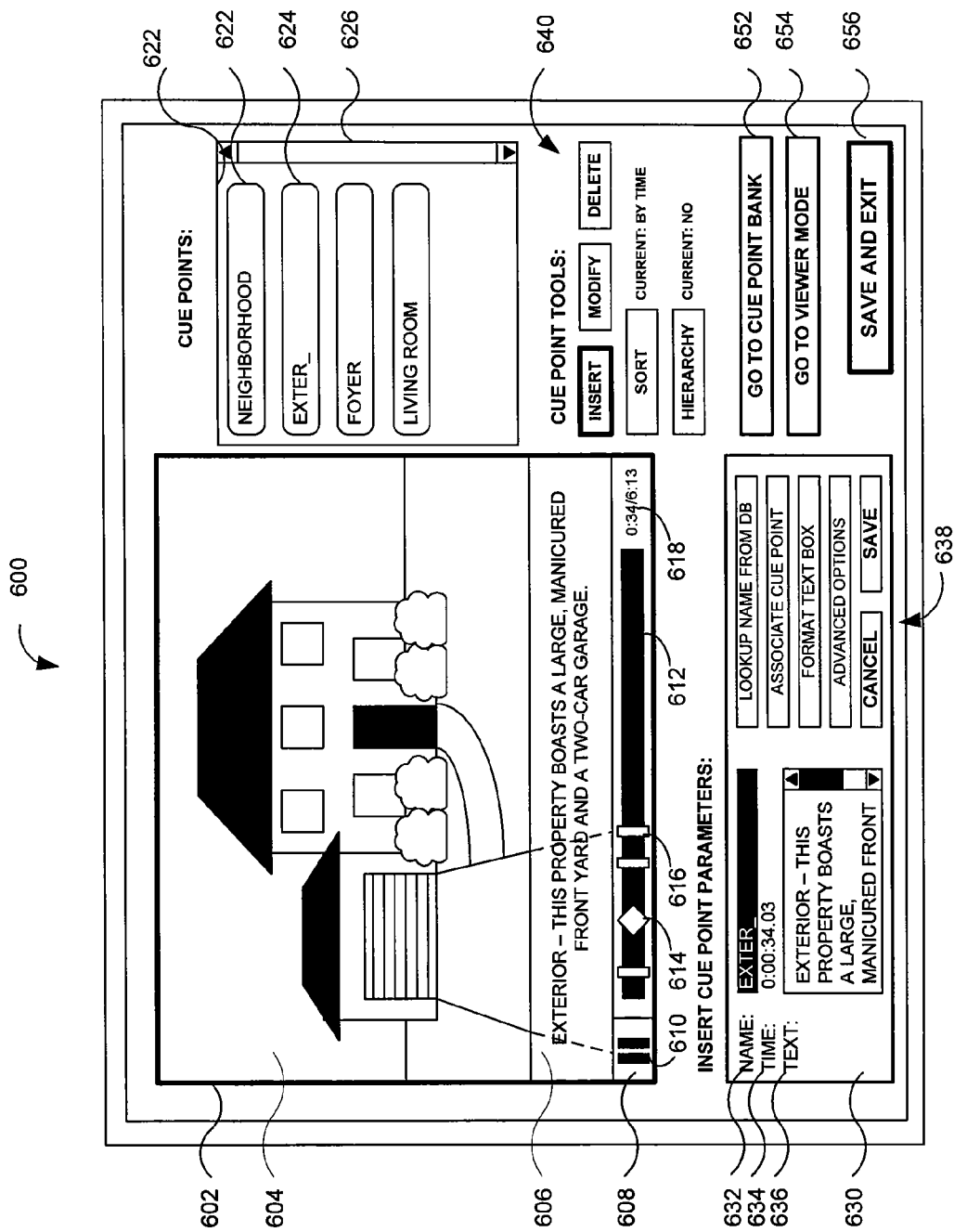
FIG. 6 provides an exemplary screen shot of an embodiment of a video editing environment as viewed by a client terminal according to the invention.

FIG. 6 provides an exemplary screen shot of an embodiment of a video editing environment as viewed by a client terminal according to the invention. The cue point editor screen 600 may comprise a number of elements for different purposes. It will be appreciated that many types of cue point editor screens are possible within the embodiments of the invention. As such, the cue point editor screen 600 illustrated in FIG. 6 is for illustrative purposes only and should not be construed to limit the scope of the invention.

The cue point editor screen 600 comprises a video frame 602. The video frame 602 may be configured to display video data and to allow for interactive video manipulation. The video frame 602 may comprise a video footage area 604, a comment area 606, a navigation area 608, and any other useful areas.

The comment area 606 may display text, images, videos, or other information describing or adding to the footage seen in the video footage area 604. As illustrated, the comment area 606 may span the full width and some percentage of the height of the video frame 602. Further, as illustrated, the comment area 606 may be overlaid on the video footage with a semi-transparent background, so the video footage is not totally obscured by the comment area 606. Of course, the comment area 606 may have any size, shape, color, transparency, or other useful characteristic.

Additionally, the comment area 606 may respond to interaction by a client or other function. In one example, the comment area 606 may normally be hidden, minimized, or otherwise obscured in the GUI. The comment area 606 may then appear (e.g. "pop up") on the screen when a client places a mouse pointer over a cue point location indicator 616. In other examples, the text information in or associated with the comment area 606 may be indexable, searchable, or selectable (e.g. able to be copied to a text file); it may be related to video data, cue point information, or user data; it may be auto-generated based on audio or video recognition, patterns of user activity; it may be generated by acquiring from external sources, like Really Simple Syndication (RSS) feeds, or web logs (blogs); etc. In yet other examples, the comment area 606 may comprise interactive elements, like hyperlinks or GUI elements, which allow the client to interact with the comment area 606 (e.g. to navigate to a different location, to open the information into a new frame, to acquire related information (like other users' comments about the comment), etc.).

The navigation area 608 may comprise any number of navigation controls for navigating, processing, manipulating, or otherwise affecting video or audio elements. As illustrated, the navigation area 608 may comprise virtual buttons, like a "pause" button 610. Further, the navigation area 608 may comprise a video progress bar 612 which may show various information relating to the progress of the video, e.g. loading or playback. The video progress bar 612 may comprise other elements relating to video progress, time positions, or other useful information. For example, the video progress bar 612 may comprise a playback progress indicator 614, representing the current time position of the video playback. As illustrated, the time position is about nine percent through the video footage (0:34 out of 6:13), so the playback progress indicator 614 is about nine percent of the distance from the beginning of the video progress bar 612 to the end. The video progress bar 612 may also show various cue point location indicators 616. As illustrated, three cue point location indicators 616 are shown representing the three cue points already created (see below). The navigation area 608 may also comprise informational elements, such as a time indicator 618. The time indicator 618 may display the current time position in the video footage, the total time of video footage in the video file, time remaining for playback, or other useful information.

In some embodiments, these other elements may be used as interactive controls. For example, it may be possible to drag the playback progress indicator 614 to change the current time position of video footage being displayed in the video footage area 604. Similarly, it may be possible to drag cue point location indicators 616 to change the time positions associated with their respective cue points. Further, it may be possible to lock various controls to prevent their adjustment in certain environments. For example, it may be desirable to lock the cue point location indicators 616 for all cue points except the one currently being edited.

It will be appreciated that many types of areas, controls, and other elements are possible. For example, the navigation area 608 may also comprise other video controls (e.g. stop, fast forward, rewind, rotate, zoom, etc.), audio controls (e.g. volume, pan, fade, equalizer controls, audio level indicators, etc.), etc. Further, it may be possible to add or modify the elements of the video frame 602. For example, it may be possible to drag the comment area 606 to other locations, change its size, etc.

The cue point editor screen 600 may also comprise a cue point listing area 620. The cue point listing area 620 may list cue points which are existing, currently being added, or any other useful information. For example, as illustrated, the cue point listing area 620 lists three existing cue points 622, and one cue point currently being inserted 624 ("EXTER_"). The cue point listing area 620 may also comprise navigation controls or other elements. For example, if more existing cue points 622 are listed than fit within the cue point listing area 620, a scroll bar 626 may be provided to allow the client to scroll through the entire list.

The cue point editor screen 600 may also comprise a cue point parameters area 630. The cue point parameters area 630 may comprise any number of interactive and/or informational controls and/or fields, which are useful for viewing and editing cue point information. As illustrated, the cue point parameters area 630 comprises a cue point name field 632 for entering the cue point name, a time position field 634 for entering the cue point time position, and a comment text field 636 for entering comment text. Additionally, as illustrated, various virtual buttons are provided, including a "Lookup Name from DB" button for allowing a client to look up an appropriate cue point name from a list of cue point names stored in a database; an "Associate Cue Point" button for allowing a client to associate the cue point being edited with another video file or another cue point (e.g. in a hierarchy); a "Format Text Box" button for allowing a client to view more options for formatting the text and other attributes of the comment area 606; an "Advanced Options" button for allowing a client to view advanced options for cue point editing, GUI display, etc. (e.g. for changing the icon associated with a viewpoint, changing a thumbnail associated with a cue point or video file, changing the size and shape of cue point editing screen 600 elements, etc.); a "Cancel" button for allowing a client to cancel the current cue point editing; and a "Save" button for allowing a client to save the current cue point editing and possibly submit the cue point information. It will be appreciated that any number and type of fields and controls are possible.

The cue point editor screen 600 may also comprise other areas, like a cue point tools area 640. The cue point tools area 640 may comprise various fields and controls for editing cue points. For example, as illustrated, the cue point tools area 640 comprises virtual buttons for inserting, modifying, and deleting cue points. Additionally, as illustrated, the cue point tools area 640 comprises virtual buttons for sorting cue points and for toggling cue point hierarchies. As shown, there may also be informational fields which show information, like the current status associated with a control. For example, the cue point tools area 640 shows that the cue points listed in the cue point listing area 620 are currently sorted by their associated time positions within the video file and that cue point hierarchies are turned off.

Other controls may also be part of the cue point editor screen 600. For example, there may be other navigational controls for allowing the client to move between applications, between screens of applications, or to exit the cue point editor. As illustrated, there is a "Go to Cue Point Bank" button for allowing the client to navigate to (e.g. to open a new window with) a listing of entries from a cue point bank database; a "Go to Viewer Mode" button for allowing the client to navigate to a video playback environment (e.g. simulated or real) to be able to preview the effects of the current cue point editing; and a "Save and Exit" button for allowing the client to save changes made in the cue point editor and exit the application.

In the illustrative case, a client is editing a video file containing footage of a house for sale. The client desires to add cue points at strategic locations within the video file to allow a potential buyer to be able to more easily navigate the playback of the video file. Previously, the client had inserted cue points at three locations within the video file. These locations correspond to time positions in the video file where the video information related to the neighborhood, foyer, and living room, respectively. The client named these cue points "NEIGHBORHOOD," "FOYER," and "LIVING ROOM," respectively.

Now, the client wishes to insert a cue point at 34 seconds, where the video footage begins to describe the exterior of the house (see the illustrative footage in the video footage area 604). The client used a client terminal to view the video file in a video editing environment, and entered the cue point editor mode by pausing playback of the video file at 34.03 seconds (see the video progress indicator 614 and the time indicator 618, showing the current elapsed playback time rounded to 34 seconds). As illustrated, the cue point editor automatically generated a portion of the cue point information needed to create the cue point. For example, the cue point editor recorded the time position where the video was paused and is automatically displaying that information in the "Time" field 634. Further, since the cue point listing area 620 is currently sorting the listed cue points by time position (see the information field next to the "Sort" button in the cue point tools area 640), the cue point editor has created a placeholder for the cue point to be inserted in the correct sort position within the cue point list.

The client then began entering information into the cue point editor. As shown, the client has already entered the comment text associated with the cue point (see the "Text" field 636 and the comment area 606). The client is currently in the middle of entering the cue point name "EXTERIOR," such that it currently reads "EXTER_" (the "_" representing a cursor location for the next character to be entered) (see the "Name" field 632). Also, as shown, the name of the cue point in the cue point listing area 620 is being automatically updated substantially in real time to match the name being entered in the "Name" field 632.

When cue point information is received, it may be stored in a data structure. FIG. 7 provides an exemplary data structure for use with various embodiments of video editing environments according to the invention. The data structure 700 may be any type of data structure useful for storing cue point information a relational database comprising various attributes related to various entries in the database.

In the illustrated embodiment, the data structure 700 a relational database comprising various attributes related to various entries in the database. Each row 710 may represent a video identifier. The video identifier may be any data element capable of representing the identity of video data or a video file. In some embodiments, the first row 710-1 refers to a video file identified by the video identifier "VID_0001" 730.

Each column 720 in the illustrative database may represent a cue point associated with the video file identified in a corresponding row 710. In some embodiments, the first column 720-1 refers to a first cue point associated with respective video identifiers (e.g. the cue point with the time position closest to the beginning of the video data). For example, for the video identifier "VID_0001" 730, the first cue point is "EXTERIOR" 740.

It will be appreciated that many data structures are possible within the scope of the invention. Further, it is clear that many types of cue point information may be associated with a cue point. As such, it may be necessary to provide one or more data structures which allow cue point information to be associated with its associated cue point. For example, the cue point "EXTERIOR" 740 refers to a specific time position in a video file. Additionally, it may be necessary to differentiate between the cue points "EXTERIOR" 740 (associated with video identifier "VID_0001" 730) and "EXTERIOR" 750 (associated with video identifier "VID_0002" 760). As such, it may be necessary to associate those two cue points with unique identifiers.

It will be appreciated that many types video editing environments are possible for handling the many types of video information and many types of cue point information, all within the scope of the invention. As such, the above descriptions of embodiments relating to video editing environments in FIGS. 3-7 should not be construed as limiting the scope of the invention.

Video Playback Environments

Figure 8:
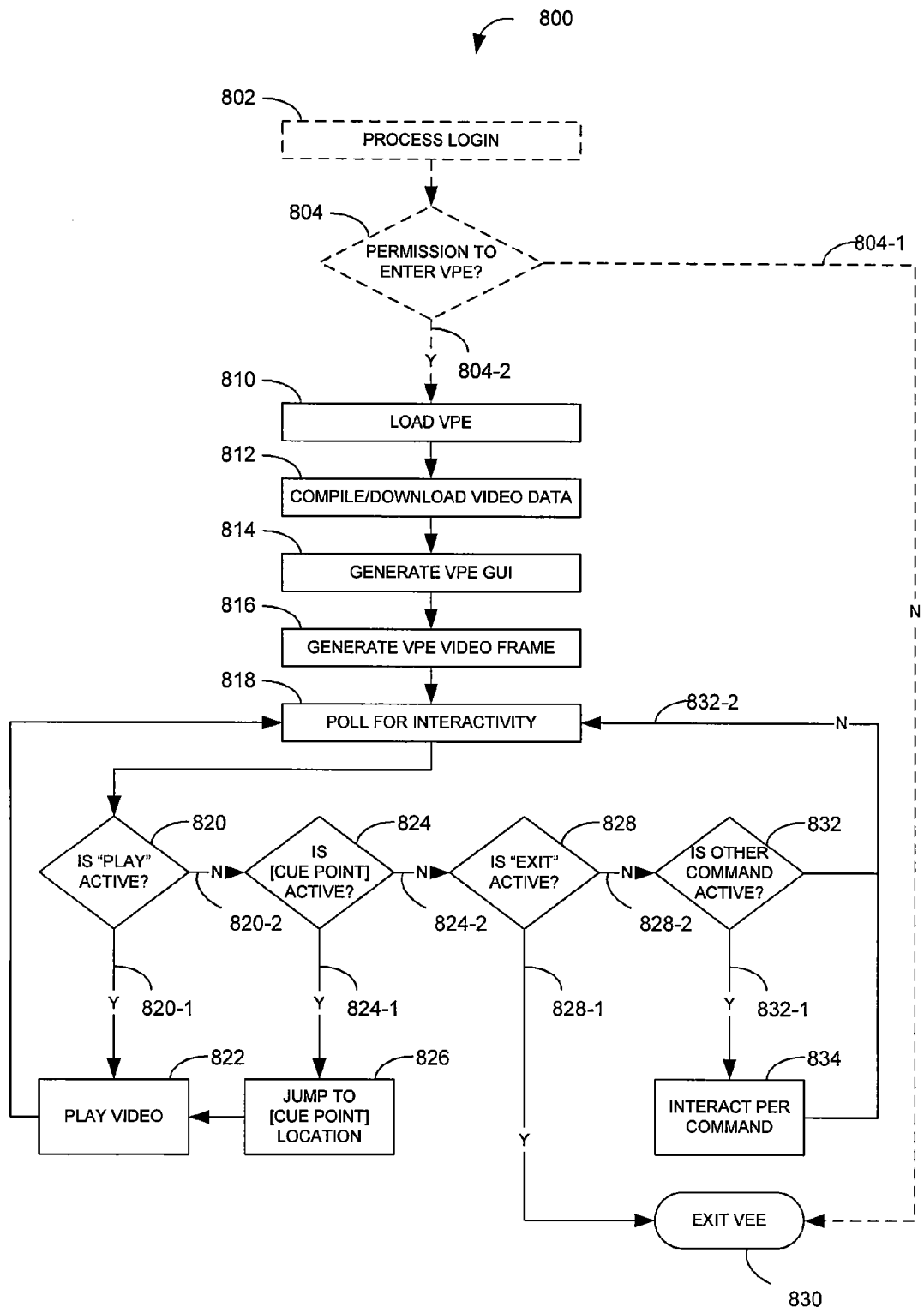
FIG. 8 provides an exemplary flow diagram summarizing methods relating to video playback environments in various embodiments of the invention.

FIG. 8A provides an exemplary flow diagram summarizing methods relating to video playback environments in various embodiments of the invention. The method 800 may begin by loading a video playback environment (VPE) 810. Loading the VPE 810 may involve executing an application invoking various software and/or hardware commands. It will be appreciated that the VPE may be loaded 810 in any useful way to provide the desired results. For example, the VPE may load as a script in the background of a webpage, as a server-level application, as a client-level application, or with various components of the application loading in different ways.

Prior to loading the VPE 810, the method 800 may require certain set-up steps. For example, the method 800 may process login 802 of a client. In certain embodiments, the method may process the login 802 to maintain records of the clients of the method 800. For example, it may be desirable to know who uses the method 800 and how often, or which files or applications are accessed most often.

In other embodiments, processing the login 802 may require that the client enters certain login information to determine the client's level of authorization. For example, it may be desirable to limit access to the VPE only to certain types of clients. Similarly, it may be desirable to open access to the VPE, but limit access to certain files. In the latter case, it may be necessary as part of processing the login 802 to acquire information from the client regarding which files the client intends to access. In these embodiments, the method 800 may determine based on the login information whether the client has permission 804 to access all or part of the VPE. For example, the system may deny access based on stored attributes associated with the client (e.g. a level of authority attribute), inferred attributes based on extrinsic information (e.g. time of day, geographic location associated with the client's Internet Protocol address, etc.), incorrect provided information (e.g. client name and password do not match those on file, etc.), technical information (e.g. client terminal does not meet the minimum system requirements), or any other information which may be used to determine level of access.

If the client does not have permission 804-1 to access the VPE or the desired files, the method 800 may terminate 832. If the client does have permission 804-2 to access the VPE or the desired files, the method 800 may continue to load the VPE 810.

Once the VPE is loaded 810, the method 800 may load video data 812 for viewing. Video data may be loaded 812 in any useful way and from any source where video data may be located. In some embodiments, video data may exist in a data store, like a database or video file. In these embodiments, the method 800 may download the data from one or more of those locations. In these and other embodiments, video data may be resident in the same location as the VPE or previously loaded. The method 800 may prepare the video for playback in any useful way, including reloading video data, loading additional video data, compiling loaded video data, or translating video data.

The method 800 may then generate a VPE GUI 814. This interface may comprise any graphical, textual, audio, or other data which is desirable or necessary for providing interface capabilities to a client. It will be appreciated that the GUI does not require any graphical interface elements. For example, it may be possible to create an interface which uses only text, sound, or some other interface capability.

It will be appreciated that the GUI may be generated 814 in any useful way for providing a useful interface to the VPE. For example, the GUI may be generated 814 as a webpage on a client's web browser, as a frame within a webpage, as a dedicated client-level application on the client's terminal (with the VPE itself running either at the client- or server-level), or as a background script to be executed by another application (e.g. as Visual Basic commands for an interpreter which may use those commands to generate the GUI).

The GUI may comprise such useful elements as a video frame for displaying video information (e.g. an imbedded video player), video controls (e.g. play, pause, fast forward, rewind, volume control, etc.), navigational buttons (e.g. an "Exit the VPE" button), or informational text fields. Further, the GUI may comprise any other desired elements, such as aesthetic components (e.g. borders, logos, images, etc.), or advertisements. In certain embodiments, the GUI elements will be embedded within the context of another environment (e.g. webpage, application, etc.).

It will be appreciated that the GUI elements may be dependent on or independent of aspects of the loaded VPE instance. In some embodiments, the VPE GUI may look identical, regardless of any external information being passed to it (except, of course, the actual video file being played, the specific cue point information, etc.). In other embodiments, the VPE GUI may adapt or modify based on extrinsic information, like attributes of the client, the video file, the cue point information, etc. For example, the VPE may display tailored advertisements to the client based on any useful type of information accessible to the VPE (e.g. client data, video information, cue point information, comment information, algorithm results, patterns of client activity, etc.).

Either separately or as part of the GUI, the method 800 may generate a video frame 816 for displaying video information. Generating the video frame 816 may utilize, comply with, or be compatible with a number of different technologies. For example, different video files may be encoded or transcoded or stored in different formats or using different public or proprietary algorithms or standards. Further, video files may load in various ways, including as a complete file, streaming, or progressive. Progressive loading of video files, for example, allows the video frame to begin playing the portion of video data which has already loaded while the remainder of video data continues to load.

The video frame may also comprise its own GUI elements, including video and audio controls, and text fields. For example, the video frame may generate 816 along with a virtual play/pause button, volume controller, equalizer, etc. Further, the video data may comprise and/or be associated with other data, including text descriptions, audio information, and cue point information. Some or all of this information may also be displayed within the video frame, or locations for displaying this information may be generated along with the video frame.

In some embodiments, the video frame may comprise a field spanning a lower portion of the frame in which text information may appear (e.g. subtitles, captions, or comments). This field may be independently controllable or editable, for example to take up the lower fifth of the frame, to have a thirty-percent translucent grey background with black text, etc. The field may display text, images, videos, or other information describing or adding to the footage seen in the video frame. Additionally, the field may respond to interaction by a client or other function. In one example, the field may normally be hidden, minimized, or otherwise obscured in the GUI; and may then appear (e.g. "pop up") on the screen when a client places a mouse pointer over some GUI control. In other examples, the text information in or associated with the field may be indexable, searchable, or selectable (e.g. able to be copied to a text file); it may be related to video data, cue point information, or user data; it may be auto-generated based on audio or video recognition, or patterns of user activity; it may be generated by acquiring from external sources, like Really Simple Syndication (RSS) feeds, or web logs (blogs); etc. In yet other examples, the field may comprise interactive elements, like hyperlinks or GUI elements, which allow the client to interact with the field (e.g. to navigate to a different location, to open the information into a new frame, to acquire related information (like other users' comments about the comment), etc.).

In some embodiments, the video data may be associated with a set of cue point data relating to a set of cue points. Either as part of the VPE GUI generation 814 or the video frame generation 816, cue point navigation buttons may be generated for each cue point. Further, these cue point buttons may load progressively along with the video data, so that cue points become visible or active only after their respective portion of the video data has loaded. Alternatively, cue points may be activated before their respective video data loads. For example, cue points may load when the video data begins to download. When a client selects a cue point before its respective video data has loaded, the video data may begin to progressively download from that cue point time position. When the video data for that cue point has finished loading, other video data may continue to load in any desirable order.

As the elements load (or in some embodiments, after the elements have loaded), the VPE may provide interactive video control capability. As part of this interactivity, the method 800 may have to poll for interactivity 818. For example, the method 800 may continually determine whether one or more of various GUI controls or other interactive elements are being interacted with. This interaction may occur in any useful way. For example, a client may interact be using a mouse to click on a virtual GUI button.

In the illustrated embodiments, the method 800 may determine whether a "play" control (e.g. a virtual "play" button) is active 820. For example, the VPE GUI may provide the client with a virtual play/pause toggle button, and determining whether the play button is active 820 may involve determining whether the toggle button is in "play" mode. If the play mode is active 820-1, the method 800 may play (or continue to play) the video file 822. It will be understood that, if the video is still being streamed or progressively downloaded, the method 800 may have to stop or pause video file playback while more video data loads. While the video continues to play and/or load 822, the method 800 may continue to poll for interactivity 818.

If the play mode is not active 820-2, the method 800 may determine whether a cue point is active 824. For example, the GUI may provide a set of cue point navigation buttons which may be activated by clicking on them using a mouse or other input device. If the cue point is active 824-1, the method 800 may jump to a time position in the video file 826 associated with the active cue point. After the method 800 jumps to the time position in the video file 826, the method may continue to play the video file 822 from that time position. While the video continues to play 822, the method 800 may continue to poll for interactivity 818.

It will be understood that, if the video is still being streamed or progressively downloaded, the method 800 may be affected. In some embodiments, the method 800 may have to stop or pause video file playback while more video data loads before it may jump to the time position in the video file 826. In other embodiments, if a cue point becomes active 824-1 before its respective video data downloads, the method 800 may still jump to the associated time position in the video file 826 and continue to download video data from that time position. When the video data for that cue point has finished loading, other video data may continue to load in any desirable order.

If the play mode is not active 820-2, and a cue point is not active 824-2, the method 800 may determine whether the exit mode is active 828. If the exit mode is active 828-1, the method 800 may terminate 830.

If the exit mode is not active 828-2, the method 800 may determine whether another command is active 832. It will be appreciated that many types of commands are possible. For example, the VPE may provide interactivity with the video data (e.g. by providing GUI controls like pan, fast forward, rewind, pause, stop, etc.), with the audio data (e.g. by providing GUI controls like volume controls, equalizer controls, balance or fader controls, etc.), or any other desirable client interactivity. If the method 800 determines that another command is active 832-1, the method 800 may respond to the command 834. For example, if the command is the result of interactivity with a volume control, the response to the command may be to increase the volume of the audio output associated with the video data. If the method 800 determines that no other command is active 832-2 (e.g. the client is not interacting with the VPE), the method 800 may continue to poll for interactivity 818.

Figure 9A:
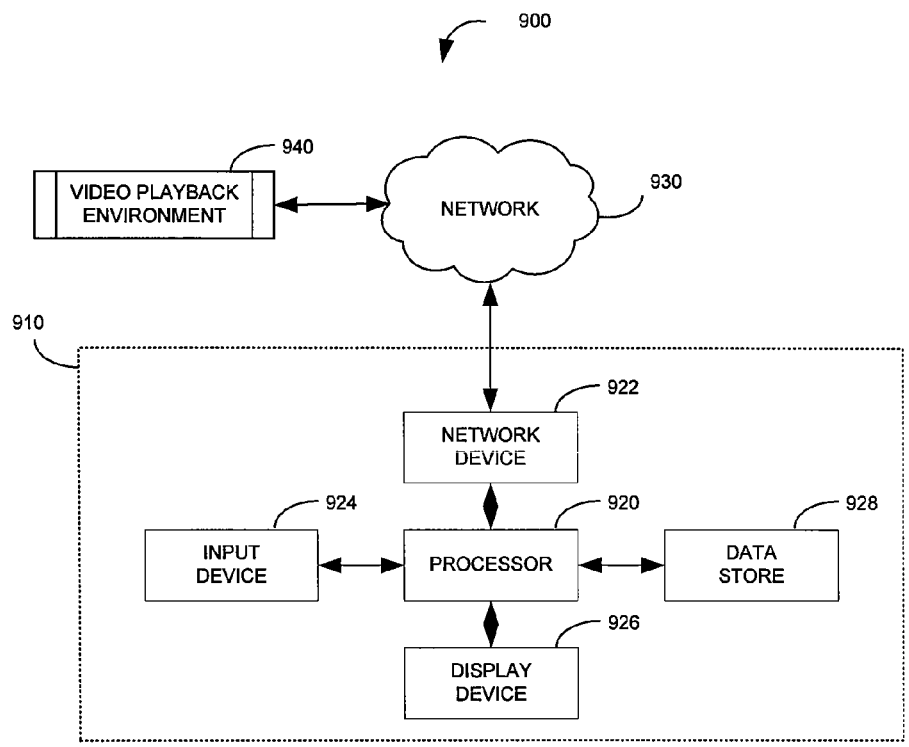
FIG. 9A provides an exemplary system diagram illustrating embodiments of client terminals for use with various embodiments of system-level video playback environments.
Figure 9B:
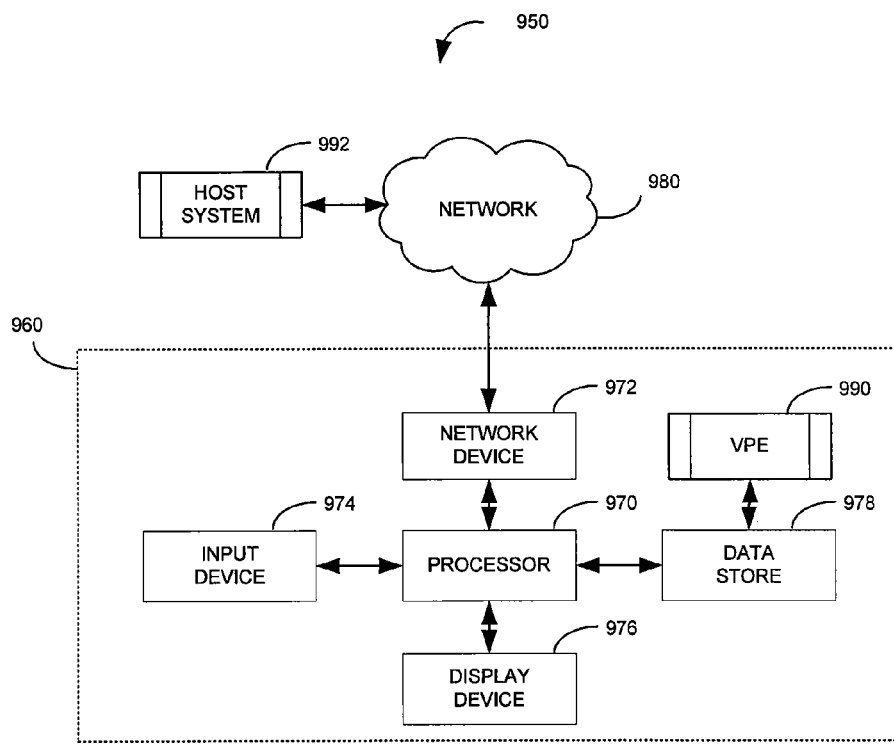
FIG. 9B provides an exemplary system diagram illustrating embodiments of client terminals for use with various embodiments of system-level video playback environments.

In some embodiments of the invention, a client may use an embodiment of a video playback environment. The client may access and use the video editing environments in any effective way, including by way of a client terminal. FIGS. 9A and 9B provide exemplary system diagrams illustrating embodiments of client terminals for use with various embodiments of video playback environments.

FIG. 9A provides an exemplary system diagram illustrating embodiments of client terminals for use with various embodiments of system-level video playback environments. The system 900 comprises a client terminal 910 with various components. These components may include a central processor 920. The central processor 920 may include one or more microprocessors or any other effective element for controlling the various components of the client terminal 910 and for processing client terminal data. Components of the client terminal 910 may include network devices 922, input devices 924, output devices 926, data stores 928, or any other useful components.

Network devices 922 may include wired or wireless transceivers, encoders or decoders, network ports, antennae, or any other devices which facilitate network communications. Input devices 924 may include keyboards, mouse peripherals, track balls, touch pads, microphones, optical recognition devices, input ports, or any other devices which facilitate input from a client. Output devices 926 may include display screens, light emitting diodes (LED's), output ports, printers, or any other devices which facilitate outputting information to a client. Data stores 928 may include hard drives, random access memory (RAM), memory cards, magnetic or optical disks, or any other devices which facilitate the storage of data. It will be appreciated that many types of client terminals 910 exist, and the components and client of the client terminal 910 may differ depending on the type.

The client terminal 910 may interface at least through its network device 922 to a network 930. The network 930 may be one or more of any type of wired or wireless, public or private, encrypted or unencrypted network. In one example, the network 930 may comprise the Internet. In another example, the network 930 may comprise a set of data transmission channels, like a cable. In yet other examples, the network 930 may comprise any number of computers, configured as centralized or decentralized peer-to-peer networks, ad hoc networks, mesh networks, or any other useful configuration. For instance, the network 930 may comprise two terminals connected to one another by a Universal Serial Bus (USB) cable, each performing server functions for the other computer. Using the network 930, the client terminal 910 may interact with a video playback environment 940.

FIG. 9B provides an exemplary system diagram illustrating embodiments of client terminals for use with various embodiments of system-level video playback environments. The system 950 comprises a client terminal 960 with various components, including a central processor 970, network devices 972, input devices 974, output devices 976, data stores 978, or any other useful components.

The client terminal 960 may have a VPE 990 stored as an application on a data store 978. The client-level application may be runnable by the processor 970. Additionally, the client terminal 960 may interface at least through its network device 972 to a network 980. Using the network 980, the client terminal 910 may access information it requires or desires for use with or by the VPE 990. This information may be accessed through (and in some cases stored on) a host system 992. The host system 992 may be one or more of any type of system component capable of providing and/or storing data and/or applications required or desired for use with or by the VPE 990.

Figure 10:
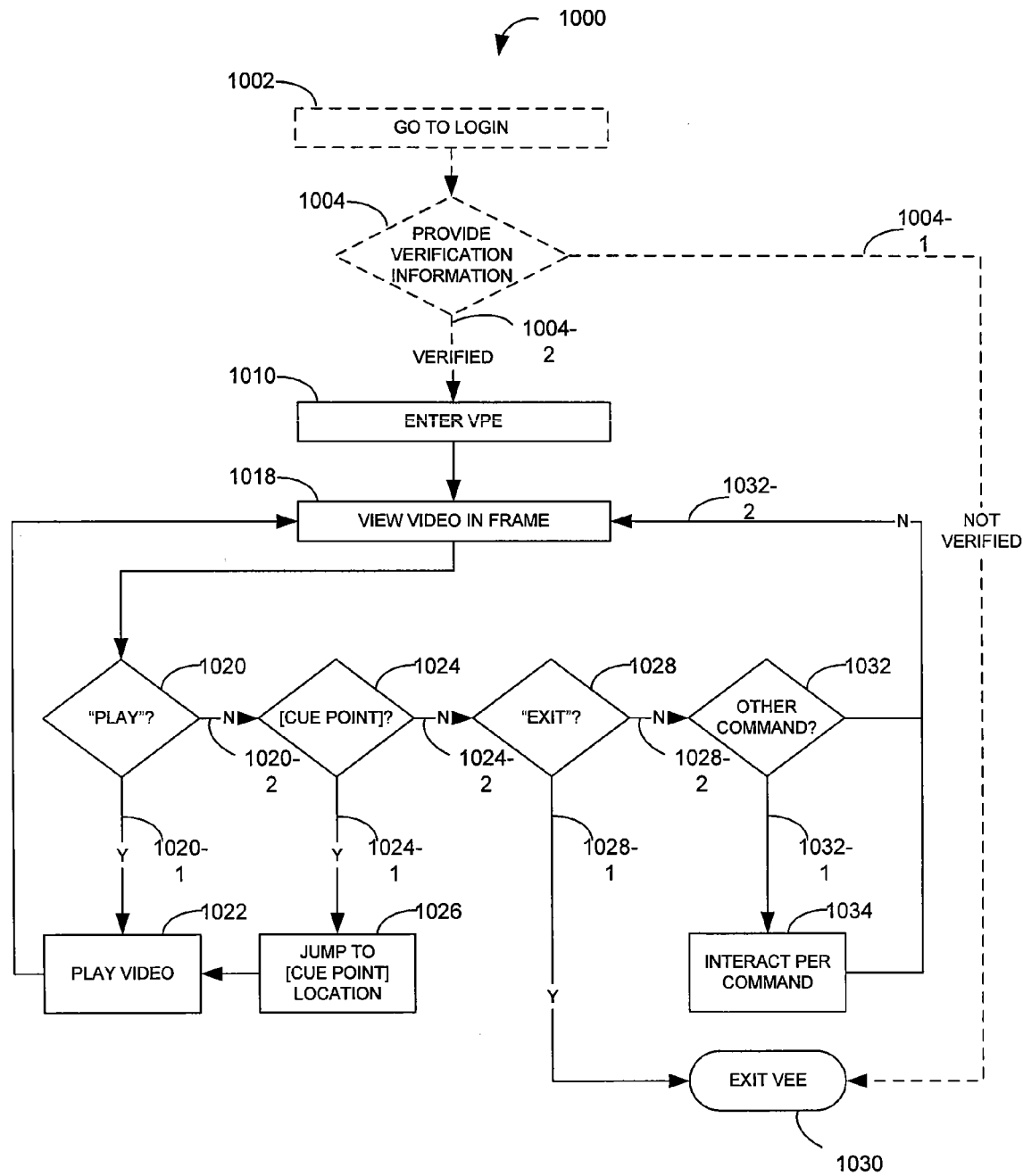
FIG. 10 provides an exemplary flow diagram summarizing methods relating to client terminal interactions with video playback environments in various embodiments of the invention.

FIG. 10 provides an exemplary flow diagram summarizing methods relating to client terminal interactions with video playback environments in various embodiments of the invention. The method 1000 may begin when a client enters a VPE 1010. The client may enter the VEE 1010 by executing an application invoking various software and/or hardware commands, accessing a webpage, or in any other useful way.

Prior to entering the VPE 1010, the method 1000 may require certain set-up steps. For example, the client may access a login environment 1002. In certain embodiments, the client may access a login environment 1002 to provide login information 1004 to the method 1000. In some of these embodiments, providing the login information 1004 assists the method 1000 in determining the level of access of the client.

For example, the method 1000 may determine based on the login information whether the client has permission 1004 to access all or part of the VPE. If the client does not have permission 1004-1 to access the VPE or desired files, the method 1000 may terminate 1030 (e.g. the login may be denied). If the client does have permission 1004-2 to access the VPE or the desired files, the client 1000 may continue to access the VPE 1010.

Once the VPE is loaded 1010, the client may use the VPE to view video information 1012 (e.g. in a video frame). The method 1000 may allow the client to view the video data 1012 in any useful way. In some embodiments, the method 1000 may generate a video frame either along with or as part of a VPE GUI. The client may use these video elements (e.g. the video frame and various GUI controls) to view or manipulate the video data.

As the elements load (or in some embodiments, after the elements have loaded), the VPE may provide interactive capability, and the client may interact with these capabilities. In the illustrated embodiments, the client may activate a "play" control 1020 (e.g. use a mouse to click on a virtual "play" button). If the play button is active 1020-1, the method 1000 may play (or continue to play) the video file 1022, and the client may continue to view the video file 1012.

If the client is not activating a play control 1020-2, the method 1000 may determine whether the client is activating a cue point control 1024 (e.g. a virtual cue point navigation button). If the cue point button is active 1024-1, the method 1000 may jump to a time position in the video file 1026 associated with the active cue point. After the method 1000 jumps to the time position in the video file 1026, the method may continue to play the video file 1022 from that time position, and the client may continue to view the video file 1012.

If the client is not activating a play control 1020-2, and the client is not activating a cue point control 1024-2, the method may determine whether the client is activating an exit control 1028. If the exit control is active 1028-1, the method 1000 may terminate 1030.

If the client is not activating an exit control 1028-2, the method 1000 may determine whether the client is activating another command 1032. If the method 1000 determines that another command is active 1032-1, the method 1000 may respond to the command 1034. If the method 1000 determines that no other command is active 1032-2 (e.g. the client is not interacting with the VPE), the method 1000 may allow the client to continue viewing the video data 1012.

Figure 11B:
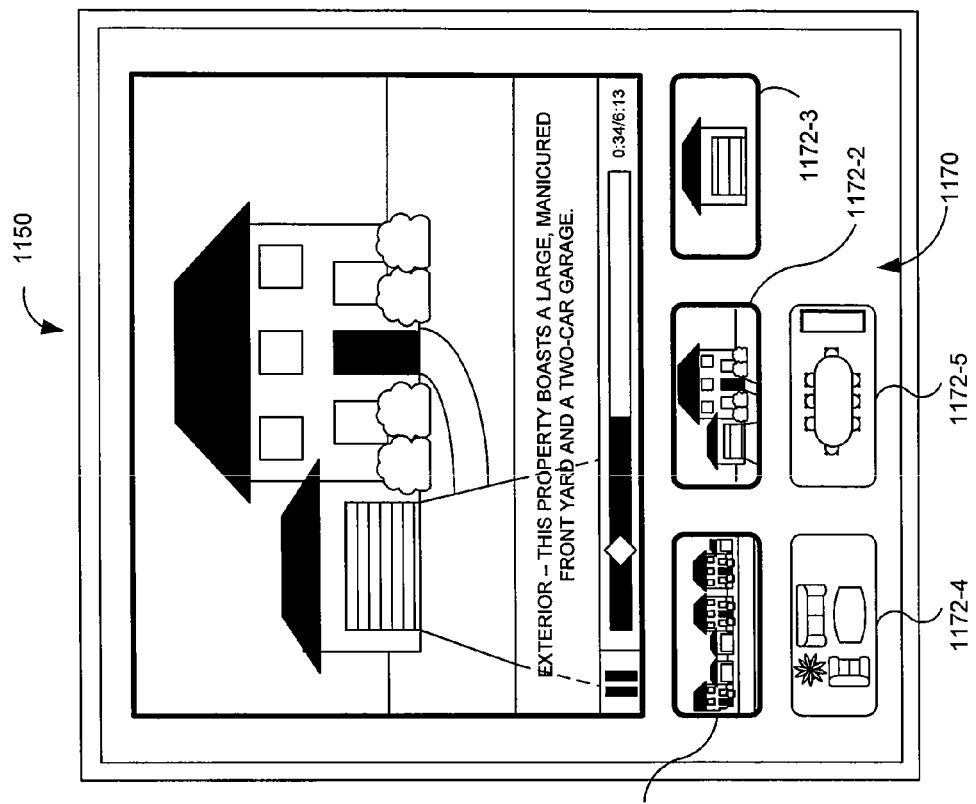
FIGS. 11A-11C provide exemplary screen shots of various embodiments of a video playback environment as viewed by a client terminal according to the invention.
Figure 11A:
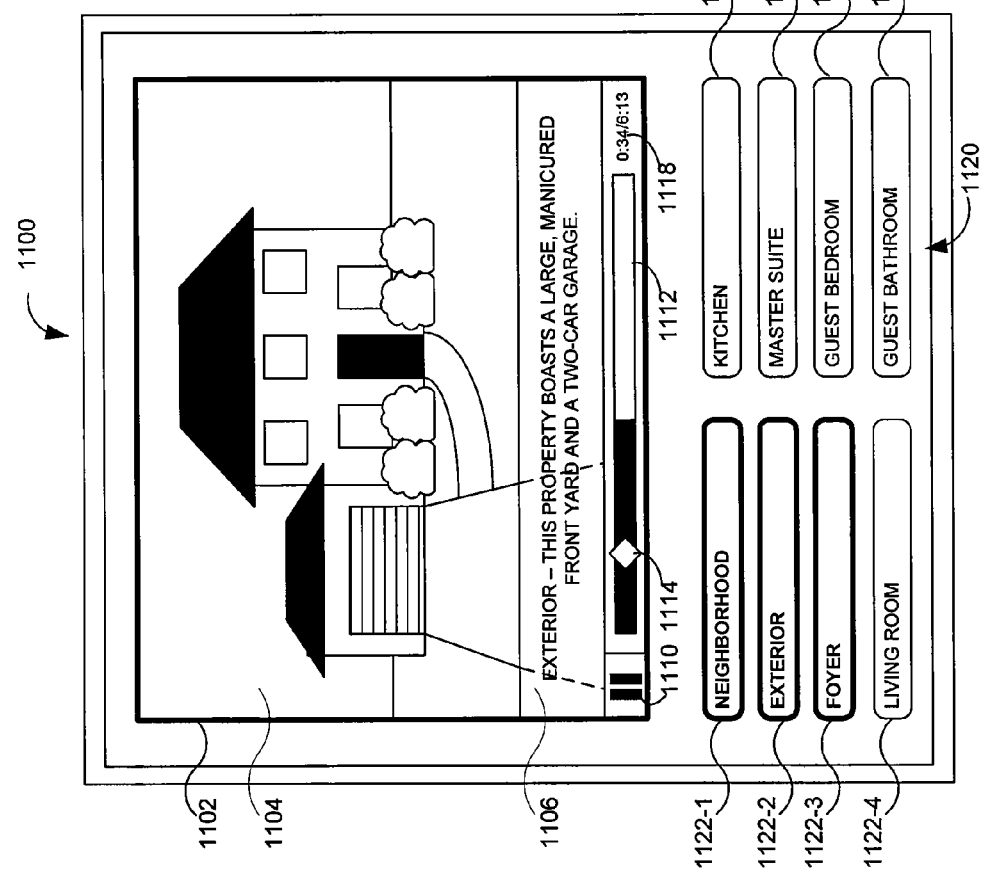

FIG. 11A provides an exemplary screen shot of an embodiment of a video playback environment as viewed by a client terminal according to the invention. The video playback screen 1100 may comprise various elements which may be useful for viewing, navigating, processing, manipulating, and performing other functions relating to video and associated information. It will be appreciated that many types of video playback screens 1100 are possible within the embodiments of the invention. As such, the video playback screen 1100 illustrated in FIG. 11 is for illustrative purposes only and should not be construed to limit the scope of the invention.

The video playback screen 1100 comprises a video frame 1102. The video frame 1102 may be configured to display video data and to allow for interactive video manipulation. The video frame 1102 may comprise a video footage area 1104, a comment area 1106, a navigation area 1108, and any other useful areas.

The comment area 1106 may display text, images, or other information describing or adding to the footage seen in the video footage area 1104. As illustrated, the comment area 1106 may span the full width and some percentage of the height of the video frame 1102. Further, as illustrated, the comment area 1106 may be overlaid on the video footage with a semi-transparent background, so the video footage is not totally obscured by the comment area 1106. Of course, the comment area 1106 may have any size, shape, color, transparency, or other useful characteristic.

The navigation area 1108 may comprise any number of navigation controls for navigating, processing, manipulating, or otherwise affecting video elements. As illustrated, the navigation area 1108 may comprise virtual buttons, like a "pause" button 1110. Further, the navigation area 1108 may comprise a video progress bar 1112 which may show various information relating to the progress of the video, e.g. loading or playback. The video progress bar 1112 may comprise other elements relating to video progress, time positions, or other useful information. For example, as illustrated, the video progress bar 1112 may change color to show progress with the video loading. Here, the video progress bar 1112 is half filled in, representing that the video is half-way through with its progressive downloading.

In some embodiments, video may load in a non-linear fashion. For example, different portions of the video may load from different servers, at different rates, etc. In another example, a client may force a portion of the video to download out of order (e.g. by selecting a cue point location relating to video data which had not yet loaded). In these non-linear download situations, or in any other useful situation, the video progress bar 1112 may be configured to display the non-linear progress. For example, different portions of the video progress bar 1112 may fill in to represent the different portions which have downloaded.

Further, the video progress bar 1112 may comprise a playback progress indicator 1114, representing the current time position of the video playback. As illustrated, the time position is about nine percent through the video footage (0:34 out of 11:13), so the playback progress indicator 1114 is about nine percent of the distance from the beginning of the video progress bar 1112 to the end. The navigation area 1108 may also comprise informational elements, such as a time indicator 1118. The time indicator 1118 may display the current time position in the video footage, the total time of video footage in the video file, time remaining for playback, or other useful information. In some embodiments, these other elements may be used as interactive controls. For example, it may be possible to drag the playback progress indicator 1114 to change the current time position of video footage being displayed in the video footage area 1104.

It will be appreciated that many types of areas, controls, and other elements are possible. For example, the navigation area 1108 may also comprise other video controls (e.g. stop, fast forward, rewind, rotate, zoom, etc.), audio controls (e.g. volume, pan, fade, equalizer controls, etc.), etc. Further, it may be possible to add or modify the elements of the video frame 1102. For example, it may be possible to drag the comment area 1106 to other locations, change its size, etc.

The video playback screen 1100 may also comprise a cue point control area 1120. The cue point control area 1120 may list available cue points associated with the video being played in the video frame 1102. In some embodiments, as video data progressively downloads, so does cue point information. For example, if half the video has loaded, only those cue points associated with time positions in the first half of the video will have loaded.

In some of these embodiments, the cue point controls 1122 may load, but may become active (e.g. capable of being interacted with) after the corresponding video data loads. For example, as illustrated, the cue point control area 1120 lists eight cue points 1122, three of which are active ("NEIGHBORHOOD," "EXTERIOR," and "FOYER"). In this example, a client would be able to click on any of the three active cue point controls (1122-1, 1122-2, and 1122-3) to navigate to those corresponding locations in the video. However, a client would not be able to click on the other five cue point controls (1122-4 through 1122-8), as the corresponding video has not yet loaded.

In an alternate embodiment, the cue point controls 1122 may become active before the corresponding video data loads. Here, all eight cue points 1122 in the cue point control area 1120 would be active, even though only a portion of the video data has loaded. If a client, for example, clicked on the fifth cue point 1122-5, the corresponding video would begin to load and playback would continue from that associated time position.

In the illustrative case, a client is viewing a video file containing footage of a house for sale. The client may desire to navigate through the video information using the cue point controls 1122. Currently, the client is watching the portion of the video data in the video footage area 1104 corresponding with the "EXTERIOR" cue point 1122-2. Further, the client may view additional information associated with the cue point (i.e. the exterior of the house, in this case) by reading the informational text displayed in the comment area 1106.

FIG. 11B provides an exemplary screen shot of another embodiment of a video playback environment as viewed by a client terminal according to the invention. The video playback screen 1150 comprises substantially the same elements as those in the video playback screen 1100 of FIG. 11A. However, in the cue point control area 1170, the cue point controls 1170 may be displayed as image, rather than text, identifiers. It will be appreciated that these images may be acquired and/or associated with the cue points in various ways. For example, the images may be selected by a client within a cue point editor, or the images may be automatically generated from the video data (e.g. by generating a still image from the frame of video data being played at the time position associated with the cue point). Here, in the illustrated embodiment, the cue point control area 1170 lists five cue points 1172, three of which are active (1172-1, 1172-2, and 1172-3) and two of which are inactive (1172-4 and 1172-5).

Figure 11C:
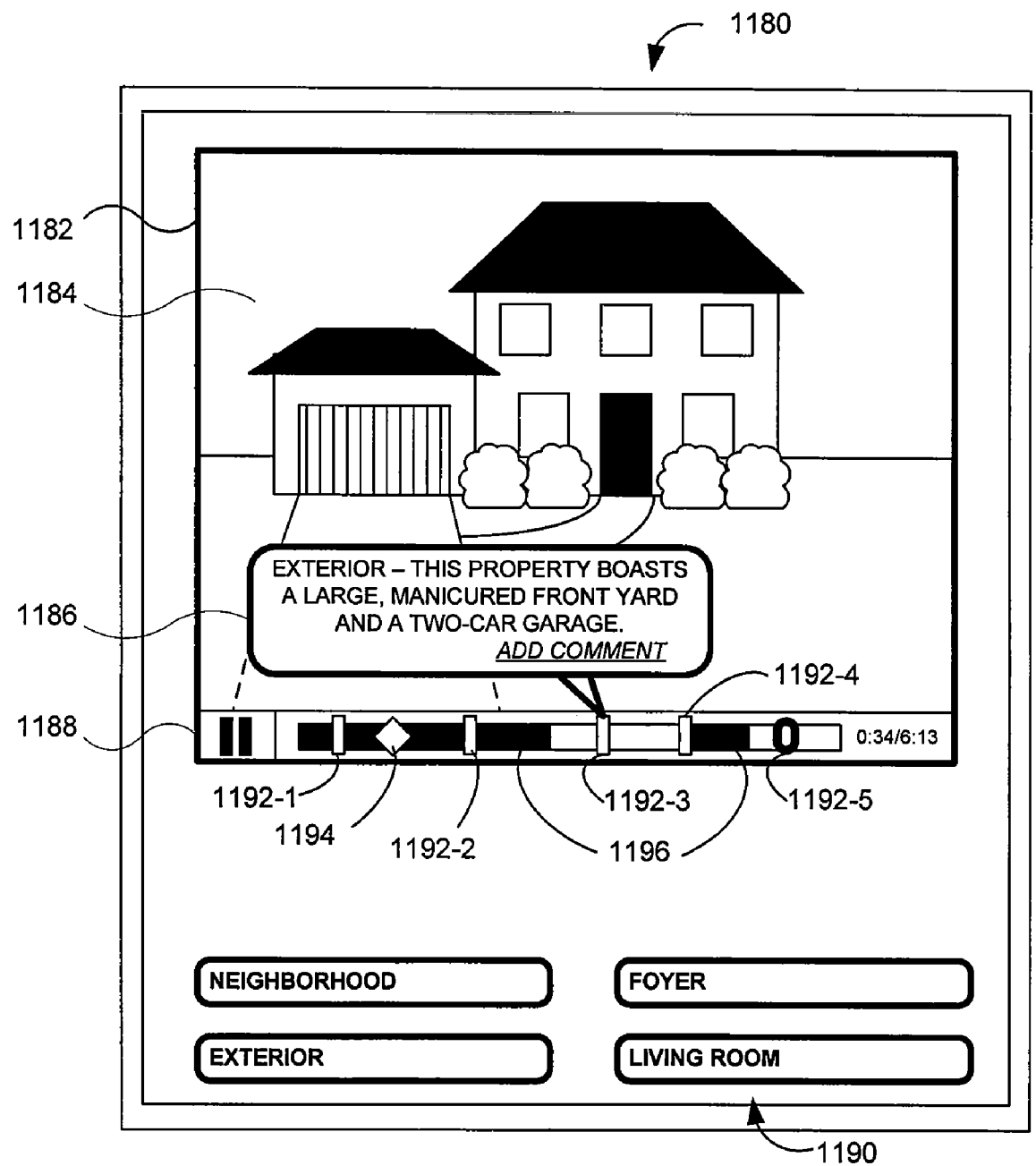

FIG. 11C provides an exemplary screen shot of yet another embodiment of a video playback environment as viewed by a client terminal according to the invention. The video playback screen 1180 may comprise various elements which may be useful for viewing, navigating, processing, manipulating, and performing other functions relating to video and associated information. As illustrated, the video playback screen 1180 comprises a video frame 1182. The video frame 1182 may be configured to display video data and to allow for interactive video manipulation. The video frame 1182 may comprise a video footage area 1184, a comment area 1186, a navigation area 1188, and any other useful areas.

The comment area 1186 may display text, images, video, or other information describing or adding to the footage seen in the video footage area 1184. Further, the comment area 1186 may have any useful aesthetic or functional characteristics, including any size, shape, color, transparency, or other useful characteristic. As illustrated, the comment area 1186 may be a "pop-up" field which appears in any part of the video playback screen 1180 for any desirable reason. In some embodiments, the comment area 1186 may appear when a client interacts with a cue point location identifier 1192. For example, the client may cause the comment area 1186 to appear by mousing over (e.g. placing the mouse pointer over), right-clicking, selecting, or otherwise interacting with a cue point location identifier 1192. In other embodiments, the comment area 1186 may appear whenever a cue point location is reached. For example, when the video playback reaches the time position associated with a given cue point, the comment area 1186 may appear, showing comment information relating to the associated cue point. The comment area 1186 may continue to display on the video playback screen 1180 for any desirable duration, including until the client closes the comment area 1186 (e.g. by clicking a "close" GUI control or by moving the mouse pointer off the cue point location identifier 1192), for some predetermined duration (e.g. until the end of the cue point or for twenty seconds), or for some other useful duration.

Even further, the client may be able to interact with the comment area 1186 in any useful or desirable way. In some embodiments, the comment area 1186 may comprise GUI controls, hyperlinks, or other modes of interactivity, allowing a client to comment on the comment. For example, a client may be able to use the comment area 1186 to view and/or add a stream of comments about a given cue point location. The client's comments may relate to the video, the cue point, another user's comments, or any other useful information. Further, the client's comment may comprise textual, audio, video, or any other information. For example, the client may add a video comment recorded by his cell phone video camera. In another example, the client may add an audio comment with appended text information and a link to a related file. In some of these embodiments, the ability to comment may be determined by the client's level of authority. Further, in some of these embodiments, the VPE may be configured to allow a client to add cue points from the VPE by commenting on the video. This may be accomplished in any useful way, including, but not limited to the ways illustrated with respect to embodiments of the VEE.

The navigation area 1188 may comprise any number of navigation controls for navigating, processing, manipulating, or otherwise affecting video elements. The navigation area 1188 may comprise a set of cue point location identifiers 1192. These cue point location identifiers 1192 graphically indicate the time positions associated with each cue point. Different identifiers may be used to indicate different types of cue points. For example, as illustrated, cue point location identifiers 1192-1 through 1192-4 represent time positions of cue points added through a VEE by a client editor, while cue point location identifier 1192-5 represents a cue point added from within a VPE (e.g. a comment) by the same or another client.

The navigation area 1188 may also comprise a video download progress bar 1196 which may show how much and what parts of the video data have been downloaded. As illustrated, the video download progress bar 1196 may be split where portions of the video are loading in a non-linear fashion. For example, here, roughly the first half of the video has downloaded, as well as some of the video data starting from the fourth cue point location indicator 1192-4 (as indicated by the two shaded areas of the video download progress bar 1196).

Further, the navigation area 1188 may comprise a playback progress indicator 1194, representing the current time position of the video playback. In some embodiments, any of the elements of the navigation area 1188 may be used as interactive controls. For example, it may be possible to drag the playback progress indicator 1194 to change the current time position of video footage being displayed in the video footage area 1184, or to drag a cue point location identifier 1192.

The video playback screen 1180 may also comprise a cue point control area 1190. The cue point control area 1190 may list available cue points associated with the video being played in the video frame 1182. As illustrated, four cue point controls are available in the cue point control area 1190. These controls correspond to four time positions within the video file, represented by four cue point location indicators (1192-1 through 1192-4).

Figure 12:
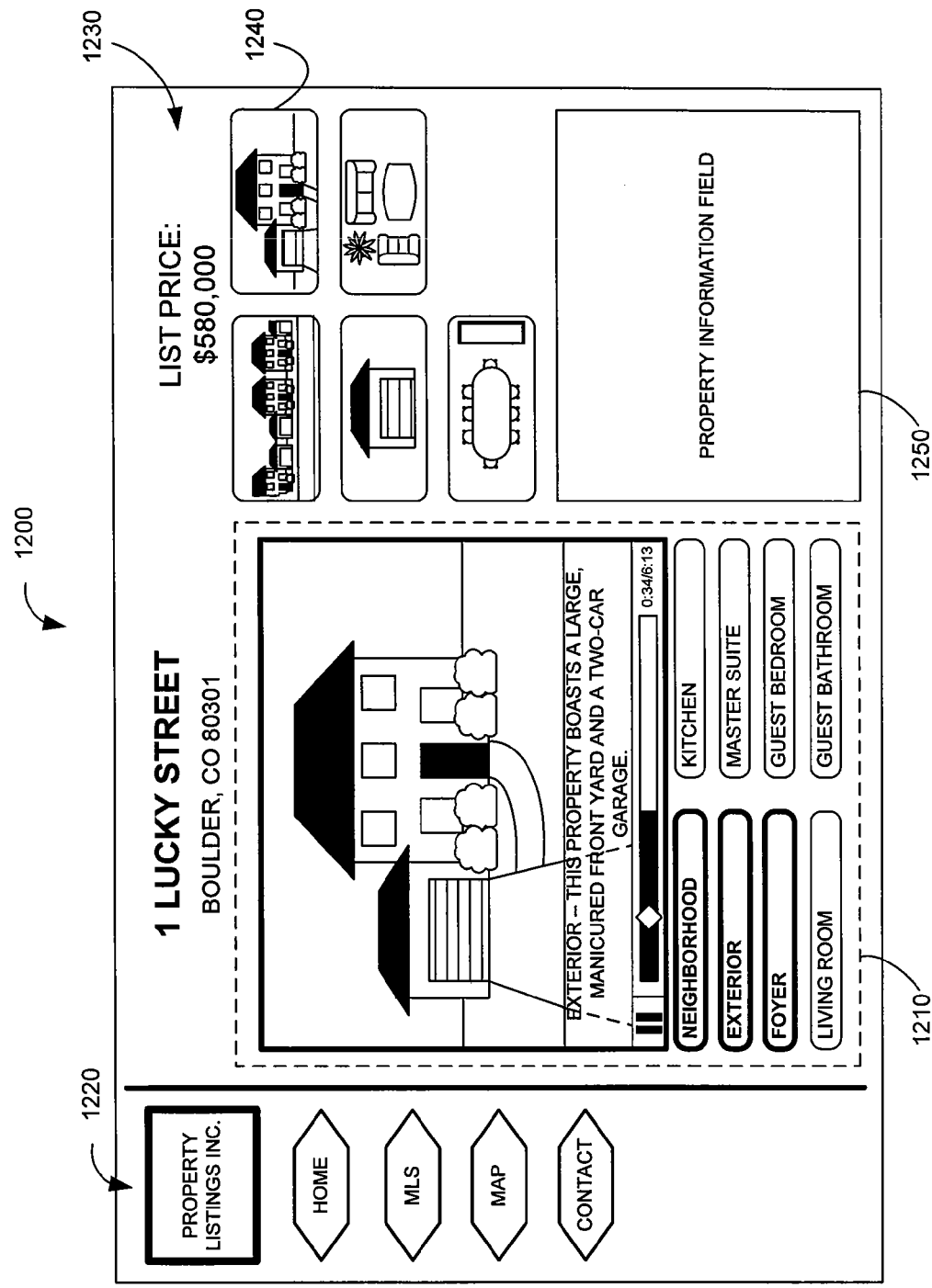
FIG. 12 provides an exemplary screen shot of a web-based environment in which an embodiment of a video playback environment is embedded according to the invention.

It will be appreciated that there are many types of environments in which the client may access these and other embodiments of the VPE. FIG. 12 provides an exemplary screen shot of a web-based environment in which an embodiment of a video playback environment is embedded according to the invention. The webpage 1200 may comprise an embedded VPE 1210. The VPE 1210 may be embedded in any useful way, including as a separate frame within the webpage 1200, as a separate window overlaid on the webpage 1200, or as embedded elements within the webpage 1200.

Further, the webpage 1200 may comprise any other elements which may be useful for viewing, navigating, and performing other functions separate from or relating to the VPE. It will be appreciated that many types of webpages 1200 are possible with almost any type of webpage elements, all capable of actively or passively interacting with embodiments of the invention. As such, the webpage 1200 illustrated in FIG. 12 is for illustrative purposes only and should not be construed to limit the scope of the invention.

The illustrated embodiment of the webpage 1200 comprises various areas which may or may not be related to the embedded VPE 1210. The webpage 1200 comprises a master frame area 1220. The master frame area 1220 in this embodiment comprises various elements relating to the website owner. The master frame area 1220 comprises an informative field (here, the logo for "Property Listings, Inc."); a "Home" button for allowing a client to navigate to the Property Listings, Inc. homepage; a "MLS" button for allowing a client to navigate to a Multiple Listing Service (MLS) search page; a "Map" button for allowing a client to navigate to a map of the location of the currently displayed property listing; and a "Contact" button for allowing a client to navigate to a page with contact information for both Property Listings, Inc. and the currently displayed property listing.

The webpage 1200 also comprises a title area 1230. The title area 1230 in this embodiment comprises various elements intended to set the context of the currently displayed property listing. Here, the title area 1230 displays the address and list price of the listed property. Additionally, the webpage 1200 comprises other types of information relating to the listed property, including various images of the property 1240 and one or more property information fields 1250. The property information field 1250 may give the client more information about the listed property, such as information found in the property's MLS listing.

In some embodiments, any or all of these fields and controls may be informational or interactive for various purposes and to various types of clients. Further, in certain embodiments, the webpage 1200 may adapt to various types of information, types of clients, etc. For example, various elements on the webpage 1200 may be associated with other information from other sources (e.g. with the client's login information or preferences, a property's listing agency, etc.), or may be inferred from other sources (e.g. from a client's search history, from the time of day, from the geographic origin of the client's request, etc.).

It will be appreciated that, while the illustrative embodiments have been shown in the context of homes for sale, many other types of property commerce are possible within the various embodiments of the invention. One category of property commerce may include other types of real estate. This category may include, for example, any type of residential or commercial real estate; and level of development (e.g. unimproved, zoned, farmland, improved, etc.); real estate being offered for purchase, rental, timeshare, swap, or any other type of commerce; or even temporary accommodations, such as hotel rooms and amenities (e.g. guest rooms, suites, pools, gyms, etc.), and business or event accommodations (e.g. conference rooms, receptions halls, amphitheaters, etc). Another category of property may include any types of products in commerce. These products may include, for example, any types of goods or services (e.g. clothing, automobiles, cleaning services, massage, etc.); any product listing types (e.g. classifieds, want ads, etc.); any types of product commerce (e.g. barter, rent, purchase, borrow, lend, auction, etc.); and any type of product commerce-related information (e.g. showroom, three-dimensional imaging, exploded views, etc.). A third category of property may include any type of informational property. This informational property may include, for example, news footage (e.g. world news, sports highlights, etc.); business or service information (e.g. restaurant listings, company profiles, stockholder information, service options); product information (e.g. product manuals); or reference information (e.g. encyclopedic information, educational video, etc.).

It will be further appreciated that many types video playback environments are possible for handling the many types of video information and many types of cue point information, all within the scope of the invention. Even further, video playback environments may be configured to perform any or all the functionality of a video editing environment. As such, the above descriptions of embodiments relating to video playback environments in FIGS. 8-12 should not be construed as limiting the scope of the invention.

Montage Video Generation

Figure 13B:
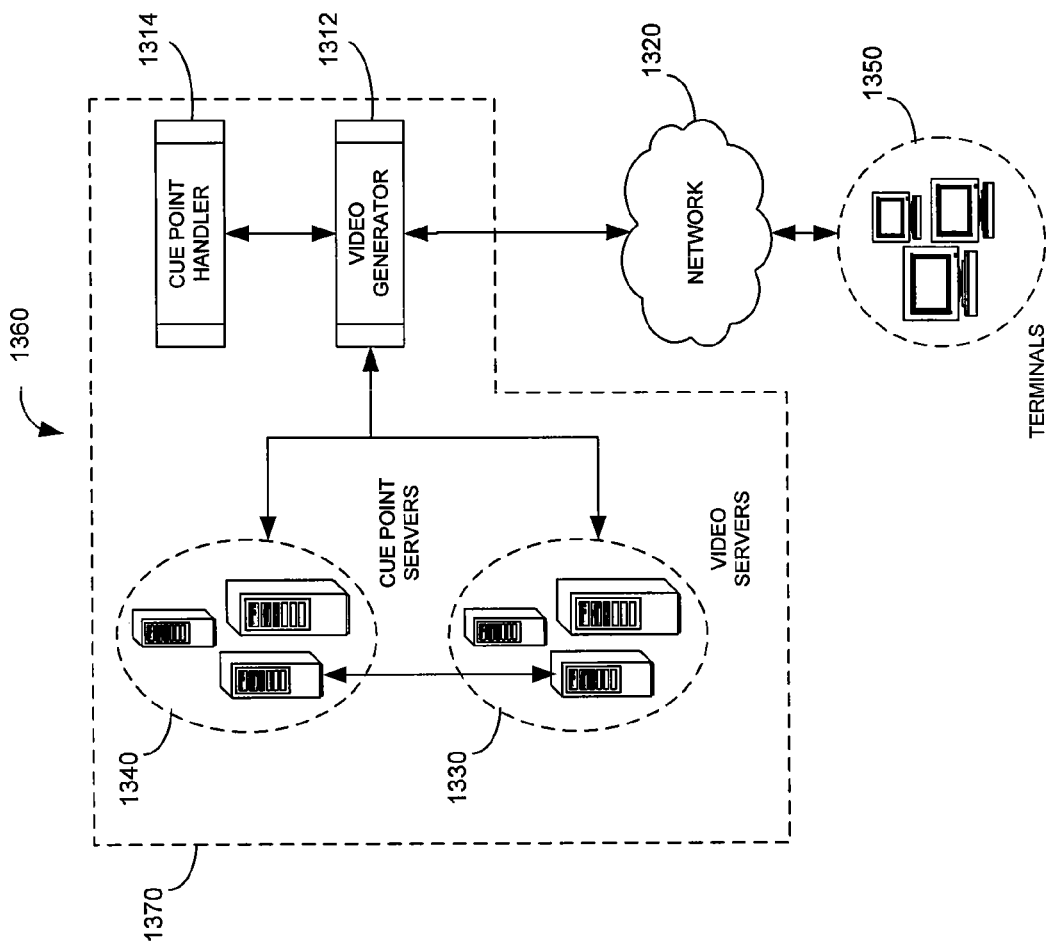
FIG. 13B provides an exemplary system diagram for integrated, server-level generation and handling of montage video information for use with various embodiments of the invention.
Figure 13A:
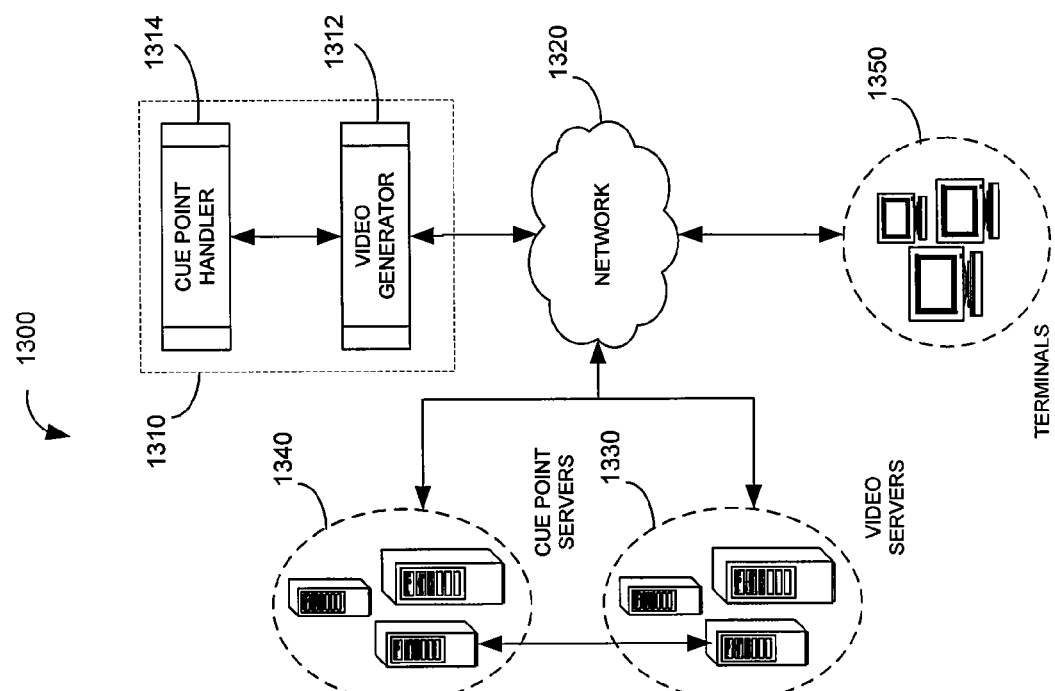
FIG. 13A provides an exemplary system diagram for server-level generation and handling of montage video information for use with various embodiments of the invention.
Figure 13C:
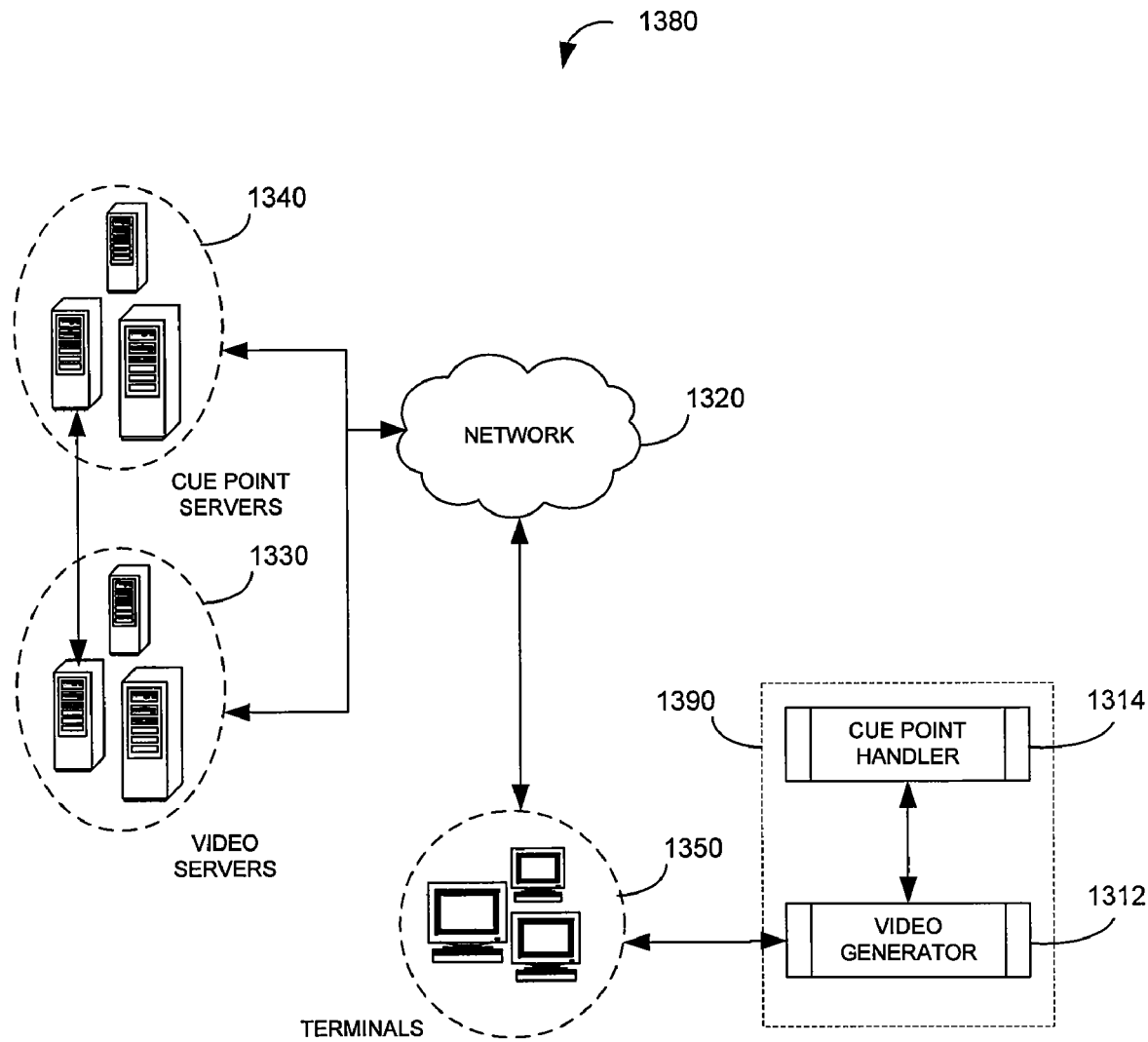
FIG. 13C provides an exemplary system diagram for client-level generation and handling of montage video information for use with various embodiments of the invention.

Embodiments of the invention provide systems and methods for montage video generation and handling using cue point information. FIGS. 13A-C provide exemplary system diagrams for generating and handling montage video information for use with various embodiments of the invention. The components and system arrangements are shown for illustrative purposes only and should not be construed as limiting the invention.

FIG. 13A provides an exemplary system diagram for server-level generation and handling of montage video information for use with various embodiments of the invention. The system 1300 comprises a video generator 1312, configured to generate montage video data. The video generator 1312 may comprise one or more computer systems, applications, processes, or any other useful component for generating montage video information.

The video generator 1312 may also be in operative communication with a cue point handler 1314, configured to handle cue point information relating to, among other things, the generation and handling of montage video information. The video generator 1312 and cue point handler 1314 may be part of a subsystem 1310. The subsystem 1310 may be owned, operated, controlled, or otherwise associated with a host party.

The subsystem 1310 or the video generator 1312 may be inoperative communication with a network 1320. The network 1320 may be any public or private, secure or insecure, wired or wireless network (e.g. the Internet). In some embodiments, the network 1320 may comprise any number of computers, configured as centralized or decentralized peer-to-peer networks, ad hoc networks, mesh networks, or any other useful configuration. For example, the network 1320 may comprise two terminals connected to one another by a Universal Serial Bus (USB) cable, each performing server functions for the other computer.

Through the network 1320, the video generator 1312 or subsystem 1310 may be able to access required or desired information from various locations. For example, video information may be accessed over the network 1320 from one or more video servers 1330, and cue point information may be accessed over the network 1320 from one or more cue point servers 1340. Further, clients my access the video generator 1312 or subsystem 1310 vie the network 1320 by using one or more client terminals 1350.

FIG. 13B provides an exemplary system diagram for integrated, server-level generation and handling of montage video information for use with various embodiments of the invention. The system 1360 comprises components which are substantially similar to those in the system 1300 of FIG. 13A. However, the subsystem 1370 integrates some or all of the servers (e.g. the video servers 1330 and cue point servers 1340) which provide information to the video generator 1312 or cue point handler 1314.

FIG. 13C provides an exemplary system diagram for client-level generation and handling of montage video information for use with various embodiments of the invention. The system 1380 comprises components which are substantially similar to those in the systems 1300 and 1360 of FIGS. 13A and 13B, respectively. However, the system 1380 is arranged so that the subsystem 1390 (possibly the video generator 1312 and/or cue point handler 1314) comprises client-level applications (e.g. resident applications on a client terminal).

The client terminals 1390 may then be in operative communication with the network 1320. Through the client terminal 1390 and the network 1320, the video generator 1312 or subsystem 1390 may be able to access required or desired information from various locations (e.g. video information from one or more video servers 1330 and cue point information from one or more cue point servers 1340).

FIG. 14 provides an exemplary flow diagram summarizing host-oriented methods for generating and handling montage video information in various embodiments of the invention. The method 1400 begins by receiving a montage request 1402. The montage request may comprise any information useful for generating a montage video file. In some embodiments, the montage request may comprise query terms representing the type of information a client wishes to view in a montage file. Further, in certain of these embodiments, the query terms may be similar or identical to cue point names, such that portions of video files associated with cue points matching those names may be selected as part of a montage video file.

Further, the montage request may be received 1402 in any useful way. In some embodiments, the montage request may be received 1402 over the internet as a transmission of montage request data. For example, the montage request may be received 1402 as part of a file which is interpreted by one or more scripts, processes, or algorithms. In another example, the montage request may be received 1402 as a function call from another system or application.

In many cases, the montage request will be received 1402 in a form which requires further processing. The method 1400 may analyze the montage request 1404 for this or other reasons. In some examples, analyzing the montage request 1404 may comprise converting the montage request to a useful format; adding, removing, or modifying data in the montage request; or inferring information from the data provided. In other examples, the data in the montage request may be analyzed 1404 against extrinsic information for other useful results. For instance, a query term may be compared to a thesaurus to generate a list of substantially similar query terms for improved query results. It will be appreciated that many different types of analysis may be possible or desired for various reasons.

Using information from the montage request, the method 1400 may generate a relational dataset 1406. The relational dataset 1406 may comprise any type of data structure useful for storing data elements in relation to one another, like a relational, multi-dimensional database. Further, the relational dataset may be generated from any useful data sources, including one or more other relational datasets.

For example, there may exist a video server, which stores and indexes video files by unique video identifiers, using a flat (or sequential) data structure; and a cue point server, which stores a network of cue point attributes in relation to a set of cue point identifiers, using a multi-dimensional relational data structure. Say a montage request represents a query for all video files associated with a query term. The method 1400 may search through the cue point server to find all cue points with names which match the query term. Using the relational data structure, the method 1400 may then be able to generate a dataset listing all those cue points in relation to useful information, like pointers to their associated video files and specific time positions within those video files where information relating to the cue point is located.

After generating the dataset 1406, the method 1400 may use the relational dataset to build a montage video file 1408. The montage video file may be generated 1408 in any useful form. In some embodiments, the montage video file may be generated 1408 as a list of pointers or other information which may be interpretable by a video playback application or system. In other embodiments, the montage video file may be generated 1408 as a video file in a playable format. For example, the generated montage video file may comprise a concatenation of video data from other video files. After (or while) the montage video file is generated 1408, the method 1400 may transmit the montage video file and any associated cue point information to a video playback application or system 1410.

FIG. 15 provides an exemplary flow diagram summarizing client-oriented methods for generating and handling montage video information in various embodiments of the invention. The method 1500 begins when the client generates a montage request 1502. The client may generate a montage request 1502 in any useful way. In one embodiment, the client may enter query terms into a field on a client terminal using some input device. In another embodiment, an automated client (e.g. an application or computer system) may automatically generate a montage request 1502. For example, an application may generate a montage request 1502 by inferring query terms which may be desirable to an end user from a previous pattern of search conduct.

The client may then transmit the montage request 1504 in any useful way. In some embodiments, the montage request may be transmitted 1504 over the internet as part of a file which is interpreted by one or more scripts, processes, or algorithms. In other embodiments, the montage request may be transmitted 1504 as one or more function calls from other systems or applications.

Sometime after transmitting the montage request 1504, the client may receive a montage video file and associated cue point information 1506. The montage video file and cue point information may be received 1506 in any useful form. For example, the montage video file may be received 1506 as a video file in a playable format, and the cue point information my be received 1506 as functions which generate cue point GUI controls. In some embodiments, after (or while) the montage video file and cue point information is being received 1506, the client may play the montage video file 1508 on a video playback application or system. Additionally, in some embodiments, the client may navigate playback of the montage video file using the cue point information 1510 (e.g. by interacting with a cue point GUI control).

Figure 16:
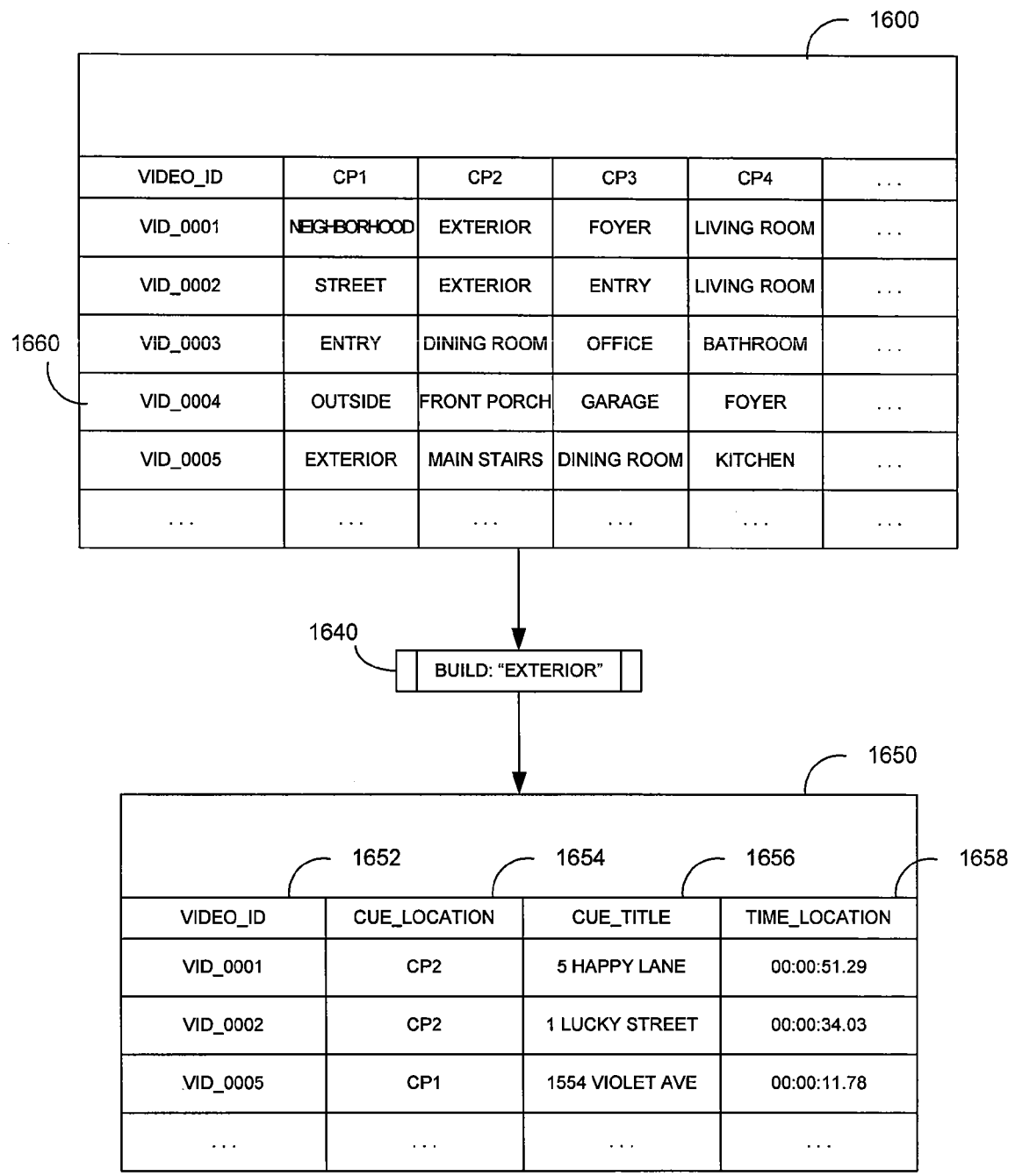
FIG. 16 provides an exemplary set of data structures for use with generating embodiments of montage video data according to the invention.

FIG. 16 provides an exemplary set of data structures for use with generating embodiments of montage video data according to the invention. It will be appreciated that many data structures are possible for storing and handling information relating to raw video, montage video, and cue points. As such, the illustrated data structures are purely exemplary and should not be construed as limiting the invention.

Say a cue point dataset 1600 is provided, which is substantially the same as the dataset illustrated in and described in reference to FIG. 7. As illustrated, the cue point dataset 1600 stores cue point names in relation to associated video identifiers. Though not shown, the cue point dataset 1600 also stores various types of cue point information in relation to each cue point entry. For example, each cue point entry may be stored in relation to a specific time position within a video file.

Further, say a client wishes to generate a montage video file of all home exteriors. In the illustrated embodiment, each video file with video data related to home exteriors is related to a cue point with the name "Exterior". This cue point was associated with the video information at some point, for example, by some client using a video editing environment with a cue point handler and a cue point editing mode. The cue point "Exterior" in each video file represents the time position identified as where the footage begins to refer to the home's exterior.

A command 1640 may be generated (e.g. transmitted by a client, received by a host or application, etc.), requesting that a dataset is built for all "Exterior" cue points. The result of this build command 1640 is a generated dataset 1650. The generated dataset 1650 may comprise any useful attributes for generating a montage video file of all footage relating to home exteriors. In some embodiments, the generated montage video file will be displayed along with a generated set of cue points representing the source of that section of montage video data. Therefore, it may be necessary to generate information as part of the generated dataset 1650 to facilitate the generation of the new cue point set.

In the illustrated embodiment, the generated dataset 1650 comprises a list of video identifiers 1652 which matched the build command 1640 (e.g. which comprise home exterior footage). The generated dataset 1650 further comprises a set of related attributes to facilitate the generation of the new set of cue points for the video montage file. These attributes include "CUE_LOCATION" 1654, an ordinal identifier representing which of the cue points associated with the video file is the "Exterior" cue point; "CUE_TITLE" 1656, a text field representing the text which will be displayed within a GUI control representing each new cue point; and "TIME_POSITION" 1658, a field representing the time position within the video file where the footage associated with the cue point begins.

The listed video files 1652 each relate to a cue point with a name which exactly matches the criteria passed with the build command 1640 (i.e. "Exterior"). It may be desirable in some cases, however, to include video files in the results list when an associated cue point name is similar (or meets some sort of algorithmic result). For example, the first cue point in the video file associated with identifier "VID_0004" 1660 is named "Outside". Based on some algorithm (e.g. a comparison to a thesaurus entry), it may be determined that "Outside" is similar enough to "Exterior" to include "VID_0004" in the generated list of results 1652. It will be appreciated that many different types of algorithms may be used for different purposes. For one example, the algorithm may check for cue points with similar spelling or phonetics. For another example, the algorithm may keep track of statistics (or databases) allowing it to infer (or look up) that when clients search for X, they tend to also want to find Y. For instance, the algorithm may determine that clients searching for homes for sale and looking at "Master Bedroom" cue points would typically be interested in "Master Suite" cue points, as well.

It will be appreciated that other algorithms, functions, processes, etc. may be used to affect the generated montage video file. In some embodiments, the order of the video footage used to generate the montage video file may be determined in some desirable way. For example, the order of footage may be determined by the order in which the footage is located by a video generator, by how closely the video footage matches the montage request, by a ranking of the video files (e.g. by associating client rankings with the video files, by allowing parties to pay for higher rankings, etc.), by geographic distance from the client, or by any other algorithm or process.

Figure 17A:
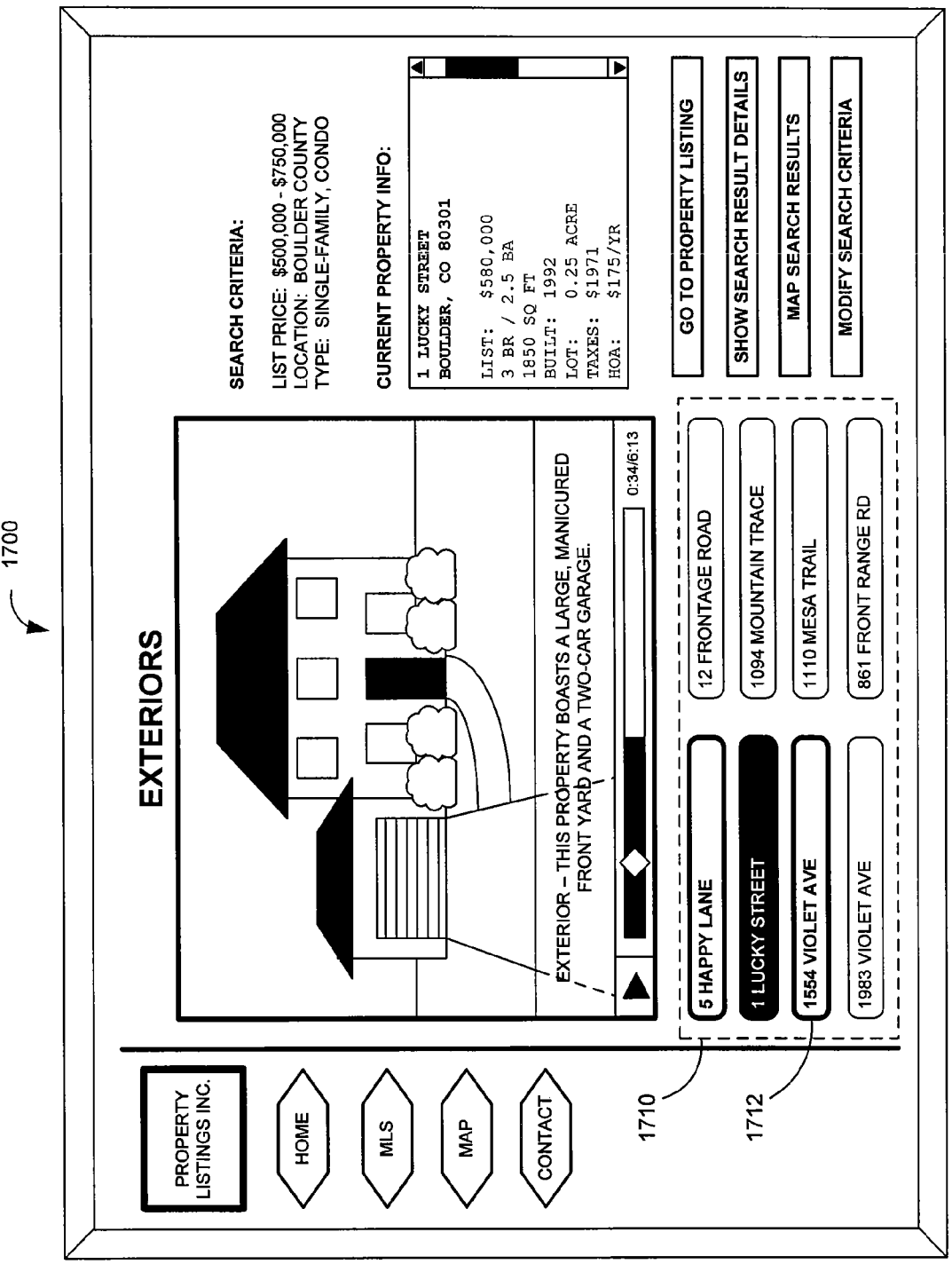
FIGS. 17A and 17B provide exemplary screen shots of (embodiments of montage video data being displayed in the context of video playback environments as viewed by client terminals according to the invention.
Figure 17B:
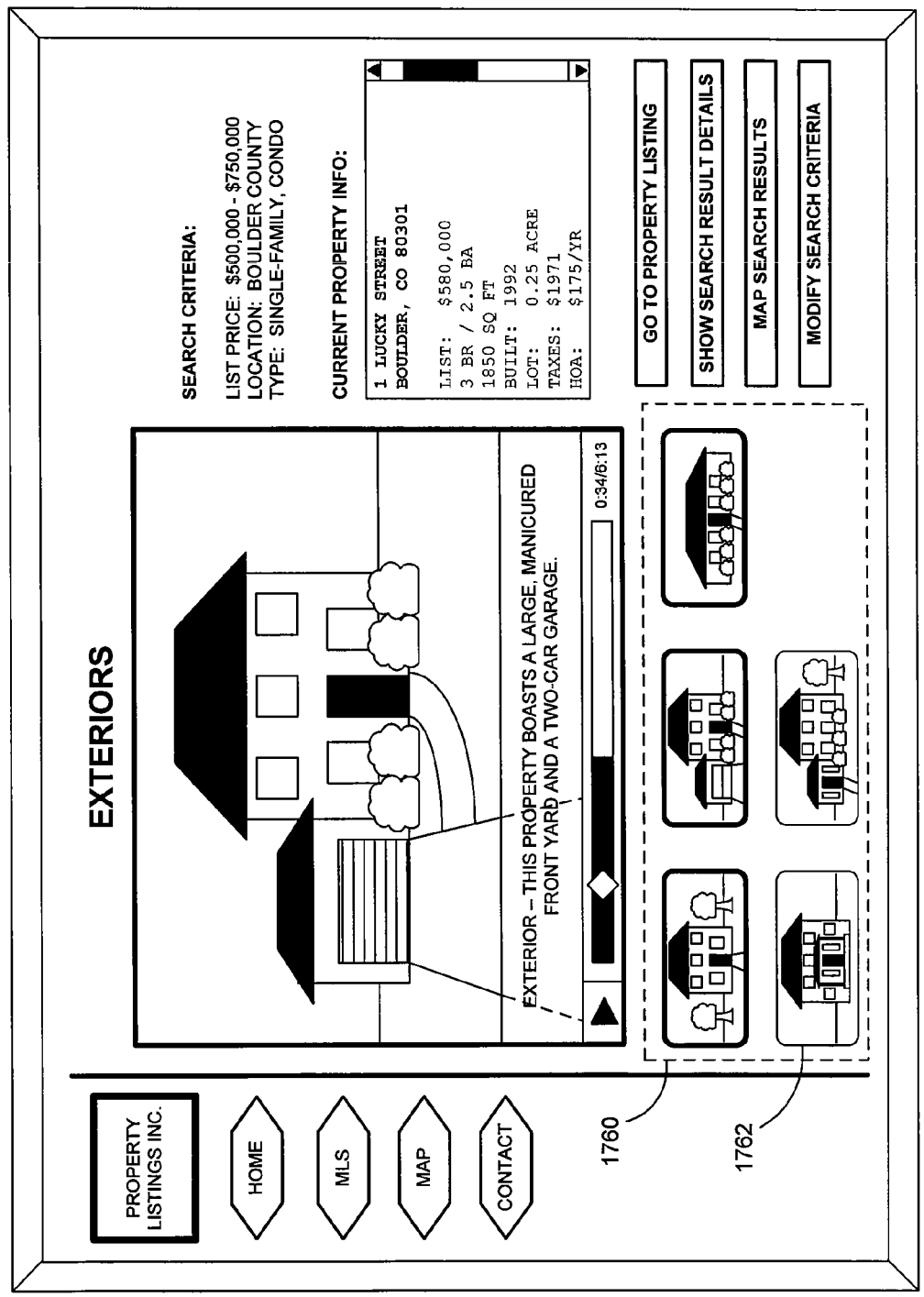

FIGS. 17A and 17B provide exemplary screen shots of embodiments of montage video data being displayed in the context of video playback environments as viewed by client terminals according to the invention. FIG. 17A provides a video playback environment 1700 which is substantially identical in form and function to the webpage 1200 of FIG. 12, except for the cue point control area 1710.

The cue point control area 1710 comprises a set of cue point GUI controls 1712. Each GUI control 1712 is configured to allow the client to navigate to the portion of the video footage corresponding to the property listing matching the cue point name. As illustrated, the video file being played is a montage video file generated from the set of video files containing an "Exterior" cue point. Therefore, if the client views the video file in its entirety, she will see all video footage relating to home exteriors. By interacting with the GUI controls 1712, she may jump to exterior footage relating to a specific property listing.

The exemplary video playback environment 1750 of FIG. 17B is substantially identical to the video playback environment 1700 of FIG. 17A, except that the cue point GUI controls 1760 comprise image identifiers 1762, rather than text identifiers. It will be appreciated that these image identifiers 1762 may be generated and displayed in any useful way. For example, the images may be selected and uploaded by a client in a video editing environment, stored in relation to the cue point in a cue point server, and retrieved for display from the cue point server by the video playback environment 1750.

Figure 18:
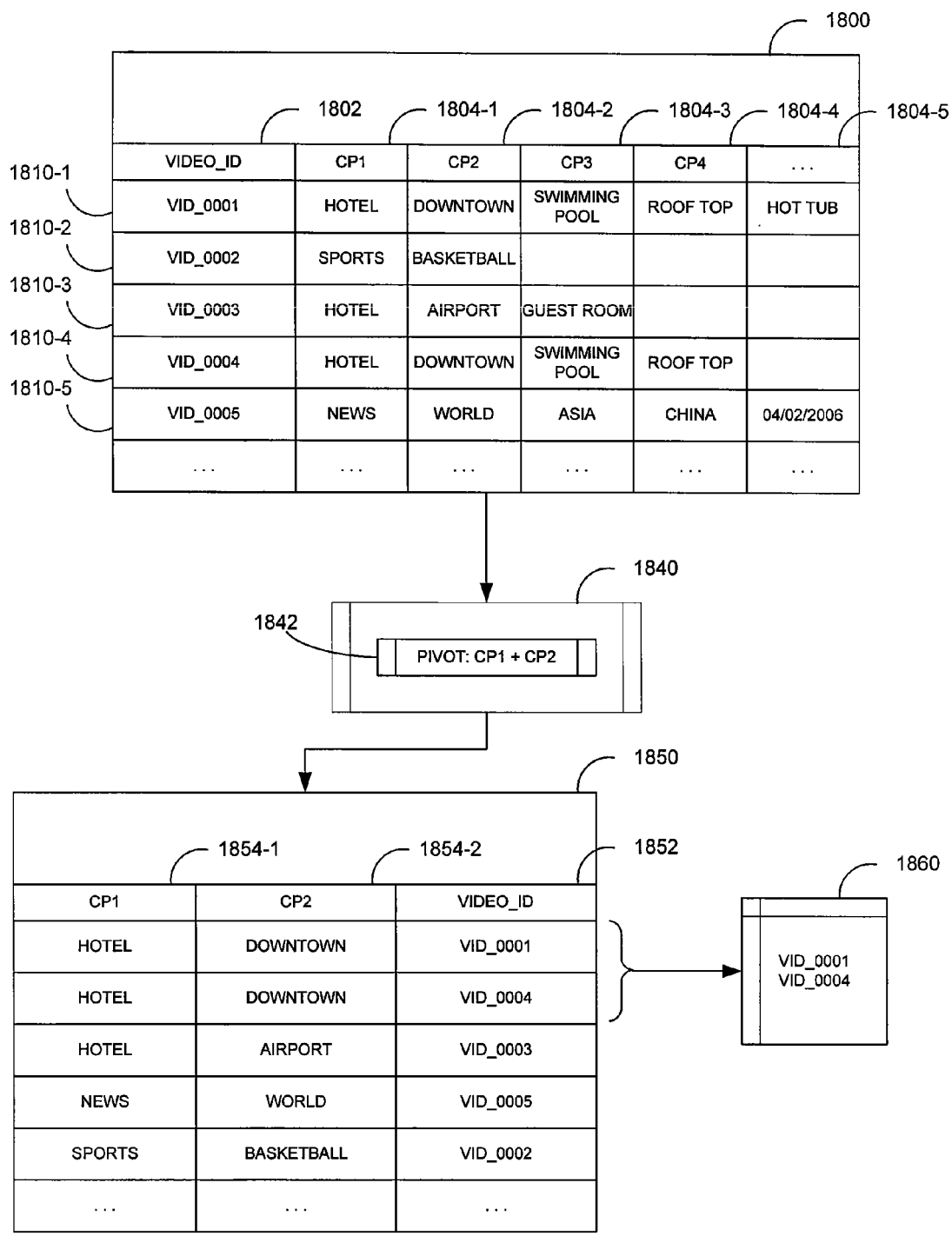
FIG. 18 provides an exemplary set of data structures for use with generating embodiments of montage video data from hierarchical montage requests according to the invention.

FIG. 18 provides an exemplary set of data structures for use with generating embodiments of montage video data from hierarchical montage requests according to the invention. In the illustrated embodiment, a cue point dataset 1800 is provided, comprising a list of video identifiers 1802, and a set of associated cue points 1804 for each video identifier 1802.

The set of cue points 1804 represent hierarchical cue points, such that cue points in the CP1 column 1804-1 represent a metatag describing the major category into which the video represented by the video identifier 1802 falls. Cue points in the CP2 column 1804-2, then, represent a metatag describing the sub-category into which the video represented by the video identifier 1802 falls. For example, looking at the video identified by the first video identifier 1810-1, the CP1 cue point 1804-1 is named "Hotel", and the CP2 cue point 1804-2 is named "Downtown". Therefore, the video represented by "VID_0001" 1810-1 is presumably a video about a downtown hotel.

The remaining cue points (e.g. 1804-3 and 1804-4) relating to each video identifier 1802 may represent either time positions or meta-tags of further subordinate categories. For example, looking again at the video identified by "VID_0001" 1810-1, the CP3 cue point 1804-3 is named "Swimming Pool", and the CP4 cue point 1804-4 is named "Roof Top". In this example, the CP3 cue point 1804-3 ("Swimming Pool") represents a time position within the video file "VID_0001" where the footage begins to relate to the hotel's swimming pool. The CP4 cue point 1804-4 ("Roof Top") may either represent a metatag further describing the subcategory of swimming pools (e.g. for narrowing search queries), or the CP4 cue point 1804-4 may represent the time position of video footage relating to the hotel's roof top pool, as opposed to the footage beginning at the CP3 cue point 1804-3 which may relate to the hotel's other pool.

In a second example, looking at the video identified by "VID_0002" 1810-2, the CP1 cue point 1804-1 is named "Sports", and the CP2 cue point 1804-2 is named "Basketball". In this example, both cue points (CP1 1804-1 and CP2 1804-2) represent meta-tags describing the category and sub-category into which the video file "VID_0002" falls. In this example, the video file "VID_0002" may be a basketball highlight reel pulled from or uploaded by a sports network, with no additional cue points added.

In a third example, looking at the video identified by "VID_0005" 1810-5, the CP1 cue point 1804-1 is named "News", the CP2 cue point 1804-2 is named "World", the CP3 cue point 1804-3 is named "Asia", the CP4 cue point 1804-4 is named "China", and the CP5 cue point 1804-5 is named "Apr. 2, 2006". In this example, all five cue points (CP1 1804-1, CP2 1804-2, CP3 1804-3, CP4 1804-4, and CP5 1804-5) represent meta-tags describing progressively subordinate categories into which the video file "VID_0005" falls. In this example, the video file "VID_0005" may be a news reel stored on a video server owned and operated by a news website. The video file "VID_0005" may comprise footage relating to headline news in China on Apr. 2, 2006.

As part of a query, a query command 1840 may be executed. This query may be the result of any effective type of query from any source. For example, a client may type a set of search terms into a text field on a website. The website may then execute a script which uses text processing algorithms, like Boolean logic, to analyze the query request and generate a query command 1840. In another example, a computer system may be configured to periodically scan the Internet for video footage relating to a specific subject and store the results. The computer system may generate a query command 1840 to effectuate its Internet search.

In the illustrated embodiment, the query command 1840 represents a query to generate a montage video file of all video footage relating to all downtown hotels. One step in the query command 1840 may be a pivot command 1842, which effectively re-sorts the cue point dataset 1800, first by CP1 1804-1 and then by CP2 1804-2. The generated dataset 1850 is the result of that pivot command 1842. Using the generated dataset 1850, the query command 1840 may return the subset of video identifiers 1852 for which CP1 1854-1 is named "Hotel" and CP2 1854-2 is named "Downtown". As illustrated, this results subset 1860 would comprise "VID_0001" and VID_0004". Of course, additional logic and/or data processing may reveal that, in this context, "Airport" is substantially similar to "Downtown" (e.g. the airport is in the downtown area). In that case, the query may be configured to also return "VID_0003" as part of the results subset 1860.

Figure 19A:
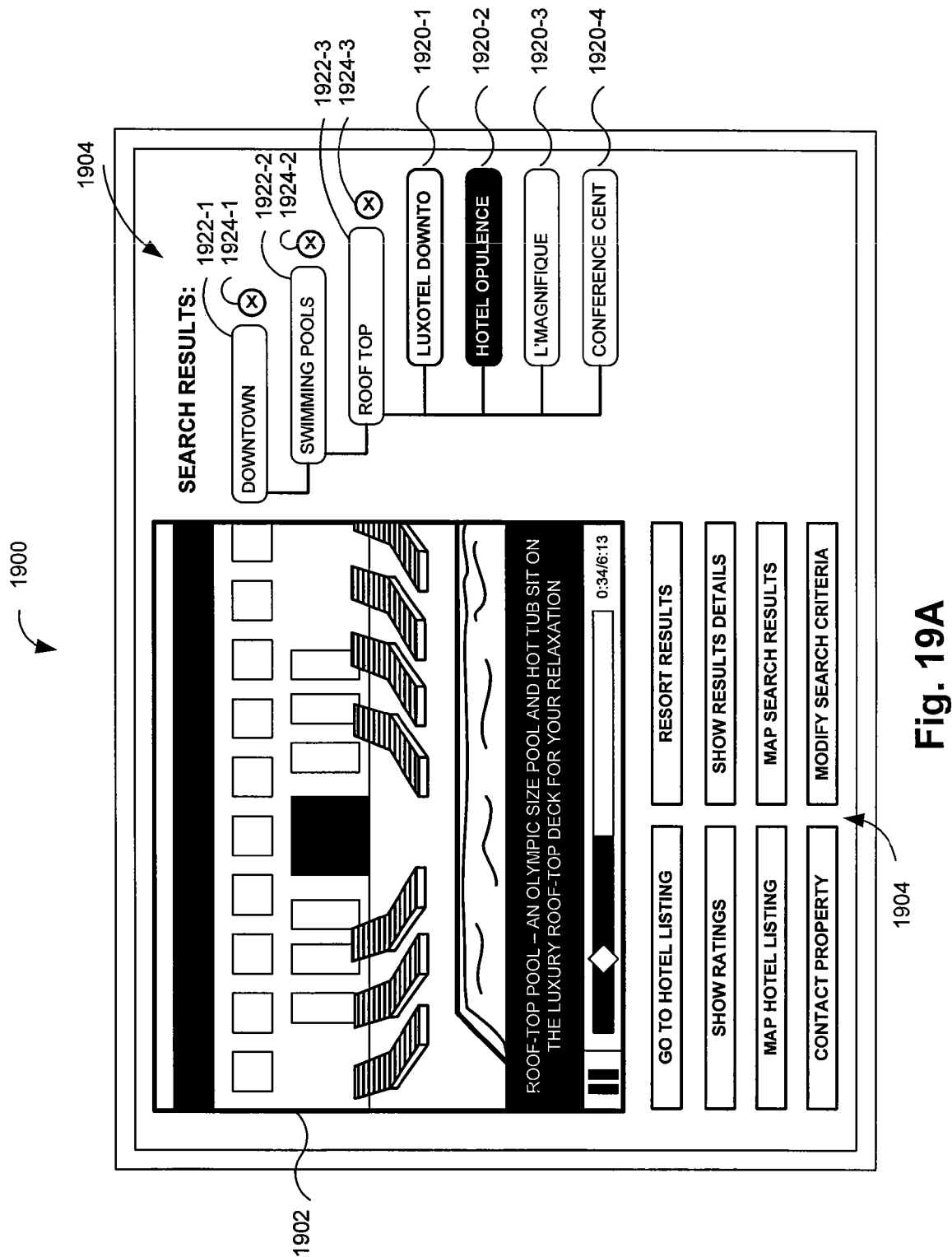
FIGS. 19A-19C provide exemplary screen shots of embodiments of montage video data resulting from hierarchical montage requests being displayed in the context of video playback environments according to embodiments of the invention.
Figure 19B:
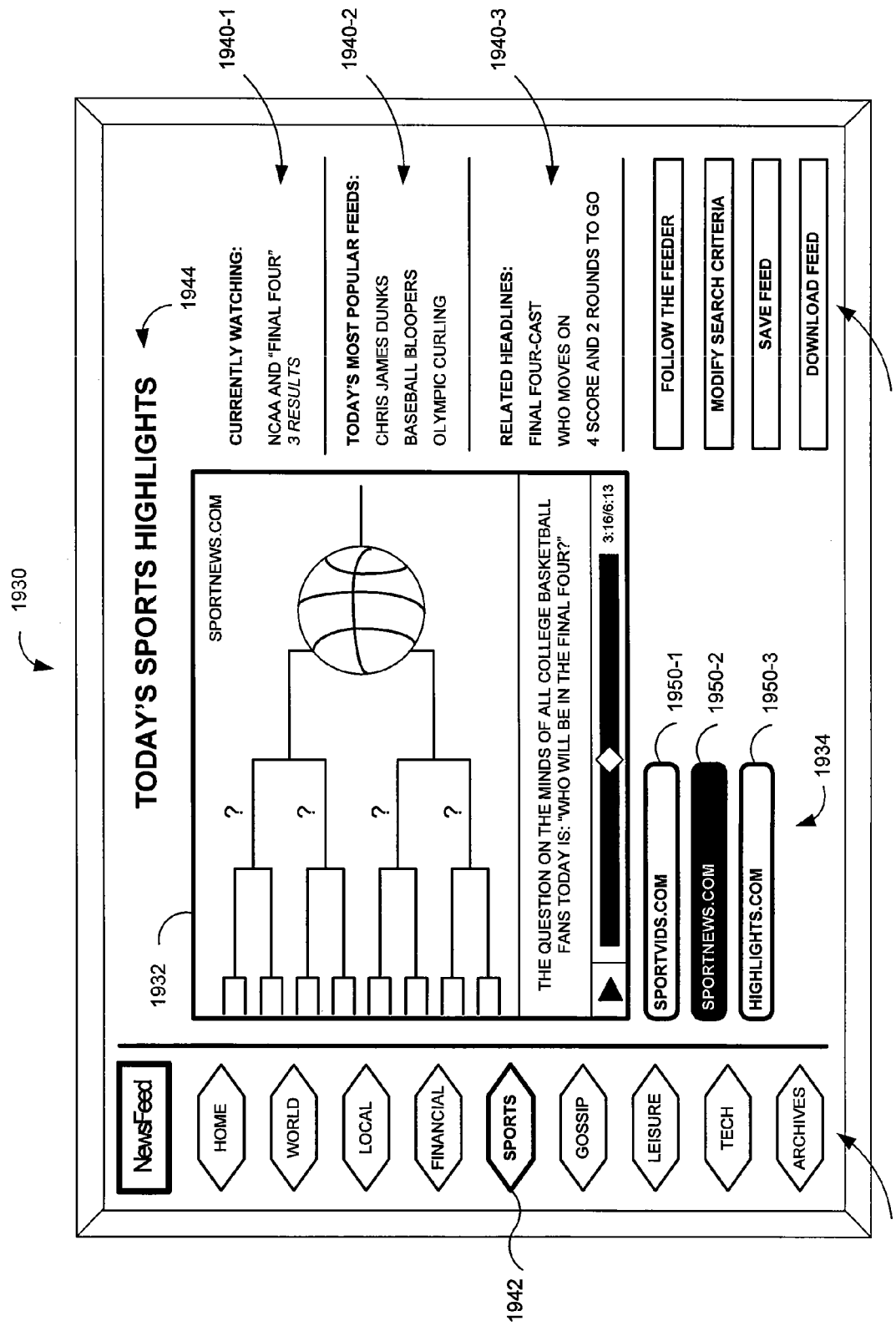
Figure 19C:
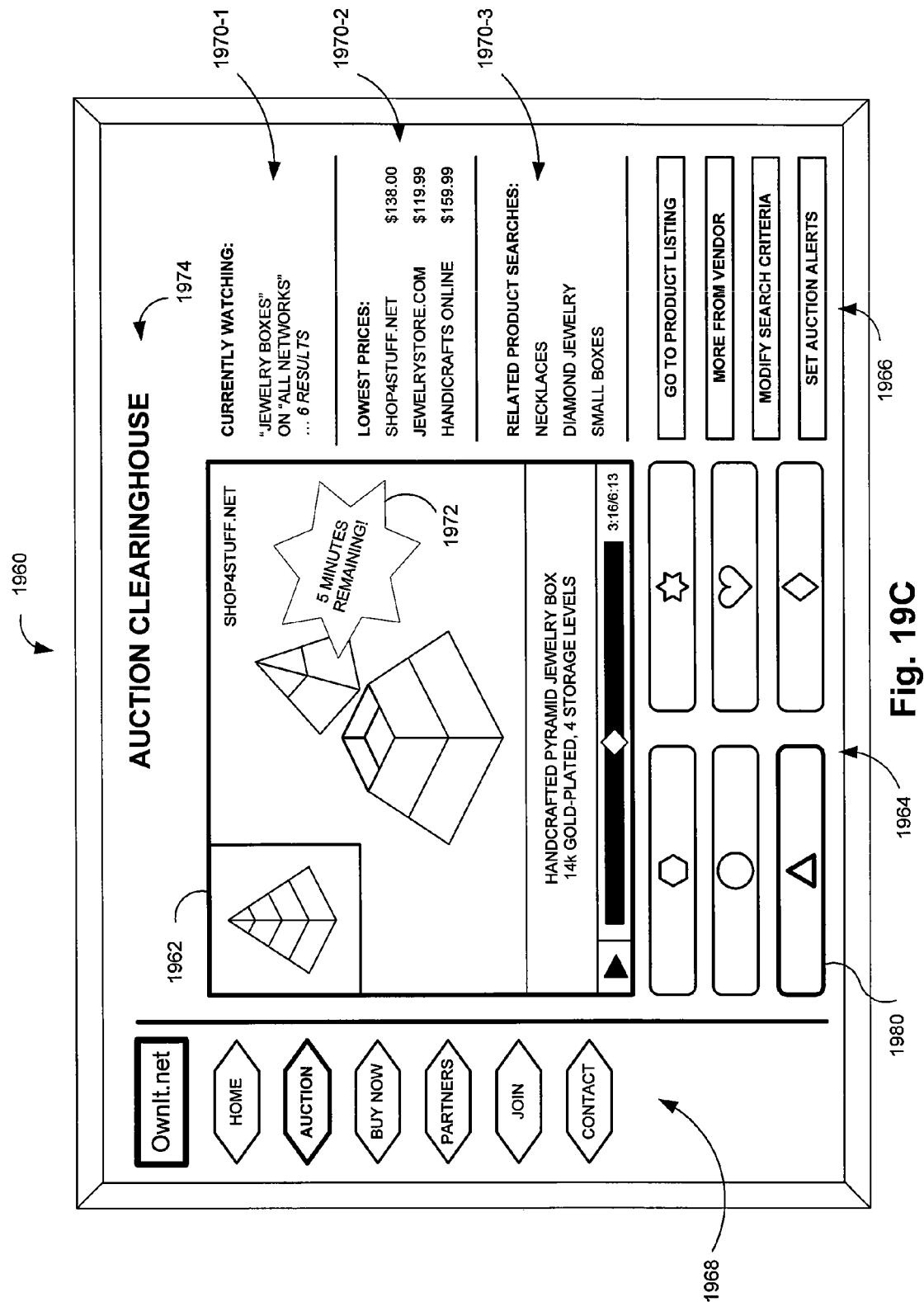

FIGS. 19A-19C provide exemplary screen shots of embodiments of montage video data resulting from hierarchical montage requests being displayed in the context of video playback environments according to embodiments of the invention. Each of FIGS. 19A-19C are intended for illustrative purposes only, and should not be construed to limit the invention.

FIG. 19A provides a screenshot 1900 of a search result being displayed by a video playback environment on a client terminal. The client in this exemplary case submitted a query for video footage relating to roof-top swimming pools in downtown hotels. The client's search returned a montage video file comprising video relating to four results, represented by the four result cue point controls 1920-1, 1920-2, 1920-3, and 1920-4. As illustrated, each result cue point control 1920 represents a time position in the video montage file relating to footage of a particular hotel's roof-top swimming pool.

The screenshot 1900 comprises several GUI elements, including a video frame 1902, a search results area 1904, and a control panel area 1906. The video frame 1902 is configured to play the montage video file, related information (e.g. comment information, elapsed time, etc.) and to allow for client interactivity with the video data (e.g. by providing navigational GUI controls, like a "pause" button and a playback position slider). Further, the video frame 1902 is configured to progressively download the video data, so that the client may play video data as it loads. In this case, a download progress indicator 1908 indicates that the video file is less than half way through downloading (the shaded area takes up less than half the total area allotted for the download progress indicator 1908); and a playback progress indicator 1910 indicates that playback is around nine percent of the way through the total video data.

In some embodiments, video may load or be played back in a non-linear fashions. For example, different portions of the video may load from different servers, at different rates, etc. In another example, a client may force a portion of the video to download out of order (e.g. by selecting a cue point location relating to video data which had not yet loaded). In these non-linear download situations, or in any other useful situation, the download progress indicator 1908 may be configured to display the non-linear progress. For example, different portions of the download progress indicator 1908 may fill in to represent the different portions which have downloaded.

The search results area 1904 is configured to display search results in a useful way. As illustrated, the search results area 1904 may display both the result cue point controls 1920 and other hierarchical data relating to the search results. For example, here, the client searched on a website devoted to hotels, so the broadest category of the client's query is implicitly video footage about hotels (or alternately, the query may search video footage on a video server devoted exclusively to hotel footage). The sub-categories or the query are downtown, then swimming pools, then roof-top, yielding roof-top swimming pools in downtown hotels.

Each criterion may be represented by a criterion control 1922. Further, those criterion controls 1922 may allow for certain types of interactivity. In some embodiments, a client may be able to click and/or drag the criterion controls to potentially adjust the query results by reordering query criteria. Additionally, the criterion controls 1922 may comprise or be associated with other controls, like delete controls 1924. A delete control 1924 may be configured to remove a query criterion and re-run the query. Say, for example, the client clicks the second-level delete control 1924-2, effectively removing the "Swimming Pools" criterion from the query. The GUI may remove the "Swimming Pools" criterion control 1922-2, and the query may re-run with the remaining criteria, "Hotels," "Downtown," and "Roof-Top." The query may then return footage of all roof-tops of downtown hotels, regardless of whether the roof-top has a swimming pool.

The search results area 1904 may also comprise various result cue point controls 1920, each representing a time position in the video montage file. By interacting with a cue point control 1920, a client may jump to the associated location within the montage video file. For example, as illustrated, the client has selected the "Hotel Opulence" cue point control 1920-2 (represented by the inverted coloration), representing footage of the roof-top swimming pool at the Hotel Opulence. The footage begins 34 seconds into the montage video file. Therefore, the montage video file is playing in the video frame 1902 from the time position of 34 seconds.

In some embodiments, the cue points may load progressively along with the montage video data. In some cases, cue points may become active (e.g. available for interaction) only after their respective video data loads. For example, in the illustrated embodiment, the third and fourth cue points ("L'Magnifique" and Conference Center", respectively) represent time positions at 3:30 and 5:00 in the montage video file, but only the first three minutes of video data have loaded. Therefore, the third and fourth cue points may remain active until more video data loads. This inactive status may be represented in some useful way by the GUI, for example by changing the weight of the lines and text associated with the third and fourth cue point controls (1920-3 and 1920-4, respectively).

Alternatively, cue points may be activated before their respective video data loads. For example, cue points may load when the video data begins to download. When a client selects a cue point before its respective video data has loaded, the video data may begin to progressively download from that cue point time position. When the video data for that cue point has finished loading, other video data may continue to load in any desirable order.

The control panel area 1906 may comprise any number of useful controls. In the illustrated embodiment, the control panel area 1906 comprises eight GUI controls. The first four relate to the current listing (e.g. the hotel currently being displayed in the video frame 1902, the Hotel Opulence, in the illustrative case). These first four controls include a "Go To Hotel Listing" button for allowing a client to load the full listing of (and possibly the full video footage relating to) the current hotel listing; a "Show Ratings" button for allowing a client to view ratings associated with the current hotel listing; a "Map Hotel Listing" button for allowing a client to view a map of the geographic location of the current hotel listing; and a "Contact Property" button for allowing a client to view contact information or to contact (e.g. provide the client with an email form, place a voice-over-internet-protocol (VoIP) phone call, etc.) the current hotel listing. The remaining four controls in the control panel area 1906 relate to the search results. These four controls include a "Resort Results" button for allowing a client to change the sorting criteria (e.g. distance from a geographic location, alphabetical, average room price, closest match to query criteria, etc.) and reorder the search results accordingly; a "Show Results Details" button for allowing a client to view detailed information relating to the search results (e.g. a side-by-side comparison of the results, a new frame with important additional information on each listing, etc.); a "Map Search Results" button for allowing a client to view a map of the geographic locations of all the hotels in the results list; and a "Modify Search Criteria" button for allowing a client to adjust the query criteria in any useful way.

FIG. 19B provides a screenshot 1930 of another illustrative embodiment of the invention. The screenshot 1930 comprises several GUI elements, including a video frame 1932, a search results area 1934, a control panel area 1936, a global navigation area 1938, a title area 1944, and various informational areas 1940. The video frame 1932 is configured to play the montage video file and related information, and to allow for client interactivity with the video data.

The search results area 1934 is configured to display result cue point controls 1950. For example, here, the screenshot 1930 represents a scenario in which a client is searching for news feeds on a functional website which provides access to news feeds relating to many diverse subjects from sources all over the Internet, called "NewsFeed". Specifically, the client has searched for footage relating to the National Collegiate Athletic Association's (NCAA) Final Four competition, by providing the Boolean search criteria, "NCAA+'Final Four'" (i.e. video footage relating to cue points with both names). The query resulted in three results, represented in the search results area 1934 as three result cue point controls 1950. In some embodiments, as in this illustrative case, the context from which the query was run may provide additional query terms. For example, the client in this case is on a news feeds site, on a section of the site devoted to sports (see the active global navigation control "Sports" 1942), and in a section of the sports site devoted to "Today's Sports Highlights" (see the title area 1944). As such, the query may actually comprise a Boolean search for "'News Feed'+Sports+Highlights+[Today's Date]+NCAA+'Final Four'" (where [Today's Date] represents the date of the search). By interacting with the result cue point controls 1950, a client may jump to the associated location within the montage video file. For example, as illustrated, the client has selected the "SportsNews.com" cue point control 1950-2 (represented by the inverted coloration), representing news feed footage relating to the Final Four from the functional website, SportsNews.com. The footage begins 3:16 into the montage video file. Therefore, the montage video file is playing in the video frame 1932 from the time position of 3:16.

The control panel area 1936 may comprise any number of useful controls. In the illustrated embodiment, the control panel area 1936 comprises four GUI controls, including a "Follow the Feeder" button for allowing a client to load the full video footage relating to the Final Four from the currently playing news feed source (e.g. clicking the button may take the client to SportsNews.com, and/or show the client the full NCAA footage from that site); a "Modify Search Criteria" button for allowing a client to adjust the query criteria in any useful way; a "Save Search Criteria" button for allowing a client to save the current search criteria (e.g. to further allow the client to perform the same search again at another time); and a "Download Feed" button for allowing a client to download and/or save the current montage video file to the client's terminal.

The global navigation area 1938 may comprise any number of useful controls for navigation around the host site. In the illustrated embodiment, the host site provides navigational controls to categories of information, including "World," "Local," "Financial," "Sports," "Gossip," "Leisure," and "Tech," news. Additionally, the host site provides navigational controls for access to the host's home page and various archives.

The informational areas 1940 may comprise any number of informational fields, which may or may not be interactive. In the illustrated embodiment, the informational areas 1940 comprise three informational fields, including a "Currently Watching" field 1940-1 configured to display the current query criteria and results which generated the currently displayed montage video file and cue points; a "Today's Most Popular Feeds" field 1940-2 configured to display the most watched (or possibly the highest rated) news feeds from across the host site (or possibly from other areas, like from across a section of the site or from the entire Internet); and a "Related Headlines" field 1940-3 configured to display headlines from various sources which are related to the results of the query (e.g. by some algorithm, like a key word search). It will be appreciated that many types of informational fields are possible for various purposes.

FIG. 19C provides a screenshot 1960 of yet another illustrative embodiment of the invention. The screenshot 1960 comprises several GUI elements, including a video frame 1962, a search results area 1964, a control panel area 1966, a global navigation area 1968, a title area 1974, and various informational areas 1970.

The search results area 1964 is configured to display result cue point controls (e.g. 1980). For example, here, the screenshot 1960 represents a scenario in which a client is searching for consumer products on a functional website which consolidates information from various shopping and auction sites across the Internet, called "OwnIt.net". Specifically, the client has searched for auctions relating to jewelry boxes on all auction networks supported by the host site, by providing the Boolean search criteria, "'Jewelry Boxes'+'All Networks'" (and possibly implied cue point criteria, like "Auction"). The query resulted in six results, represented in the search results area 1964 as six result cue point controls (e.g. 1980). By interacting with the result cue point controls (e.g. 1980), a client may jump to the associated location within the montage video file. For example, as illustrated, the client has selected the triangle cue point control 1980 (represented by the heavier line weight), representing footage of a jewelry box auction from the functional website, Shop4Stuff.net. Here, each cue point control (e.g. 1980) is identified by an illustration of the auctioned product, rather than a textual identifier. The footage begins 3:16 into the montage video file. Therefore, the montage video file is playing in the video frame 1932 from the time position of 3:16.

The video frame 1962 is configured to play the montage video file and related information, and to allow for client in interactivity with the video data. It will be appreciated that in some cases, it is desirable for a client to receive substantially real-time footage. For example, in this embodiment, auction footage may be more useful when it is as current as possible. Therefore, the environment may be configured to continually reload all or part of the montage video file to remain substantially current. Additionally, the video frame 1962 may be configured to display other video elements to augment the video data. For example, here, the video frame 1962 is configured to display a star 1972 which warns the client of the remaining time in the auction represented by the auction footage in the corresponding portion of the montage video.

The control panel area 1966 may comprise any number of useful controls. In the illustrated embodiment, the control panel area 1966 comprises four GUI controls, including a "Go To Product Listing" button for allowing a client to navigate to the auction listing currently being displayed in the video frame 1962; a "More From Vendor" button for allowing a client to view more product listings being offered by the same vendor as the auction listing currently being displayed in the video frame 1962; a "Modify Search Criteria" button for allowing a client to adjust the query criteria in any useful way; and a "Set Auction Alerts" button for allowing a client to set various useful alerts relating to this or other auctions (e.g. having an application send a text message to the client's phone or an email to the client's email address whenever certain auction conditions occur).

The global navigation area 1968 may comprise any number of useful controls for navigation around the host site. In the illustrated embodiment, the host site provides navigational controls to categories of information, including "Auction," and "Buy Now." Additionally, the host site provides navigational controls for access to the host's home page, partners of the host site, contact information, and information on joining the OwnIt.net team.

The informational areas 1970 may comprise any number of informational fields, which may or may not be interactive. In the illustrated embodiment, the informational areas 1970 comprise three informational fields, including a "Currently Watching" field 1970-1 configured to display the current query criteria and results which generated the currently displayed montage video file and cue points; a "Lowest Prices" field 1970-2 configured to display the lowest prices found on various Internet stores for the product currently being displayed in the video frame 1962; and a "Related Product Searches" field 1970-3 configured to display common related queries. It will be appreciated that many types of informational fields are possible for various purposes.

It will be appreciated that many controls, fields, and other elements are possible for various purposes. Further, it will be appreciated that the environment, and its areas and elements, may change in many different ways, depending on the type of property listings, the needs or desires of the host or client, technological capabilities or constraints, or for any other reasons. As such, the embodiments of FIGS. 19A-19C and their related descriptions are intended for illustrative purposes only and should not be construed to limit the invention.

Even further, it will be appreciated that many types of montage requests are possible relating to the many types of video information and cue point information according to embodiments of the invention. Additionally, it will be appreciated that many types of video montage datasets and files may result from the many types of montage requests possible within the scope of the invention. As such, the embodiments described herein in reference to FIGS. 13-19 should not be construed as limiting the scope of the invention.

Group Search Environments

In some embodiments of the invention, multiple clients may be jointly searching for information from different terminals. For example, a husband and wife may jointly search for a new house at different times and on different computers. The two searchers may be looking for identical, similar, or divergent characteristics. It may be desirable in these environments to generate search results based on group search habits.

Figure 20:
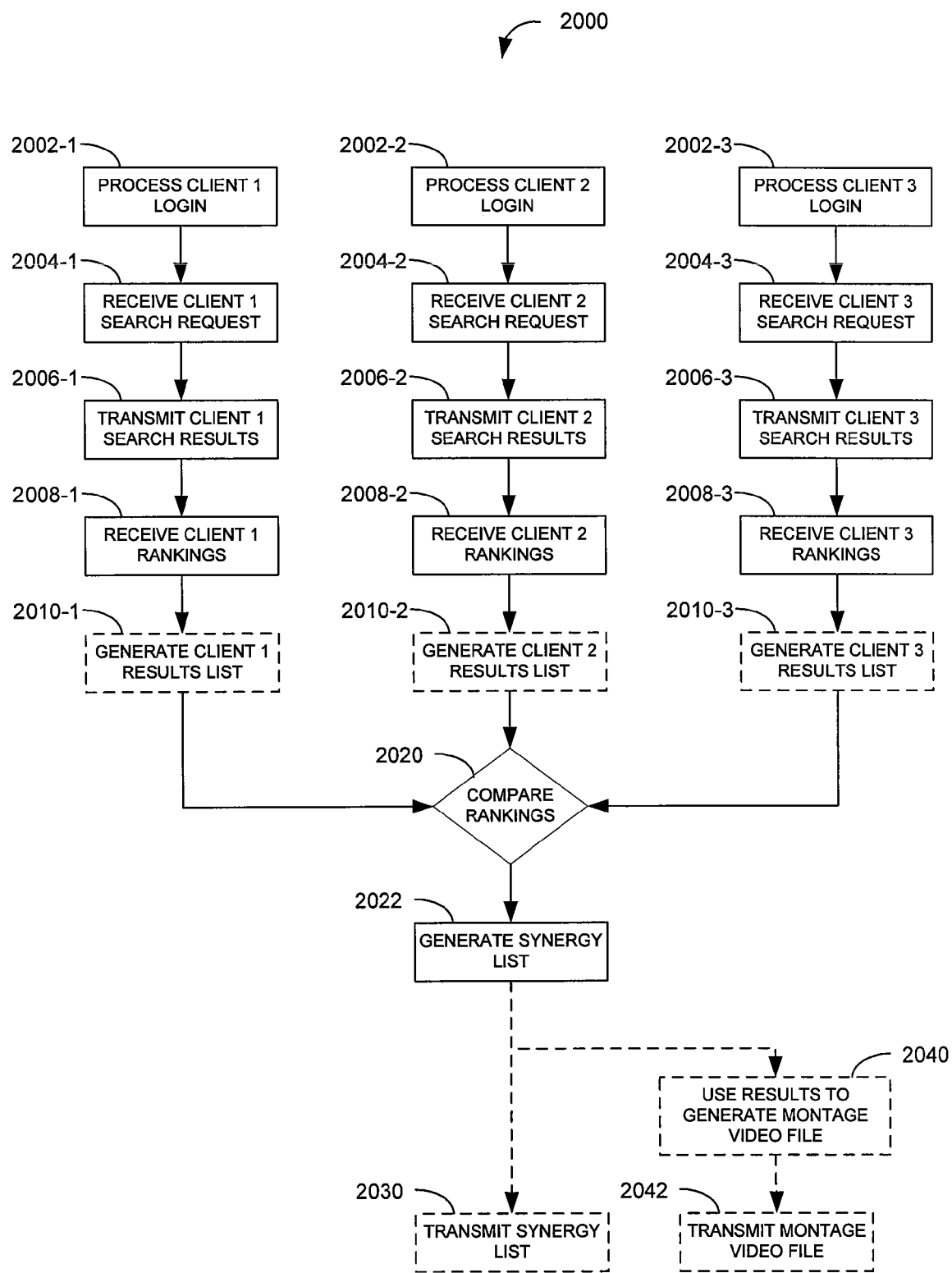
FIG. 20 provides an exemplary flow diagram summarizing methods for handling shared search environments according to embodiments of the invention.

FIG. 20 provides an exemplary flow diagram summarizing methods for handling shared search environments according to embodiments of the invention. The method 2000 is illustrated with respect to three searchers participating in a group search. It will be appreciated that any number of searchers is possible within the scope of the invention.

The method 2000 may begin by processing client login 2002. Client login may be processed 2002 in any useful way to receive any useful login information. Because the group search may use information from multiple clients, it may be desirable or necessary for the method 2000 to know which client (or at least which group) is currently searching. As such, the client login may be processed 2002 to receive information, such as an identifier for the client (e.g. a user name and password), and an identifier for the client's group (or the group association may be stored in relation to the client's identifier).

It will be appreciated that in different contexts, various searchers may search simultaneously or at different times, and from the same or different locations. In some embodiments, one searcher may perform a search one day, and a second searcher may perform a different search the next day. In some other embodiments, the first and second searchers may both search at the same time, but from different terminals. For example, a wife may search from her laptop computer while her husband searches from his laptop computer. In still other embodiments, multiple searchers may search in parallel on the same terminal. For example, a husband and wife may jointly view search results, but rate them differently as they proceed. It will be further appreciated that one individual or entity may act as multiple searchers. For example, a person may search for one criterion one day and for a second criterion the next day.

After processing the client login 2002, the method 2000 may receive the client's search request 2004. For example, Client 1 may search for footage of kitchens in homes for sale in Boulder, Colo. Client 2 may also be searching for homes for sale in Boulder, Colo., but may be interested in footage of master bathrooms. Further, the client's search request may be received 2004 in any useful way. For example, the method 2000 may receive a function with a set of Boolean variables and operators representing the search request.

After receiving the search request 2004, the method 2000 may transmit the client's search results 2006. The search results may be transmitted 2006 using any useful channels and in any useful form. In some embodiments, the set of search results may be transmitted 2006 over the Internet in the form of a montage video file with cue points for each search result in the set. For example, say again that Client 1 is searching for footage of kitchens in homes for sale in Boulder, Colo. The search results may be transmitted 2006 as a montage video file of all kitchens, with cue point locations at the start of each property's footage in the montage video file.

After the search results are transmitted 2006, the method may receive the client's rankings 2008. The client may rank footage in any useful way, and the client's rankings may be received 2008 in any useful way. In some embodiments, the method 2000 may provide GUI controls or other interactive elements for receiving client rankings. In other embodiments, the method 2000 may infer rankings from client activity or other information. For example, after viewing a portion of a montage video file, a particular client may click through to the full source video (e.g. a client looking at a montage video of all house exteriors may click through to the full property listing for one of the displayed exteriors). From this type of activity, the method 2000 may infer that the client likes that particular house exterior.

Further, in some embodiments, the method 2000 will be configured to allow the client to rank each search result. For example, if the set of search results is transmitted 2006 as a montage video file with cue points representing each search result in the set, the method 2000 may be configured to allow the client to rank the footage at each cue point. Additionally, rankings may comprise any indicator of preference. For example, a ranking may comprise only a positive or negative indication (e.g. a "thumb's up"). It will be appreciated that many ranking methods are possible within the scope of the invention.

In some embodiments, either after or while the client rankings are received 2008, the method 2000 may generate a results dataset 2010 for each client. The results dataset may be generated 2010 in any useful way to record the rankings of the client. For example, the results dataset may be a list of results, sorted by ranking. In another example, the results dataset may be a multi-dimensional relational dataset, comprising the rankings as attributes of the cue points in the montage video file.

Either after or while client rankings are received 2008 (or after or while the results dataset is generated 2010), the method 2000 may compare rankings 2020 from different clients in the group. This rankings comparison 2020 may be performed using any useful process or algorithm. For example, rankings may be compared 2020 using data processing algorithms or Boolean operations.

Say John, Sally, and Steve are looking for a house where they can live as roommates. John wants a large kitchen, so he searches for footage of kitchens in homes for sale in Boulder, Colo. His search yields five results: Home1, Home2, Home3, Home4, and Home5. After watching a montage video file of kitchen footage, John gives a positive ranking to Home1, Home4, and Home2; and a negative ranking to Home3 and Home5. Sally is also searching for homes for sale in Boulder, Colo., but is interested in a luxurious master bathroom. Sally's search generates only four results: Home1, Home3, Home4, and Home5 (i.e. all the homes listings for sale in Boulder, Colo. contain footage of both the kitchen and the master bathroom, except the listing for Home2). After watching a montage video file of master bathroom footage, Sally gives a positive ranking to Home 1, Home4, and Home3; and a negative ranking to Home5. Comparing John's and Sally's rankings yields two homes (Home1 and Home4) which received positive rankings from both John and Sally. Now, say Steve only cares about the "curb appeal" of the house, and wants to look at exterior footage. His search for footage of exteriors yields the same five results as John's search (i.e. all the homes listings for sale in Boulder, Colo. contain footage of both the kitchen and the exterior). After watching a montage video file of exterior footage, Steve gives a positive ranking only to Home4. Comparing the rankings with Steve's rankings included yields only one house (Home4) which received positive rankings from all three roommates.

After comparing the rankings 2020, a synergy list may be generated 2022, representing the results of the rankings comparison 2020. In some embodiments, the synergy list may be transmitted 2030 to some other location in some useful format. For example, the synergy list may be transmitted 2030 as a dataset to be stored in a database. In some other embodiments, the synergy list may be used to generate a montage video file 2040 comprising footage of the results in the synergy list. For example, montage video file may comprise the full footage of all property listings which received positive rankings from all searchers, with cue point locations representing each individual listing within the montage video.

Further, in some embodiments, the montage video file may be transmitted 2042 to a useful location, like a video server or a video playback environment.

Figure 21:
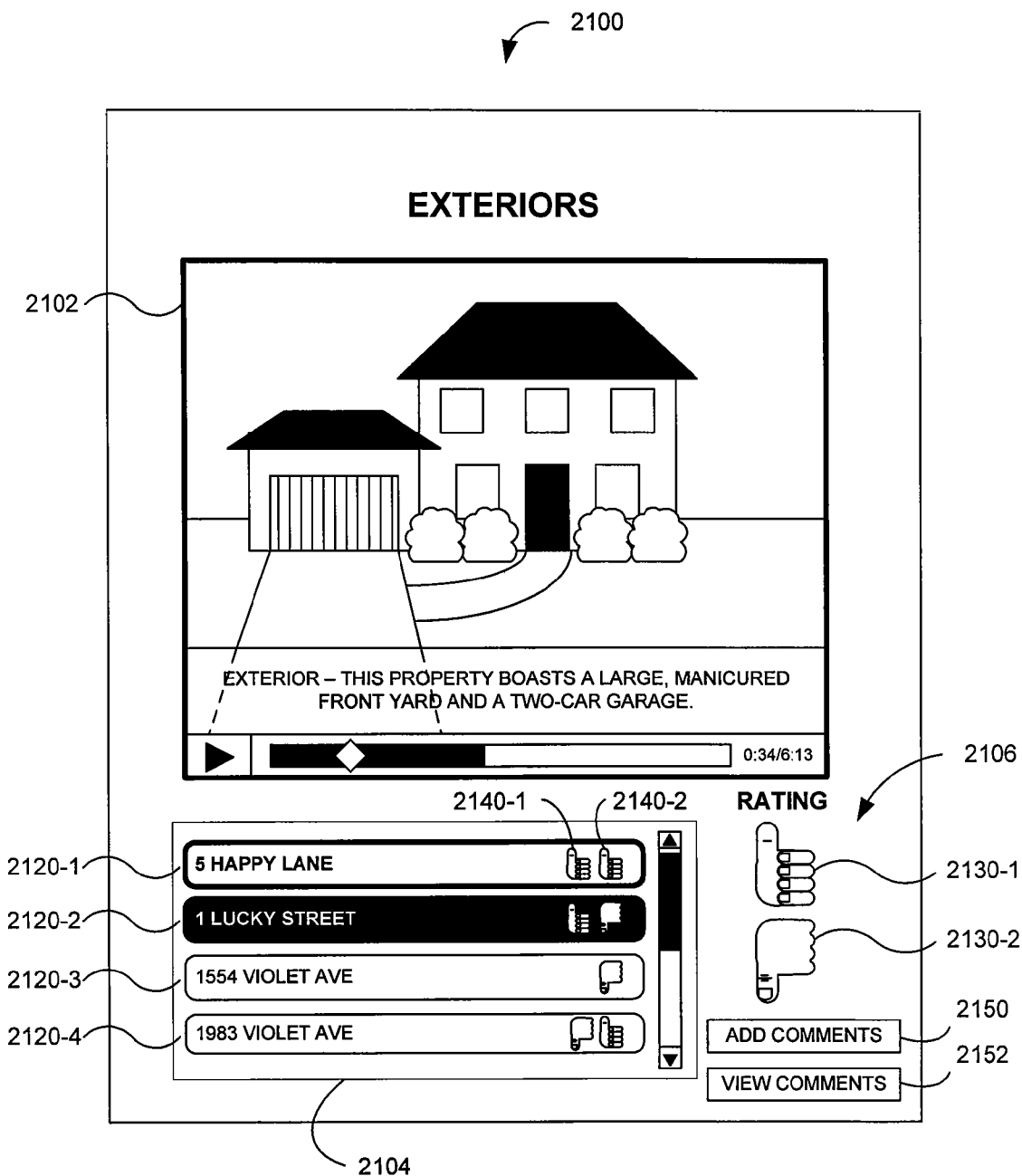
FIG. 21 provides an exemplary screen shot of embodiments of shared search environments according to embodiments of the invention.

FIG. 21 provides an exemplary screen shot of embodiments of shared search environments according to embodiments of the invention. It will be appreciated that many types of shared search environments are possible, and that those many types may be viewed in any effective way. As such, the screenshot 2100 of FIG. 21 is intended for illustrative purposes and should not be construed to limit the invention.

The client in this exemplary search environment submitted a query for video footage relating to exteriors of homes for sale in a certain area. The client's search returned a montage video file comprising video relating to four results, represented by the four result cue point controls 2120-1, 2120-2, 2120-3, and 2120-4. As illustrated, each result cue point control 2120 represents a time position in the video montage file relating to footage of a particular home exterior.

The screenshot 2100 comprises several GUI elements, including a video frame 2102, a search results area 2104, and a rating area 2106. The video frame 2102 is configured to play video data (e.g. the montage video file) and related information (e.g. comment information, elapsed time, etc.), and to allow for client interactivity with the video data (e.g. by providing navigational GUI controls, like a "pause" button and a playback position slider). Further, the video frame 2102 is configured to progressively download the video data, so that the client may play video data as it loads.

The search results area 2104 is configured to display search results in a useful way. As illustrated, the search results area 2104 may display both the result cue point controls 2120 and ratings indicators 2140 relating to the search results. The result cue point controls 2120 may each represent a time position in a video montage file. By interacting with a cue point control 2120, a client may jump to the associated location within the montage video file. For example, as illustrated, the client has selected the "1 Lucky Street" cue point control 2120-2 (represented by the inverted coloration), representing footage of the exterior of the house at 1 Lucky Street. The footage begins 34 seconds into the montage video file. Therefore, the montage video file is playing in the video frame 2102 from the time position of 34 seconds.

The search results area 2104 may also provide ratings indicators 2140 relating to the search results. For example, here, the client is the third searcher in a search group. For each result cue point control 2120, the client can see the ratings from each other searcher, if any, given to the listing represented by each cue point. These ratings are represented as the ratings indicators 2140 within each result cue point control 2120. For example, the first property listing at 5 Happy Lane (represented by the cue point control 2120-1) has been positively rated (indicated by a "thumb's up" icon) by the other two raters (see 2140-1 and 2140-2).

It will be appreciated that various types of ratings information from other searchers may be available in different ways. For example, the ratings indicators 2140 may be positioned, colored, or otherwise differentiated to represent which rater provided each rating. In another example, ratings of some or all other raters may be hidden from one or all other raters. In a third example, ratings may be available from all raters, not just those within the client's search group. In a fourth example, derivative information, like statistics, suggestions, etc. may be provided based on various data (e.g. the client's search or rating patterns, the behaviors of the search group, the behaviors of larger populations of searchers, etc.).

In some embodiments, the cue points may load progressively along with the montage video data. In some cases, cue points may become active (e.g. available for interaction) only after their respective video data loads. For example, in the illustrated embodiment, the third and fourth cue points ("1554 Violet Ave" and "1983 Violet Ave", respectively) represent time positions at 3:30 and 5:00 in the montage video file, but only the first three minutes of video data have loaded. Therefore, the third and fourth cue points may remain active until more video data loads. This inactive status may be represented in some useful way by the GUI, for example by changing the weight of the lines and text associated with the third and fourth cue point controls (see 2120-3 and 2120-4, respectively).

In other embodiments, cue points may be activated before their respective video data loads. For example, cue points may load when the video data begins to download. When a client selects a cue point before its respective video data has loaded, the video data may begin to progressively download from that cue point time position. When the video data for that cue point has finished loading, other video data may continue to load in any desirable order.

The ratings area 2106 may comprise any number of useful rating elements. In the illustrated embodiment, the ratings area 2106 comprises four GUI controls. The first two (2130-1 and 2130-2) provide the client with a way to interactively rate each listing. As illustrated, the client may interact with either the "thumbs up" button 2130-1 or the "thumbs down" button 2130-2 to positively or negatively rate the current listing (e.g. the property currently being displayed in the video frame 2102). The remaining two controls (2150-1 and 2150-2) allow the client to add comments associated with the listings or the ratings by interacting with the "Add Comments" button 2150-1; or to view comments associated with the listings or the ratings from any set of raters by interacting with the "View Comments" button 2150-2.

It will be appreciated that there are many different types of scenarios in which group searching would be desirable or necessary. Further, the many types of video information, cue point information, montage video files, video environments, property listings, clients, hosts and other entities may yield many varying types of group search environments with varying characteristics. As such the invention should be construed broadly to encompass these many embodiments, and should not be limited by the described embodiments herein.

Thus, having described several embodiments, it will be recognized and appreciated that various modifications, alternative constructions, and equivalents may be used without departing from the spirit of the invention. Additionally, system components may be arranged differently and process steps may be performed in different orders within the scope of the invention. Accordingly, the above description should not be taken as limiting the scope of the invention, which is defined in the following claims.

What is claimed is:

1. A system for handling video cue points, the system comprising:
    a video server configured to serve a set of video information from a plurality of video files;
    a cue point server configured to serve a set of cue point information corresponding to cue points, each cue point associated with at least one video file and indicating a location within the video information from the associated at least one video file; and
    an application server, in operative communication with the video server and the cue point server, disposed on a server side of a public network, in communication with a client terminal disposed on a client side of the public network, and comprising a processor configured to run a video editing environment configured to:
        receive a cue point editing command over the public network from the client terminal;
        modify a portion of the cue point information at the cue point at the cue point server in response to and according to the cue point editing command received over the public network from the client terminal;
        receive a cue point selection over the public network from the client terminal identifying one of the cue points corresponding to a portion of the video information of one of the video files; and
        stream the portion of the video information to the client terminal over the public network in response to receiving the cue point selection and without storing the video file in its entirety to the client terminal.

2. The system of claim 1, further comprising a data store configured to store at least a portion of the set of video information and at least a portion of the set of cue point information.

3. The system of claim 1, further comprising a relational database configured to store at least a portion of the set of cue point information in relation to at least a portion of the set of video information.

4. The system of claim 1, further comprising a relational database configured to store at least a portion of the set of cue point information in relation to at least another portion of the set of cue point information.

5. The system of claim 1, wherein the cue point information substantially defines at least one of a metatag, a cue point name, a cue point time position, or a cue point hierarchy.

6. The system of claim 1, further comprising an authentication server configured to authenticate clients of the system such that the portion of the cue point information at the cue point server is modified according to the cue point editing command received over the public network from the client terminal only when the client terminal is authenticated by the authentication server.

7. The system of claim 1, further comprising a comment handler configured to perform at least one of receiving, displaying, or associating comment information, wherein the comment information
    comprises at least one of textual, audio, or video information, and
    relates to at least a portion of at least one of the set of video information, the set of cue point information, or other comment information.

8. The system of claim 1, further comprising a video authorer configured to communicate with a video creation device.

9. The system of claim 1, wherein the video server is in operative communication with the application server via the network.

10. The system of claim 1, wherein the cue point server is in operative communication with the application server via the network.

11. The system of claim 1, wherein the network is the Internet.

12. The system of claim 1, wherein modifying the portion of the cue point information at the cue point server in response to and according to the cue point editing command received over the public network from the client terminal comprises re-associating the corresponding cue point with a different location within the video information.

13. A method for handling video cue points, the method comprising:

providing a computer system having at least one computer-readable medium comprising a video editing environment, and being disposed at a server side of a public network;

receiving a set of video information at the video editing environment using the computer system;

receiving a set of cue point information at the video editing environment using the computer system;

receiving a cue point editing command over the network from a remote client terminal disposed at a client side of the public network using the computer system;

modifying a portion of the cue point information at the server side of the public network according to the cue point editing command received over the public network from the client terminal;

receiving a cue point selection over the network from the remote client terminal identifying one of the cue points corresponding to a portion of the video information of one of the video files; and streaming the portion of the video information to the client terminal over the public network in response to receiving the cue point selection.

14. The method of claim 13, further comprising providing a cue point editing mode as part of the video editing environment configured to perform at least one of creating, modifying, deleting, or interpreting at least a portion of the set of cue point information according to the cue point editing command received over the public network from the client terminal.

15. The method of claim 14, further comprising:
receiving an edit mode entry signal over the network from the client terminal representing entry into the cue point edit mode, and
switching the video editing environment to the cue point editing mode in response to receiving the edit mode entry signal.

16. The method of claim 14, further comprising:
while streaming the video information to the client terminal, receiving an edit mode entry signal over the network from the client terminal representing entry into the cue point edit mode,
determining a time position representing a time location within the video information being streamed at which the edit mode entry signal was received, and
creating a cue point location associated at least in part with the video information and the time position.

17. The method of claim 13, further comprising generating, automatically by using the computer system, at least a portion of the set of cue point information.

18. The method of claim 13, further comprising receiving, over the network, authentication information relating to access authority of the remote client terminal.

19. The method of claim 18, further comprising denying or allowing access to all or part of the video editing environment based at least in part on the access authority of the remote client terminal.

20. The method of claim 13, wherein the server video data is streamed progressively to a video playback environment at the remote client terminal, allowing the video player to begin displaying streamed server video data while remaining server video data continues to be streamed.

21. A system for handling video cue points, the system comprising:
an application server accessible by a plurality of remote client terminals over a public network comprising at least one processor and configured to run, over the public network:
a client authentication module configured to authenticate remote client terminals as editor terminals; and
a video editing module configured to:
receive a cue point selection over the network from one of the remote client terminals identifying one of the video cue points corresponding to a portion of video information of a video file;
stream the portion of the video information to the remote client terminal over the public network in response to receiving the cue point selection; and
provide edit interactivity with cue point information only when the remote client terminal is authenticated by the client authentication module as an editor terminal by:
receiving a cue point editing command over the public network from one of the remote client terminals; and
modifying a portion of the cue point information at the video editing module in response to and according to the cue point editing command received over the public network from the client terminal,
the cue point information corresponding to a cue point indicating a location within at least one video file.

22. The system of claim 21, wherein the application server is configured further to run, over the public network:
a video playback module configured, without authentication of the remote client terminal by the client authentication module as an editor terminal, to:
direct playback of the video file to a user interface running on the client terminal over the public network, the playback being directed to commence from a first location in the video file without storing the video file in its entirety to the client terminal;
direct display of a plurality of graphical cue point controls to the user interface concurrent with playback of the video file, each cue point control being associated with cue point information and a location within the video file;
receive a selection of one of the plurality of graphical cue point controls over the public network from the client terminal via the user interface during playback of the video file; and
direct playback of the video file to the user interface to commence from the location in the video file associated with the selected one of the plurality of graphical cue point controls without storing the video file in its entirety to the client terminal in response to receiving the selection.

23. The system of claim 22, wherein the video playback module is further configured to provide access to edit interactivity via the video editing module when the remote client terminal is authenticated by the client authentication module as an editor terminal.

24. The system of claim 22, wherein the video playback module and the video editing module are both communicatively coupled with a server-side data storage system configured to store the video file and the cue-point information.

25. The system of claim 21, wherein modifying a portion of the cue-point information affects the corresponding cue point by at least one of: creating the cue point, deleting the cue point, temporally moving the cue point, editing a label associated with the cue point, or editing an association between multiple cue points including the cue point.

26. The system of claim 21, wherein the application server is configured to run the video editing module over the public network, so as to provide the edit interactivity according to data received over the public network via a standard Internet browser running on the remote client terminal.

27. The system of claim 21, wherein the application server is configured to run the video editing module over the public network, so as to provide the edit interactivity without a dedicated client-side application running on the remote client terminal.

28. The system of claim 21, wherein the application server is configured to run the video editing module over the public network, so as to provide the edit interactivity without storing the server-side video information to the remote client terminal.

* * * * *